United States Patent [19]

Kaempen

[11] Patent Number: 4,786,536
[45] Date of Patent: Nov. 22, 1988

[54] COMPOSITE DEFLECTABLE SPRING STRUCTURE

[76] Inventor: Charles E. Kaempen, 3202 Larkstone Dr., Orange, Calif. 926695

[21] Appl. No.: 118,522

[22] Filed: Nov. 9, 1987

Related U.S. Application Data

[62] Division of Ser. No. 33,493, Apr. 1, 1987, Pat. No. 4,740,422, which is a division of Ser. No. 716,565, Mar. 27, 1985, Pat. No. 4,680,923.

[51] Int. Cl.$^4$ .................. B65H 81/00; B27N 5/02; F16L 9/00; F16L 39/00
[52] U.S. Cl. .................. 428/36.3; 138/109; 267/148; 285/319; 285/425; 285/369; 285/417; 464/100; 464/185; 428/192; 428/121; 428/122; 428/34.51
[58] Field of Search .................. 438/35, 36, 369, 371, 438/399, 192, 121, 122; 138/109; 285/425, 319; 267/148; 464/100, 185

[56] References Cited

U.S. PATENT DOCUMENTS

| | | | |
|---|---|---|---|
| 2,770,940 | 11/1956 | Morrison et al. | 57/229 |
| 2,775,860 | 1/1957 | Morrison et al. | 57/249 |
| 3,323,975 | 6/1967 | Marzocchi et al. | 57/249 |
| 3,496,717 | 2/1970 | Costello et al. | 57/7 |
| 3,498,038 | 3/1970 | Shulver | 57/7 |
| 3,538,700 | 11/1970 | Hofer | 57/249 |
| 3,631,667 | 1/1972 | Marzocchie | 57/7 |
| 3,644,866 | 2/1972 | Deardurff | 57/229 |
| 3,784,441 | 1/1974 | Kaempen | 428/112 |
| 4,385,644 | 5/1983 | Kaempen | 156/173 X |

Primary Examiner—Lorraine T. Kendell
Attorney, Agent, or Firm—Phillips, Moore, Lempio & Finley

[57] ABSTRACT

A composite structure comprises at least one ply comprising approximately parallel unidirected twines comprising helically-configured matrix-impregnated continuous strands of filament reinforcements to provide a flanged composite cantilever spring which serves as the principal constituent of a coupling structure. An interior ply of a coupling structure body member comprises unidirected longitudinal twines configured at a body member extremity to provide a flange member connected to a cantilever spring. An exterior ply is disposed transversely of and superimposed upon the interior ply to provide the cantilever spring hinge line. The composite cantilever spring can be constructed to deflect about either a straight or curved hinge line. A preferred tubular form of the coupling structure comprises at least one end configured as a polygonal array of flanged cantilever springs which serve as the socket end of a spring-lock coupling used to connect mating flanged spigot-end structures. A preferred segmented form of coupling structure comprises two semi-circular flanged cantilever spring members assembled and deflected by an encircling retaining sleeve.

The method and apparatus for making a composite in the form of a preferred coupling structure comprises placing first ply loops of longitudinal twines upon a pin-ended forming surface, transversely placing a second ply of twines upon the first ply twines to deflect them into flange-forming cavities, hardening the twine-impregnating matrix, removing and slotting the flanged spring members to provide the desired coupling structure.

12 Claims, 29 Drawing Sheets

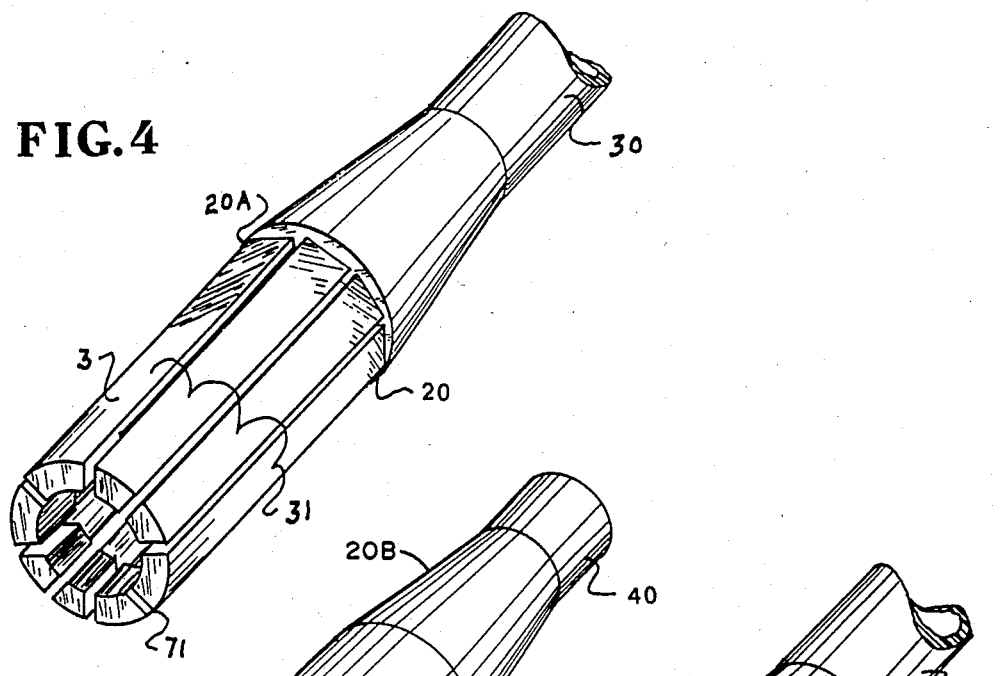
FIG. 4
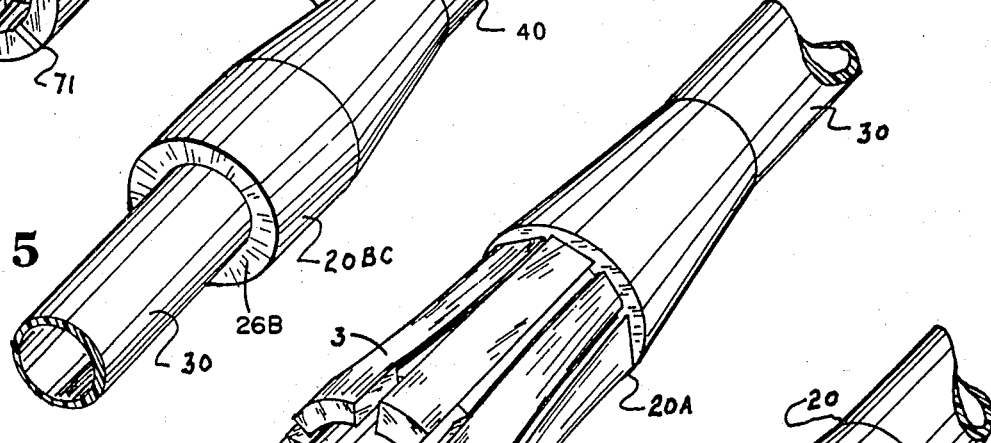
FIG. 5
FIG. 6
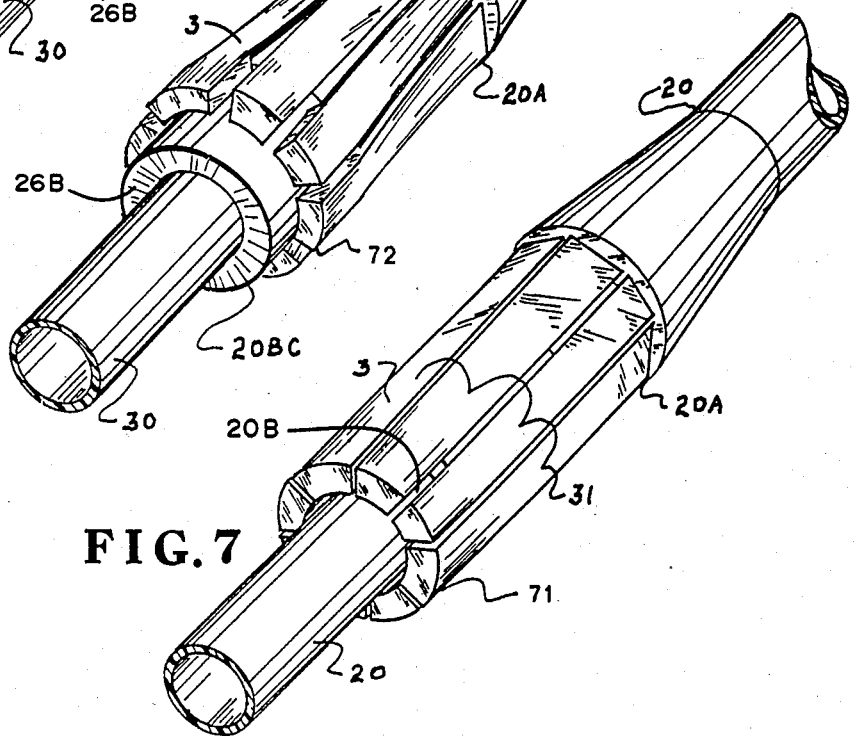
FIG. 7

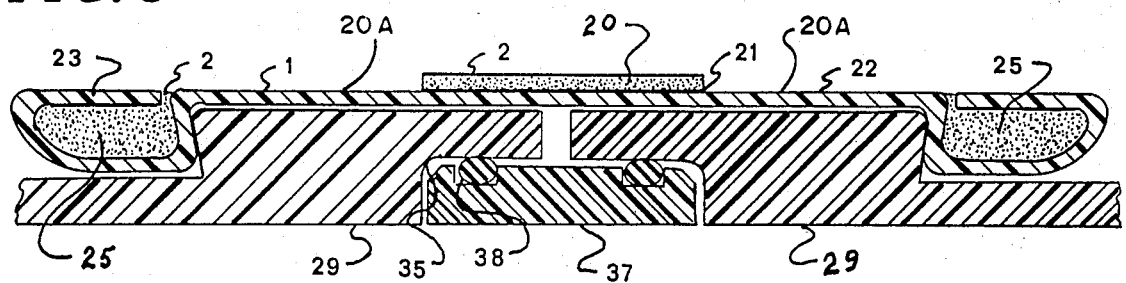
FIG. 8
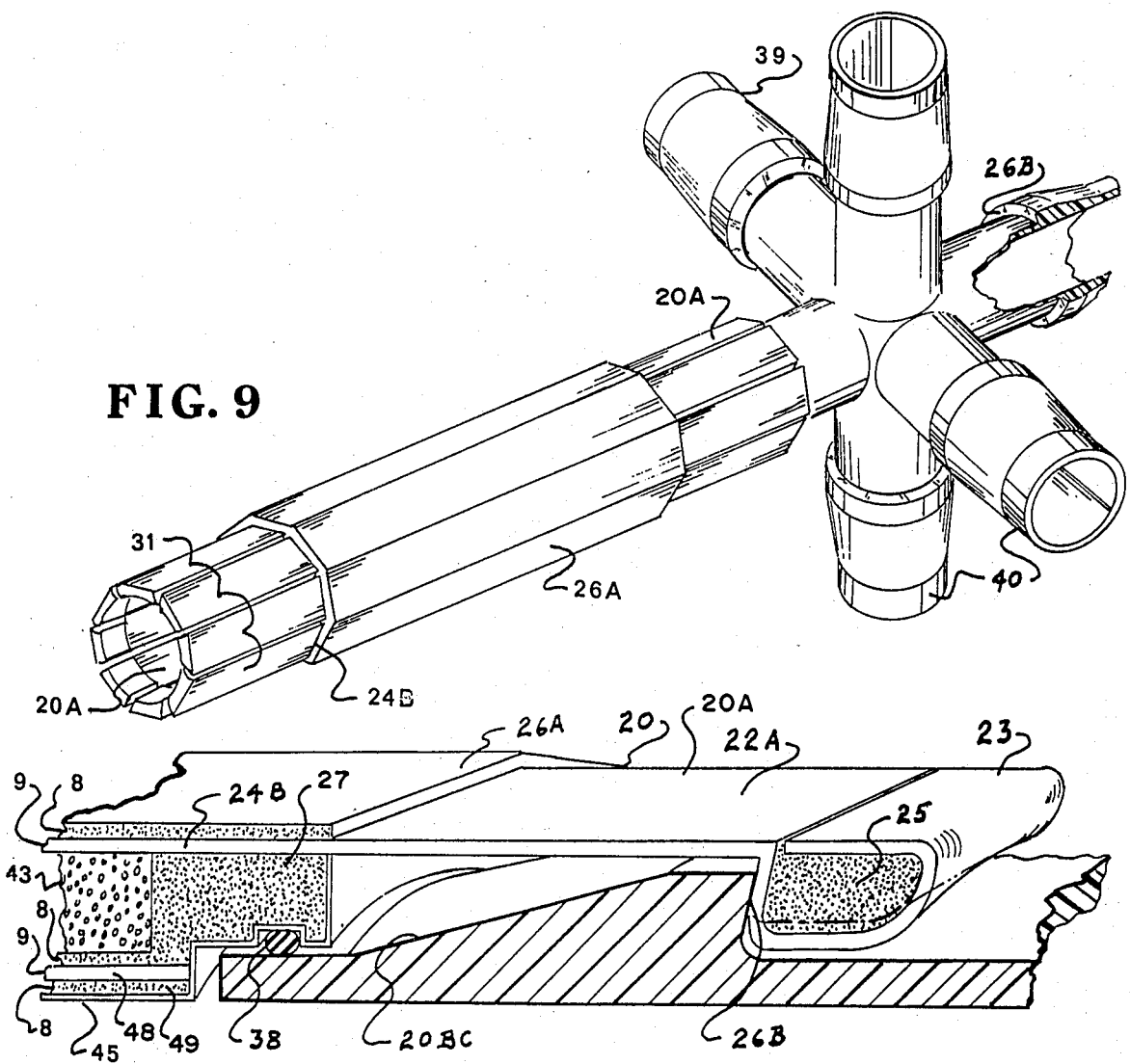
FIG. 9
FIG. 10

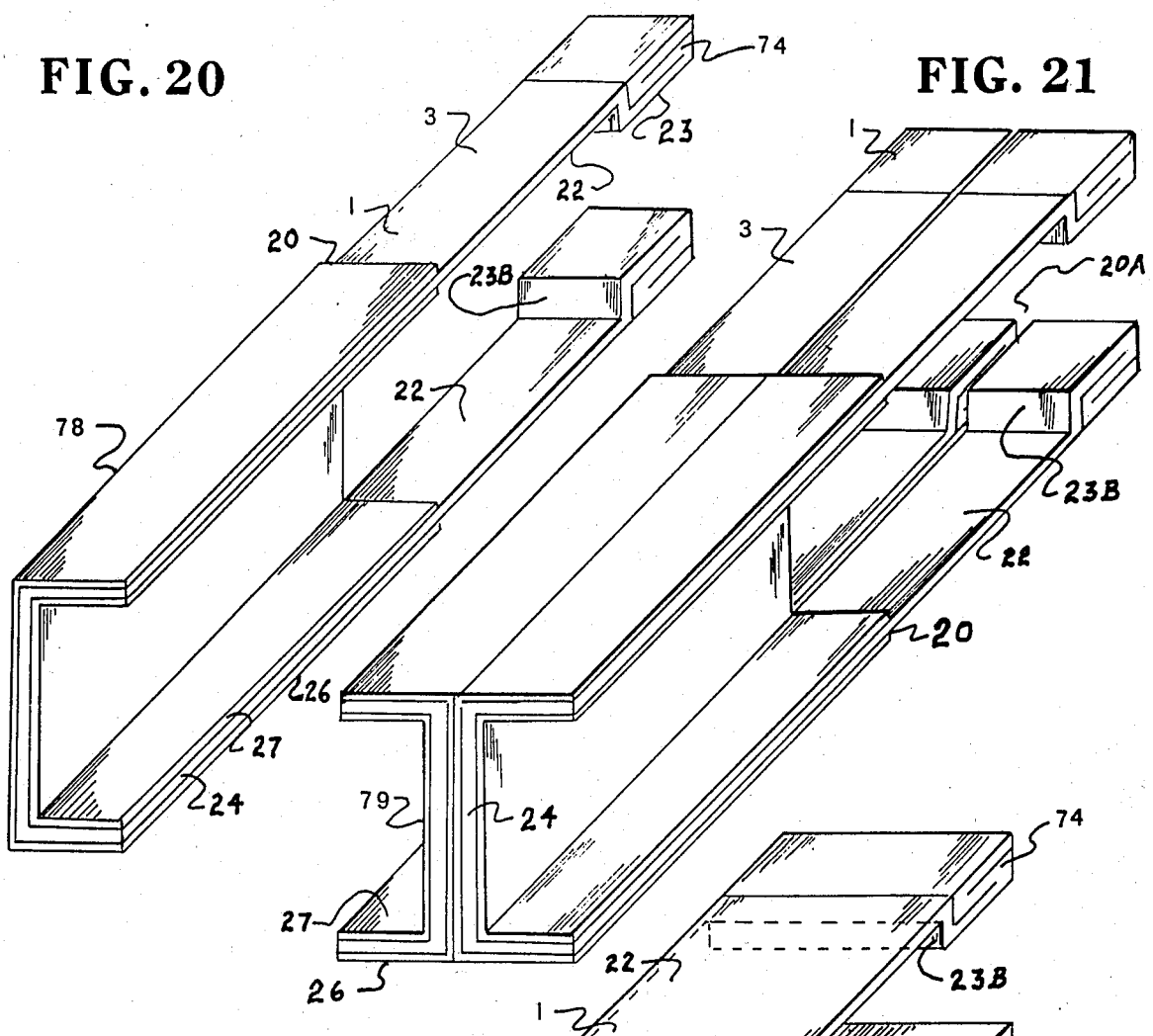
FIG. 20
FIG. 21
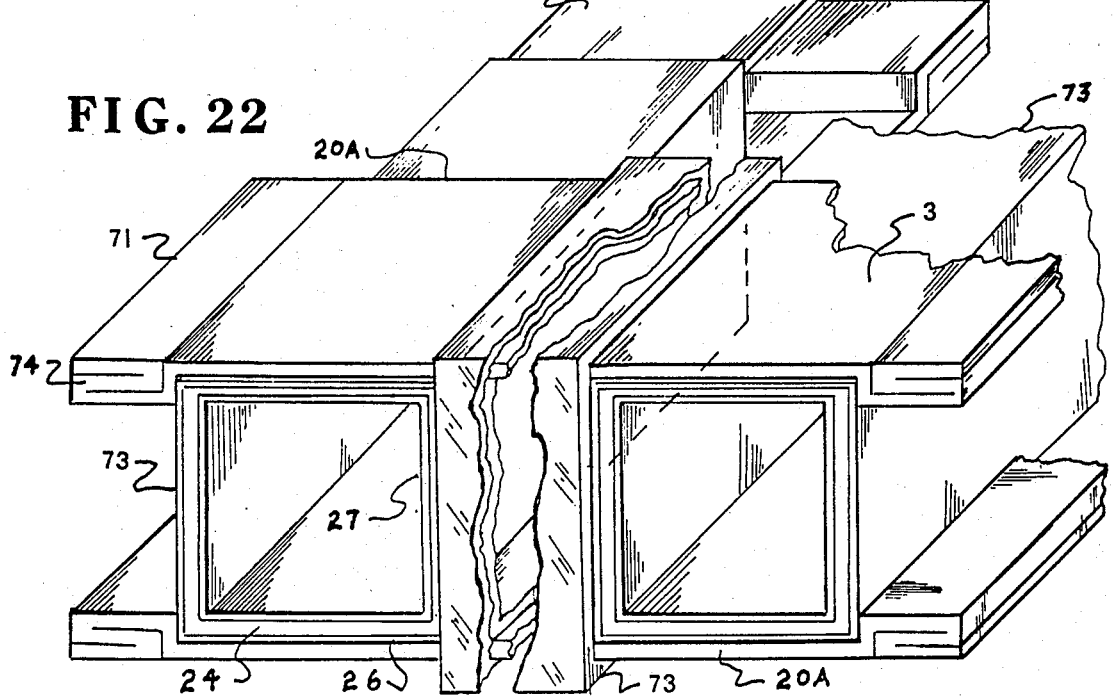
FIG. 22

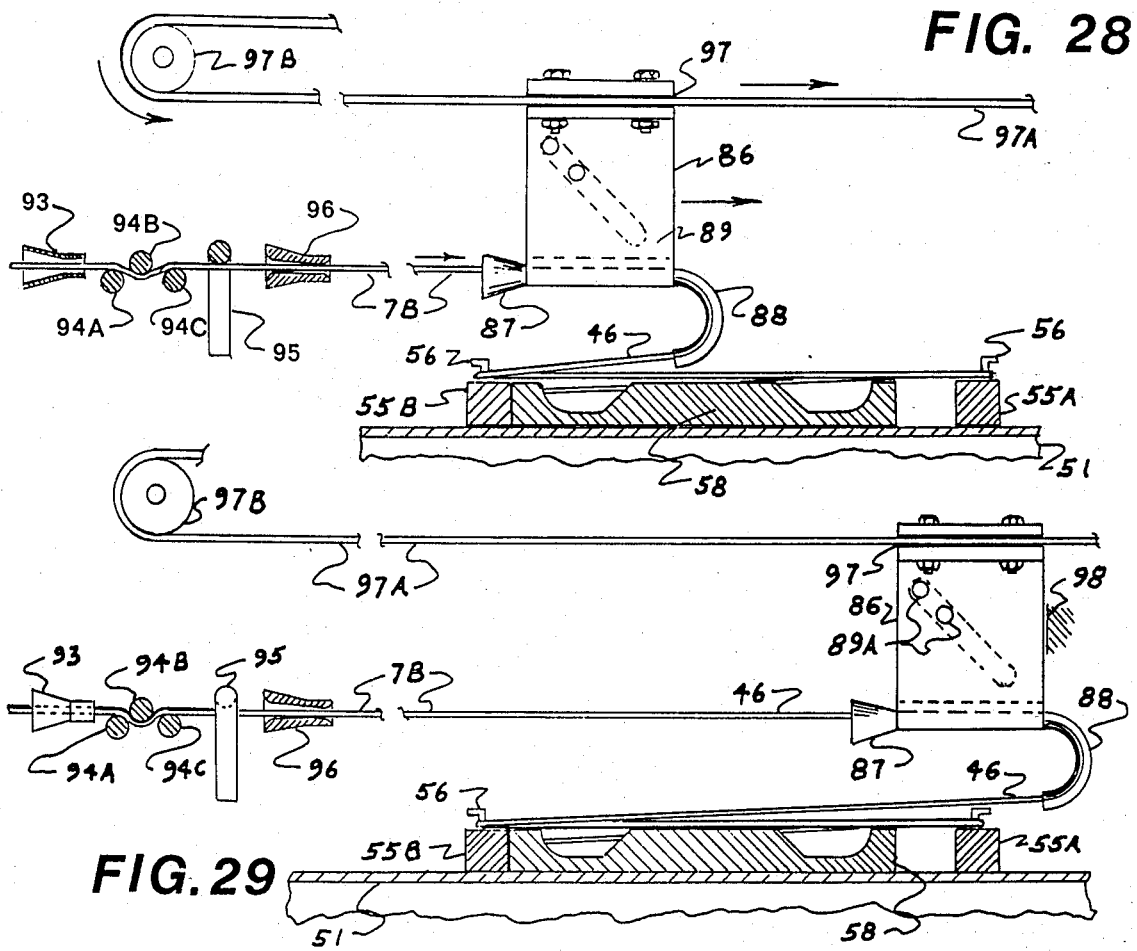
FIG. 28
FIG. 29
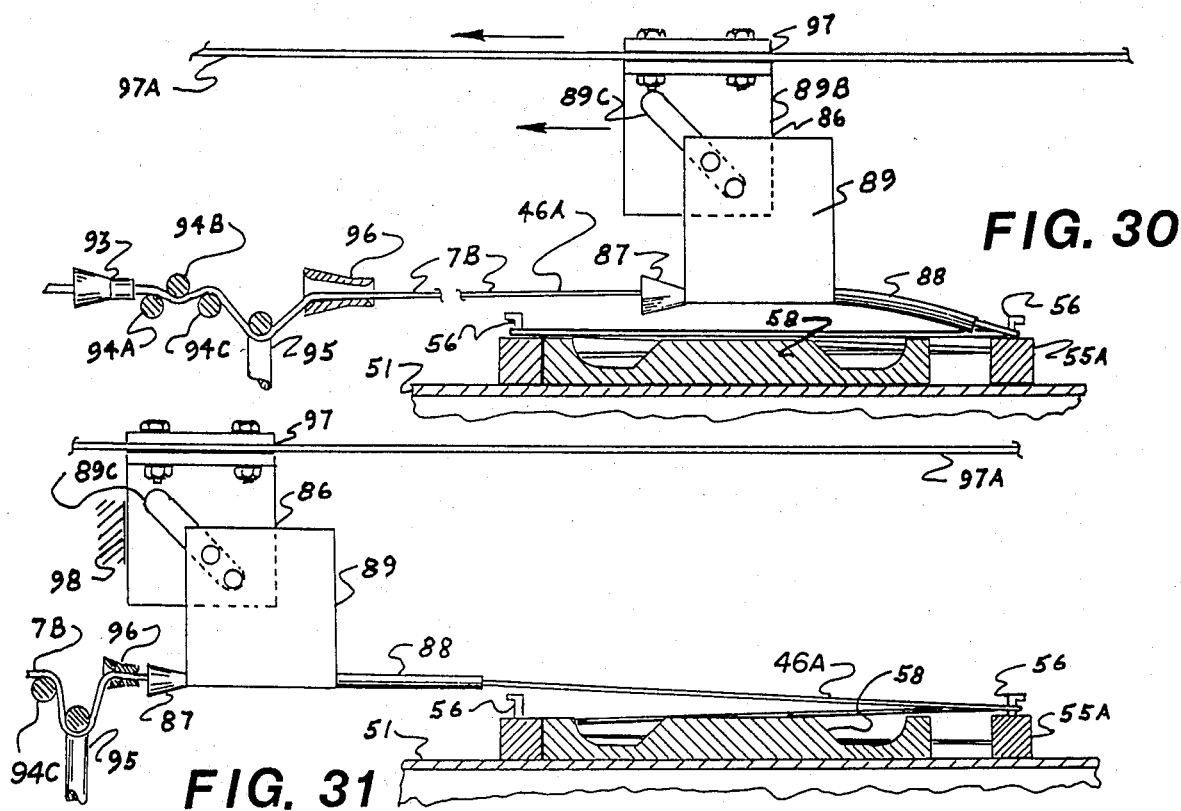
FIG. 30
FIG. 31

FIG. 32
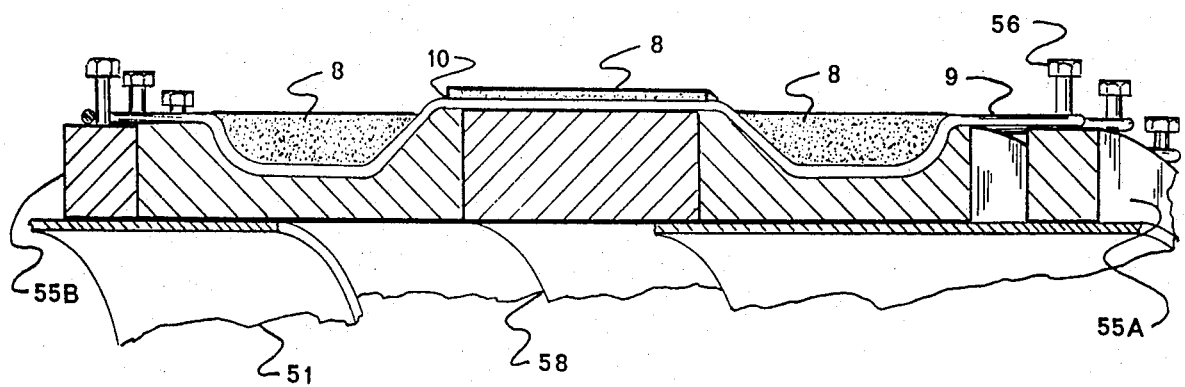
FIG. 33
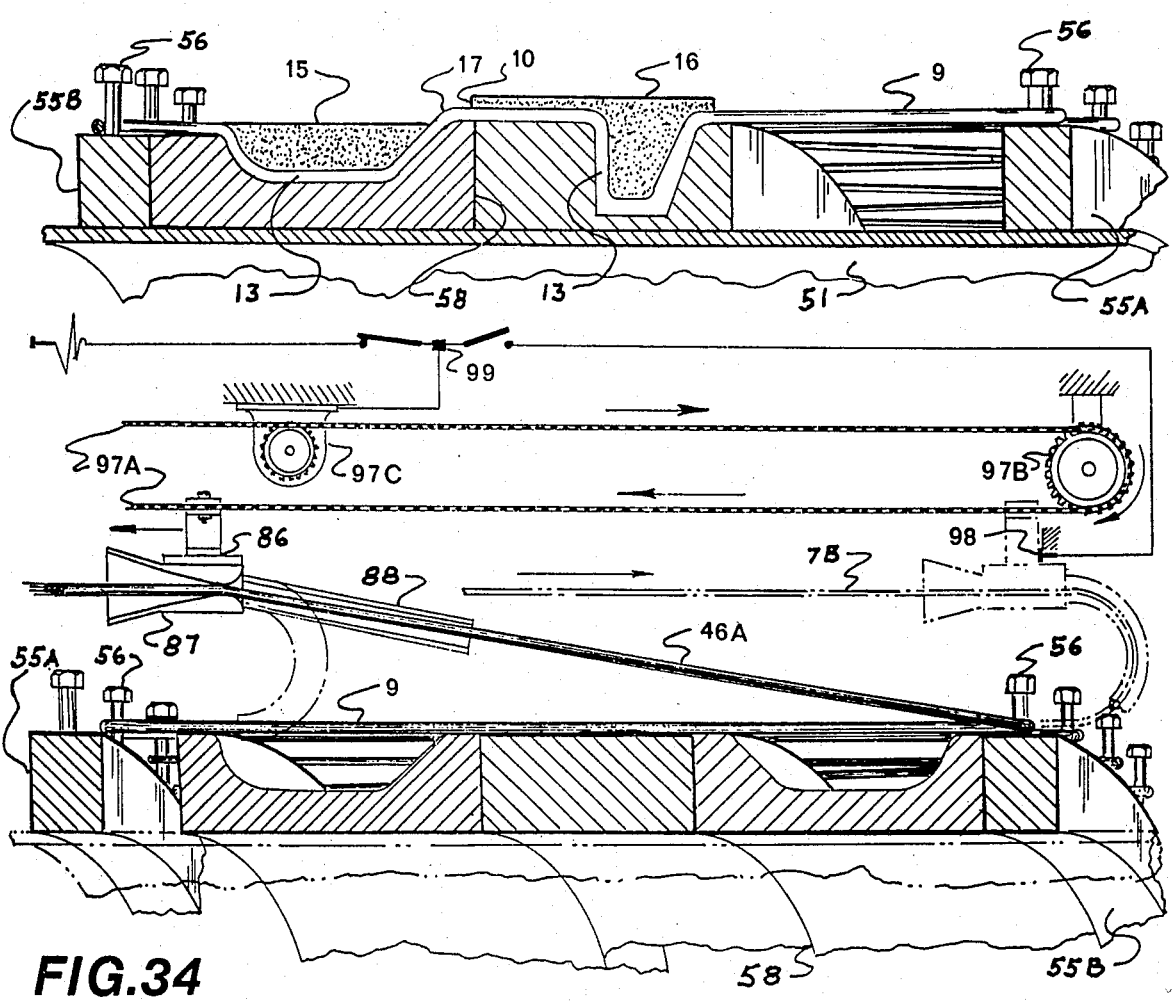
FIG. 34

FIG. 72
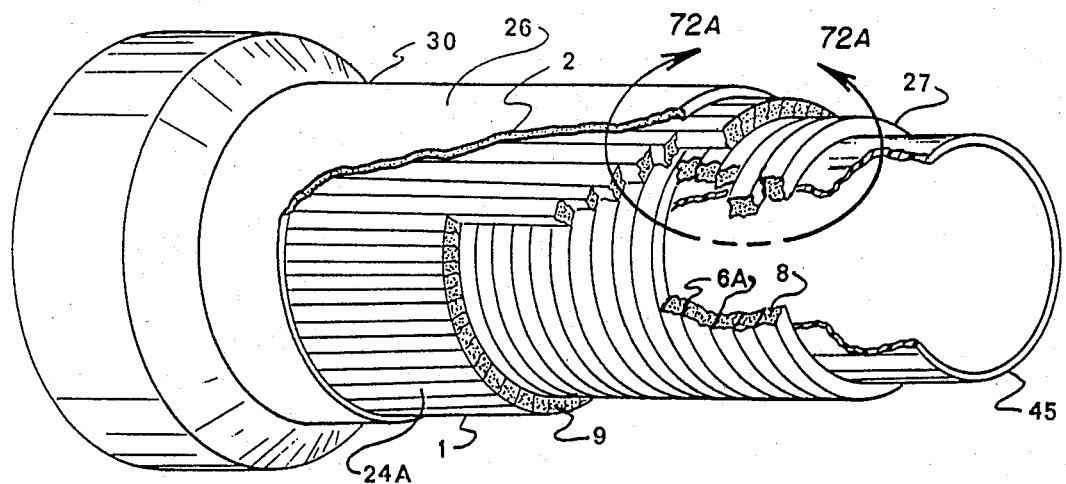
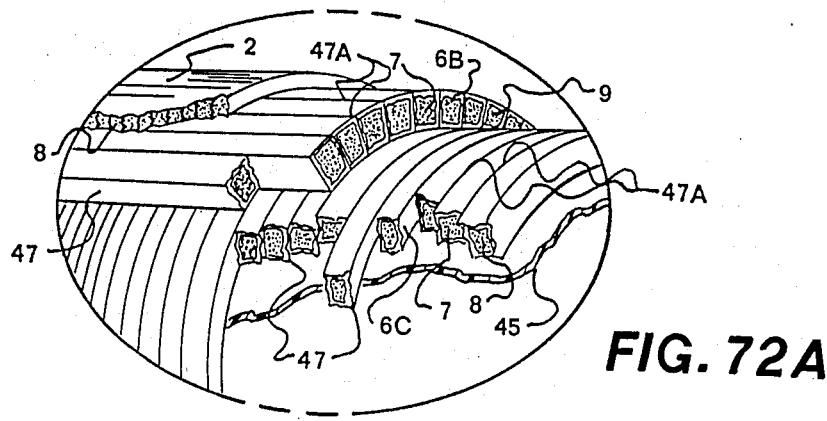
FIG. 72A
FIG. 73
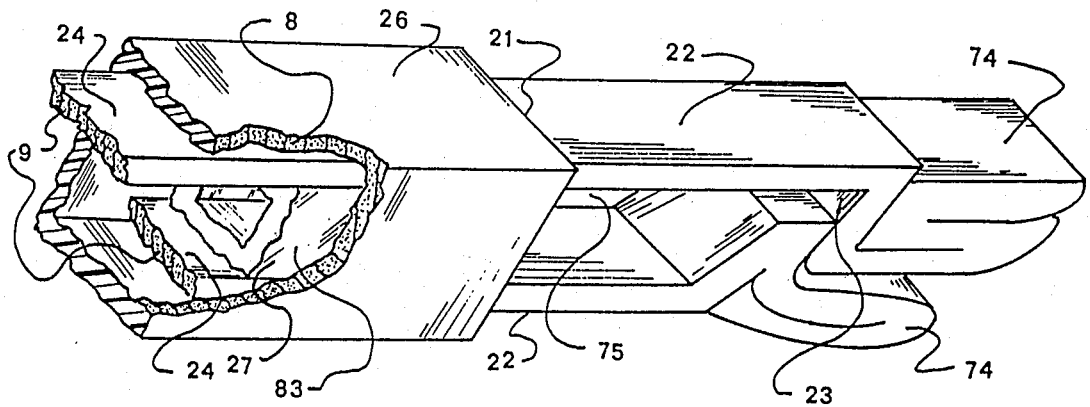

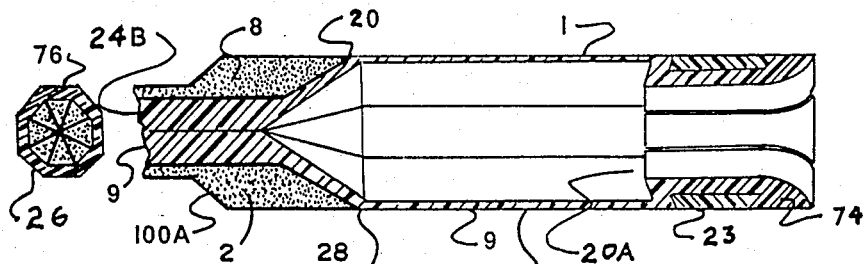
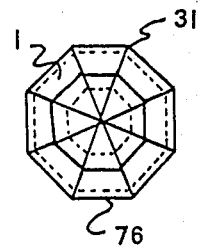
FIG. 74A  FIG. 74  FIG. 74B
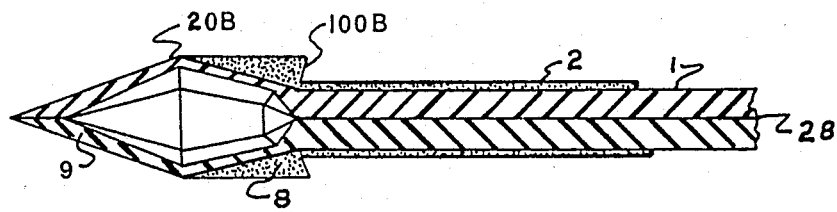
FIG. 75
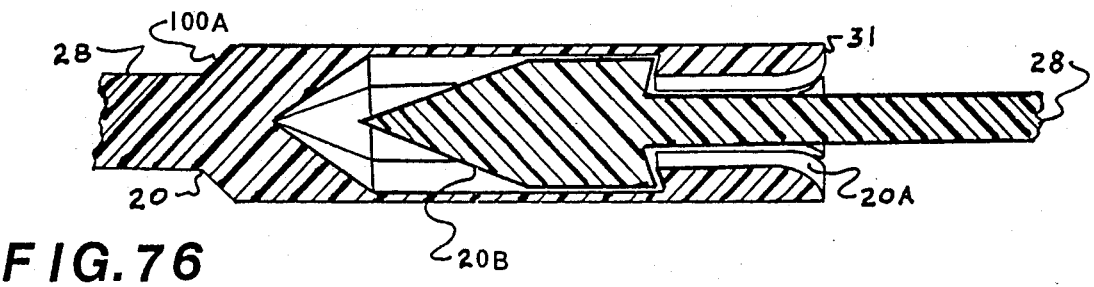
FIG. 76
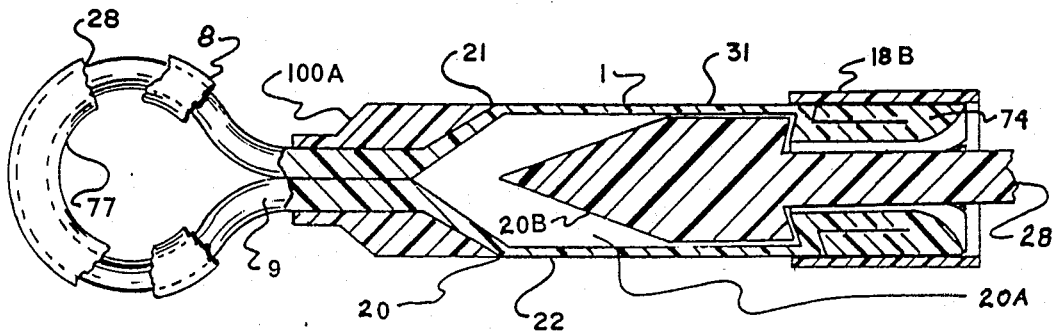
FIG. 77

COMPOSITE DEFLECTABLE SPRING STRUCTURE

CROSS REFERENCE TO RELATED APPLICATIONS

This application is a division of U.S. application Ser. No. 033,493, filed on Apr. 1, 1987, now U.S. Pat. No. 4,740,422, which is a division of U.S. application Ser. No. 716,565, filed on Mar. 27, 1985 and now U.S. Pat. No. 4,680,923.

DESCRIPTION

1. Technical Field

This invention relates to a multiple ply flanged composite cantilever spring coupling structure and method and apparatus for making same. The invention relates particularly to a coupling structure consisting of at least one flanged composite cantilever spring member formed from a multiple ply composite structure comprising at least two biaxial unidirectional plies of tensioned twines, where each twine consists of a multiple of helically-configured continuous filament strands impregnated with a hardenable liquid matrix. An interior body member ply comprises a unitary structure comprising twines of the helically configured strands aligned parallel to each other and configured at a body member extremity to provide a flange member connected to a composite cantilever spring member. An outer ply comprises pretensioned twines disposed transversely of and superimposed upon only the interior ply of the body and flange members. The first and second plies are each oriented perpendicular to the direction of the composite spring deflection. One form of a desired coupling structure comprises a tubular multiple ply composite body structure having a body extremity with an inner surface shaped as a regular polygon and partially slotted at the polygon corner edges to provide an annular array of inwardly-flanged flat composite cantilever spring members, each of which can be independently deflected outwardly about a straight hinge line to provide a flanged spring locking coupling structure which serves as a deflectable socket end to connect a mating spigot-end structure having an outwardly directed flange.

Another form of a desired coupling structure comprises a semi-circular multiple ply composite body structure the extremities of which comprise a curved hinge cantilever spring connected to an inwardly directed curved flange having a load face and surface formed from the same unidirectional longitudinal ply of twines used to make the body structure. The structure provides one of two identical coupler halves which are assembled and held together by a removable clamp or tubular sleeve which deflects the curved flanged cantilever springs and provides a coupling between joint-ended structures having external mating flanges.

BACKGROUND

Composites consist of one or more discontinuous phases, such as filament reinforcements, embedded in a continuous phase, such as a thermosetting resin matrix. Composite materials offer a way to improve mechanical properties such as strength, stiffness, toughness and high temperature performance. Properties of composites are strongly influenced by the properties of their constituent materials, their distribution and the interaction among them. In describing a composite material, besides specifying the constituent materials and their properties, one needs to specify the geometry of the reinforcement with reference to the system. The geometry of the reinforcement may be described by the shape, size and size distribution. The composite material of the present invention comprises continuous filaments as the reinforcement or discontinuous phase and a hardenable liquid matrix as the continuous phase. The geometry of the reinforcements employed in the present invention can be described as continuous filaments of uniform diameter having manufactured lengths of several hundred meters and filament diameters typically ranging from 7 microns (0.00028 in.) to 25 microns (0.001 in.). The concentration of the filament reinforcements comprising the composite material of the present inventions typically ranges from 45 to 60 percent by volume. The composite material of the present invention most closely resembles the class of composites known as unidirectional composites.

An important mechanical property and design parameter of unidirected composite materials is herein referred to as the "transverse shear strength". This property is the shear strength of a bundle of filament strands held together by a hardened matrix. It is also referred to as the "across strand" shear strength, the value of which can be determined by the ASTM test method D-732 which uses a punch type shear tool and a composite structure test specimen measuring $2'' \times 2''$ and comprising a single thickness of filament strands oriented approximately parallel to each other. The composite structure test specimen is clamped between the punch holder so that the filaments are oriented at right angles to the punch face. Shear strength tests performed by ASTM D-732 method show that the transverse shear strength of a single ply of a unidirected twined strand composite comprising sinusoidally oriented glass filament reinforcements impregnated with a hardenable polyester resin matrix ranges from 172 to 241 MN/m$^2$ (25,000 to 35,000 PSI). This substantially exceeds the interlaminar "in plane" shear strength of conventional reinforced thermosetting plastics determined by ASTM D-3846.

It is necessary to distinguish a unidirectional "ply" from a unidirectional "laminate" if the discoveries disclosed in the present invention are to be clearly understood. Prior art unidirectional laminates, such as comprise prior art filament wound and pre-preg ribbon layered composites, are constructed not from individual filaments but from "tows" or "strands" containing numerous filaments. It is well known that each filament strand or tow contains hundreds and often thousands of individual filaments which, especially in the case of the glass filament strands called "roving", are not exactly parallel to each other but are twisted in a loose untangled manner after being coated with a dissolvable fiber size that converts the bundle of filaments into a strand to provide what is referred to as strand integrity. These strands of glass filaments are wound onto a collet to form a primary package or "cake" to facilitate their use in filament winding and pultrusion operations. Typically these "cakes" or roving packages are hollow cylinders that enable the strands to be fed by pulling from the center or interior of the package in order to eliminate mounting and rotating the roving package while the filament strand is fed or pulled from the roving package. Such center pull operations impart a further twist to the filaments contained in the strand. The amount of strand twist is governed by the roving package size as well as the "way wind" number used in making the package. Generally the "way wind" number is between 2.7 and 4.1 which means that for a 6 inch inside diameter cake the filaments are twisted completely 360° at least once for each meter of strand pulled from the roving package. Unless corrected, this strand twist serves to reduce by as much as half the optimum tensile strength attainable from unidirectional laminates fabricated from untwisted strands. This is due to the fact that in a twisted strand the individual filament lengths resisting a tensile load are not exactly equal and thus only the shortest length filaments are those that primarily resist a tensile load. Because carbon and aramid filament reinforcement is from five to thirty times move expensive than glass filament reinforcement the strands of carbon and aramid filament are made, packaged and dispensed in a manner that reduces the twist and strength loss of carbon and aramid filament strands.

An idealized unidirectional composite is one which consists of parallel untwisted continuous filaments embedded in a matrix. A prior art "laminate ply" results when two or more unidirectional layers are stacked in a specified sequence of orientation to fabricate a composite structure. Each layer of unidirectional twined strands discussed in the present invention is referred to as a "ply" to distinguish it from prior art stacks of thin laminates which are conventionally referred to as a "laminate ply".

A "ply" is herein defined as made from one or more tensioned and unidirected approximately parallel "twines". A "twine" is herein defined as comprising three or more unidirected filament strands twisted together to provide a sinusoidal wave-like configuration to each strand. A ply made from twined strands typically has a thickness to filament diameter ratio of at least fifty whereas a typical prior art unidirectional composite "laminate" comprises untwisted parallel strands and has a thickness to filament diameter ratio ranging from ten to forty. The ideal orientation of the sequence of plies made from unidirectional sinusoidally configured twined strands described in this invention is either 0° or 90° with respect to each other with a manufacturing deviation that approximates plus or minus 10°.

Prior art unidirectional composite tubular laminates made by conventional filament winding apparatus and method are fabricated by use of strand feed, impregnation and strand placement techniques that endeavor to minimize the twist of filaments and filament-containing strands and thereby minimize the concomitant loss of laminate tensile strength resulting from twisted filament strand reinforcements. The unidirectional twined strand composite plies of the present invention are constructed by methods and with apparatus that intentionally increases rather than decreases twisting of the unidirectional filament reinforcements to provide the desired sinusoidal orientation of the strand filaments. The reason is most clearly understood when it is realized that, although important, tensile strength is not the only property required of a unidirectional composite, especially if the composite is to serve as a spring or a frequently flexed structure. This invention teaches that the sinusoidal wave-like arrangement of twined filament strands not only greatly increases the stiffness of a unidirectional composite ply structure made therefrom but also greatly facilitates the fabrication of tubular composites constructed from two or more biaxial plies.

Prior art composite tubular structures subjected to free-end closure pressure stress (ASTM D-1598 and D-2992) are constructed in a manner that requires the tubular wall structure to simultaneously resist longitudinal and circumferential stresses. In composite pressure vessels, such as closed-end pipe, the circumferential hoop stress, $S_C$, is always double the longitudinal end load stress, $S_L$, and is calculated from the formula $S_C = PD/2t_c$; $S_L = PD/4t_c$ where "P" is the internal pressure to which the tube is subjected, "D" is the outside diameter of the tube, "$t_c$" is the proportional thickness of the tube wall material which resists the circumferential stress, and "$t_L$" is the proportional thickness of the tube wall material which resists the longitudinal stress. This invention teaches that a single "CIRC" ply of circumferentially disposed twines having a thickness, "$t_c$", and constructed upon an impermeable tubular membrane can comprise the tube wall material used to resist the circumferential tube hoop stress, "$S_C$", and that a single "LONGO" ply of longitudinally disposed twines having a thickness "$t_L$" and constructed upon the CIRC ply can comprise the tube wall material used to resist the tube end load longitudinal stress, "$S_L$".

Prior art composite tubular structures used as pressure vessels exhibit a change in overall length and diameter that greatly depends upon the behaviour of the matrix material bonding together the individual laminate plies. Theoretically, the change in tube diameter "$\Delta D$" of such prior art structures having a diameter, "D", can be calculated from the formula: $\Delta D = \epsilon_c D$ where $\epsilon_c = S_c/E_c$ and is the circumferential strain value produced by the hoop stress, "$S_c$", in a composite tube material having a tensile modulus equal to "$E_c$". In a similar manner the change in tube length, "$\Delta L$" of such prior art structures having a length, "L", can theoretically be calculated from the formula $\Delta L = \epsilon_L L$ where $\epsilon_L = S_L/E_L$ and is the longitudinal strain value produced by the longitudinal stress, "$S_L$", in a composite tube material having a tensile modulus equal to "$E_L$". Unfortunately, the tensile modulus values $E_c$ and $E_T$ for prior art composite tube laminate ply materials are unpredictably influenced by the tensile modulus values and the Poisson ratio values of the matrix materials used to bond together the laminate plies. For this reason, the location and magnitude of the changes in length and diameter of prior art composite laminate tubes, especially those constructed of a multitude of helically disposed laminate ribbons of unidirectional filament strands, cannot be reliably predicted or calculated.

The present invention teaches that by use of twines of helically configured strands which are placed adjacent to each other and separated by a compatible interface material having a tensile strength less than or equal to the hardened bonding matrix used to impregnate and bond together the helically configured twine strands, the location and magnitude of the changes in diameter and length of a pressurized composite tube structure can be reliably predicted and calculated.

The structural integrity of prior art composite structures made from multiple layers of unidirected filament laminates is governed by the integrity of the matrix material used to bond the laminates together. For this reason prior art composite structures degrade in performance over time as the bonding strength of matrix material is reduced by the micro fractures between the matrix layer and the laminate resulting from cyclic stresses. The micro fractures in the laminate bonding matrix not only reduce the peel strength and interlaminar shear strength of the matrix but also promote filament bundle wicking by exposing edges and surfaces of the laminate to liquids, vapors or gases.

This invention teaches that a substantial increase in composite structure durability results when the structure is made of twine plies which comprise helically configured strands. The twine strand helical configuration disclosed in this invention provides a means for composite structures to be independent of the interlaminar shear strength, peel strength, and micro fractures associated with the matrix material used to impregnate and bond together the filament reinforcements, and thereby experience substantially less degradation in stiffness and other physical properties.

With the advent of high pressure composite pipe which can be rapidly and mechanically joined to provide a permanently sealed connection it is no longer necessary for pipe engineers to depend exclusively upon welded steel pipe as the most reliable and economical method to transport water, oil, gas and slurry products. In addition to such features as high strength to weight and long term resistance to cyclic fatigue and corrosion, composite pipe has an extremely smooth inner surface which reduces fluid flow friction and thus lowers the cost to pump product through the pipe.

The single most important feature that governs economic comparisons among pipe of equivalent linear foot cost and performance is the method used to join and seal the pipe. Steel pipe is most economically joined and sealed by welding rather than by use of bolted flanges or threaded couplings. Composite pipe on the other hand is most economically joined and sealed by use of mechanical couplings rather than by use of field-bonded connections. The speed and ease by which modern composite pipe can be coupled and sealed as well as uncoupled and removed provides it an economic merit that compares favorably with mechanically coupled steel pipe.

Modern composite mechanical couplings provide a rapid and reliable method of connecting composite pressure pipe. Seals made of modern elastomer materials provide a sealing permanence and integrity equivalent to that of bonded or welded connections. Composite mechanical couplings which use threaded joints or bolted flanges are more expensive than those which employ shallow non-bolted flanges. For this reason, increased attention has been given to the use of coupling structures which engage grooves machined in the ends of composite pipe. Such coupling structures generally comprise inwardly flanged members such as employed by Victaulic type clamps. Flexible steel cable or plastic rod used as flexible keys engage shallow recessed flanges or key ways machined into composite pipe joint ends provide another commonly used method of mechanically coupling composite pipe. Prior art mechanical couplings which employ shallow flanges provided by recessed grooves machined in the conventional laminate ply composite pipe joint ends are limited in joint tensile strength to the matrix dependent interlaminar "in plane" shear strength of the composite material and for this reason have limited the attainable joint strength of prior art composite pipe joints and mating composite mechanical coupling structures. The coupling structures of the present invention provide a means to overcome prior art coupling strength limits.

A structural flange is a protuberance that enables the transfer of a load from one body to another. For stress analysis purposes a structural flange can be treated as a short cantilever beam permanently attached to a body which resists the load imposed on the flange. Flanged structures seldom act singly but generally perform cooperatively with another flanged structure to provide a coupling and exchange of load between separate structures. Flanged structures are most commonly employed to transfer tensile, compressive and torsion loads. Torsion loads applied to prior art composite structures are primarily limited by the low shear strength of the composite matrix material used to bond a torqued flange to the surface of the torque-resisting body. The torque resisting coupling of the present invention overcomes such prior art limitations by making use of the high transverse shear strength of unidirected longitudinal twined strand cords. Flanges which primarily resist tensile and compressive loads imparted to the flange face behave as uniformly loaded cantilever beams. These tensile and compressive loads impart bending moment stress as well as shear stresses to the material connecting the flange to the load resisting body. This invention teaches that flanges attached to an integral composite cantilever spring are superior to prior art coupling structures by providing flange construction which not only reduce the bending moment stress at the flange connection but also increases the strength of the flange connection. An objective of the present invention is thus to teach how a composite flange attached to a composite structure can be constructed to lower the bending moment stress imposed at the flange connection while concomitantly increasing the strength of the flange connection to provide a flanged composite structure superior to prior art composite couplings.

Prior art composite pipe couplings have been developed which employ segmented spring-loaded curved square shaped keys that engage grooved composite pipe joint ends to provide an automatic quick connect type coupling. Such spring action is provided by independent members contained within a socket-end groove constructed within a composite pipe joint. Such spring-action type composite couplings employ flange members that act independently as movable shear keys and are constructed separately from the spring members. Such prior art automatic couplings are limited in scope and application by the spring member reliability as well as the shear key and grooved flange in-plane shear strength.

A cantilever spring is a structural member which exhibits a predictable deflection when subjected to a known load and which returns to its original position when the load is removed. The present invention teaches a method of making and using a composite cantilever spring which possesses greater fatigue life and spring stiffness for a given spring thickness than prior art composite springs.

Prior art composite springs, which usually are not flanged, comprise multiple layers of thin laminates containing unidirectional filaments. The stiffness and thus the spring constant of such composite laminate cantilever springs is greatly dependent upon the tensile strength, and the in plane interlaminar shear strength of the matrix material which bonds together the individual laminate plies. For this reason the tensile strength and the spring constant of prior art composite laminate cantilever springs is matrix dependent since such springs can not efficiently utilize ths stiffness and strength of the filament reinforcements comprising the material from which they are constructed.

I have discovered that when cords of sinusoidally twined matrix-impregnated strands of continuous filaments are arranged in parallel fashion on a forming surface and individually tensioned prior to being shaped or formed, a unitary ply of composite material is produced from which stiff high performance composite cantilever springs can be made. Such composite springs have been found to exhibit a substantially higher spring constant and stiffness than prior art composite multiple laminate springs of identical thickness and configuration.

I have further discovered that an array of independent composite cantilever spring members with predictable stiffness can be produced when a single ply of twined longitudinal filament strands is impregnated with a hardenable liquid matrix and formed into a tubular composite structure having a polygonal cross section that is slotted at least partially along the vertices of the tubular polygon in a direction parallel to the tubular axis to provide a straight hinge line for each spring member.

Prior art methods for making composite tubular structures comprising tensioned longitudinal filament renforcements generally employ a sequence of overlapping laminates where each laminate comprises a single thickness of filament strands aligned parallel to each other. Such methods are time consuming, complicated and expensive when used to construct composite tubular structures requiring a longitudinal laminate ply wall thickness greater than that attainable with a single filament strand. The present invention teaches a method to construct tubular composite structures having a single ply wall thickness governed by the cross section area of a twine of strands.

Prior art composite multiple ply structures which resist high temperature and which will not burn are generally made with a single liquid matrix that possesses the desired heat resistance and non-burning properties. Prior art methods employed to fabricate such non-burning high temperature composites generally require the use of non-combustible additives which tend to lower the viscosity of the liquid matrix and thereby inhibit a thorough impregnation of the filament reinforcement strands and thus reduce the composite material strength. To overcome this problem prior art non-burning composites commonly comprise a liquid polymer matrix blended with liquid halogen-containing fire-retardant additives. Such composites, when subjected to fire or extreme heat not only decompose and lose strength but release deadly toxic halogen-containing gases that not only impede fire fighting operations but may cause fatalities among persons exposed to such fire-produced gases.

I have discovered a non-combustible liquid matrix material that, while in a liquid uncured state, is compatible with most conventional uncured combustible thermosetting polymer materials. A composite structure which possesses greater resistance to degradation from fire or heat can be fabricated when filament strand reinforcements impregnated with a combustible thermosetting resin are twined or otherwise intimately combined with other filament strand reinforcements that are impregnated with the compatible non-combustible liquid matrix.

Prior art composite couplings such as described in U.S. Pat. No. 4,385,644 employ non-bevelled composite flanges comprising a longitudinal filament ply sandwiched between two annular composite rings containing circumferentially oriented continuous filament strands one of which rings serves as the flange load face. Composite coupling flanges having this construction are unable to resist tensile strength coupling loads that exceed the interlaminar shear strength of the resin matrix bonding the sandwiched plies together. Such non-bevelled inwardly facing composite ring coupling flanges are further unable to act as flanged composite spring members that flex and thereby assist coupling assembly as well as provide the longitudinal assembly force required to sufficiently compress an elastomeric gasket to accomplish a face seal between abutting pipe joint ends. When experiencing tensile end loads such prior art segmented composite couplings do not act to secure and lock an encircling composite sleeve structure so as to prevent disassembly when subjected to longitudinal stress.

Prior art annular composite sleeves used to assemble and encircle segmented composite coupling structures are not divided to enable easier coupling assembly as well as impose a compressive radial force upon only the outer faces of each coupling flange.

Prior art tubular composite laminates are generally single wall structures which are stiffened by use of sandwiched sand-resin mixtures or structural foam. Such structures are poorly suited to serve as beams or structural members subjected to bending stresses since they depend upon the interlaminar shear characteristics of the matrix material used to bond the laminates to the foam or filler material sandwiched between them. Such prior art tubular composite structures poorly resist delamination between inner and outer walls due to thermal stresses which serve to change the lengths of the inner wall and outer walls.

The following summarize the objectives of this invention to overcome the limitations of prior art composite coupling structures:
(a) To provide a superior coupling to connect composite panels and tubular structures.
(b) To provide a composite spigot and socket coupling structure that is an integral structural constituent of compposite pressure pipe.
(c) To provide a composite coupling structure able to easily connect high pressure pipe.
(d) To provide a composite mechanical coupling that is able to make and maintain a compression pressure seal between connected pipe joint faces.
(e) To provide a high temperature composite material that resists deterioration and loss of strength when exposed to fire.
(f) To provide composite beam, truss and panel structures that can be easily joined or disconnected.
(g) To provide a compposite coupling structure that resists disassembly when subjected to tensile end loads.
(h) To provide apparatus and methods for making a wide range of compposite coupling structures having predictable characteristics of strength and sealing capability.

SUMMARY OF THE INVENTION

This invention is directed to a composite deflectable spring comprising a multiple of compacted continuous filament strands each composed of a multiple of individual continuous filament reinforcements. Each filament strand extends at least generally in the direction of a longitudinal axis thereof to exhibit a center-pull helical frequency and configuration defined by a multiple of revolutions about the axis and about at least one other of the filament strands. Each filament strand has helixes that are spaced relative to the helixes of the other filament strands in the direction of the axis. Hardenable adhesive means impregnates the filament strands and forms a hardened bonding matrix for rigidly maintaining the filament strands as a composite structure. A multiple of the structures are disposed in at least general parallel relationship relative to each other to form a uniformly thick single ply structure with the structures being bonded together by the hardened bonding matrix to form the deflectable spring structure.

A further object of this invention is to provide a composite coupling structure having a series of flanged flat cantilever composite springs which serve as the socket end of a coupling structure that connects with structures having mating protuberant flanged socket ends. Such socket-ended coupling structures can be shaped as panels as well as tubes or pipe having a polygonal array of flat cantilever spring members separated at the polygon vertices.

Another object of this invention is to provide coupling structures with flanged composite cantilever springs members that exhibit a tensile strength and stiffness that is primarily governed by the transverse shear strength and tensile modulus property of a single ply composite structure made from parallel unidirected twines of helically configured continuous filament strands which are oriented approximately perpendicular to the direction of the cantilever spring deflection.

Another object of this invention is to provide a composite coupling structure that has a tensile strain and elongation governed principally by the thickness of a single ply of parallel twines of matrix-impregnated helically configured continuous filament strands.

The method and apparatus for making the flanged composite spring structure in the form of a desired coupled structure comprises producing a series of loops of twined first ply matrix-impregnated helically-configured strand cords, anchoring the loop ends to loop end anchor pins located at each extremity of a coupler forming structure, placing the first ply twined strand cords in parallel sequence upon the coupler forming structure so they are oriented longitudinally and parallel with the mandrel axis, placing a second ply of parallel matrix-impregnated twines of helically configured continuous filament strands upon the first ply twines to deflect the first ply twined filament strands into flange-forming cavities of the coupler forming structure, hardening the liquid matrix, slotting the composite structure to produce the desired flanged spring members, and removing the coupling structure from the coupling mandrel.

BRIEF DESCRIPTION OF THE DRAWINGS

FIG. 4 is similar to view of FIG. 3A except flanges are slotted.

FIG. 5 is a perspective view of the flanged spigot end of a tubular spring-lock coupling structure.

FIG. 6 is a perspective view illustrating partial insertion of a spigot end structure into the socket end of a mating spring-lock coupling structure.

FIG. 7 is a perspective view of a tubular spring-lock coupling structure connected to a mating spigot-end structure.

FIG. 8 is a half sectional view of a spring-lock coupling with two socket ends connecting pipe joint ends.

FIG. 9 is a perspective view of a double-socket spring-lock pipe coupling structure connected to a spigot-ended pipe fitting.

FIG. 10 is a half sectional perspective view of a structural sealing assembly between a tubular spigot end structure and the socket end of a double wall spring lock coupling structure.

FIG. 20 is a sectional perspective view of a channel shaped spring lock coupling structure with double-sided socket end.

FIG. 21 is a similar view of an I-beam shaped spring lock coupling structure with a double-sided socket end.

FIG. 22 is a partially fragmented sectional perspective view of an assembly of square tube spring lock coupling structures with double-sided socket ends.

FIG. 28 is a partially sectioned side elevation view of apparatus beginning the first cycle of a method to position loops of longitudinally oriented twines upon coupler forming apparatus.

FIG. 29 is a view similar to FIG. 28 but showing the apparatus completing the first cycle of operation.

FIG. 30 is a view similar to FIG. 28 but showing the apparatus beginning the return cycle of operation.

FIG. 31 is a view similar to FIG. 28 but showing the apparatus completing the return cycle of operation.

FIG. 32 is a half sectional perspective view of a segmented partially completed coupling structure made upon coupler forming apparatus.

FIG. 33 is a similar view of a pipe plug retaining type coupling structure made upon coupler forming apparatus.

FIG. 34 is a similar view exhibiting the operations depicted in FIGS. 26, 27, 28 and 29 but also showing power drive and cycle control apparatus.

FIG. 72 is a partially fragmented perspective view of a typical pressure-resistant cylindrical body member of a spigot-ended spring-lock coupling structure.

FIG. 72A is an enlarged view of the portion of the body member, taken within the circle 72A—72A in FIG. 72.

FIG. 73 is a fragmentary perspective view of a rectangular spring-lock coupling used as a clip.

FIG. 74 is a side elevation cross section view of the socket end of a spring-lock coupling structure having a solid body member cross section in the shape of a regular polygon.

FIGS. 74A and 74B are left and right end views of the coupling structure shown in FIG. 74 respectively.

FIG. 75 is a side elevation cross section view of the flanged spigot end of an elongated solid coupling structure body member.

FIG. 76 is a side elevation cross section view showing the connection of the spigot and socket ends of a coupling structure having an elongated solid body member.

FIG. 77 is a fragmentary partial cross section of a spring lock coupling structure configuration having a ring-shaped body member and an annular polygonal array of flanged composite cantilever springs retained by a polygonal-shaped lock sleeve to provide a coupling socket end which engages the spigot end of a composite cable structure.

EXAMPLE I

Figure 1A:
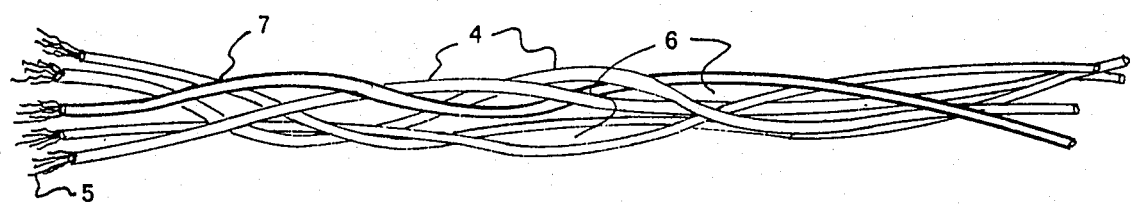
FIG. 1A is a perspective view of a single twine of helically configured continuous filament strands impregnated with a hardenable liquid matrix.
Figure 1B:
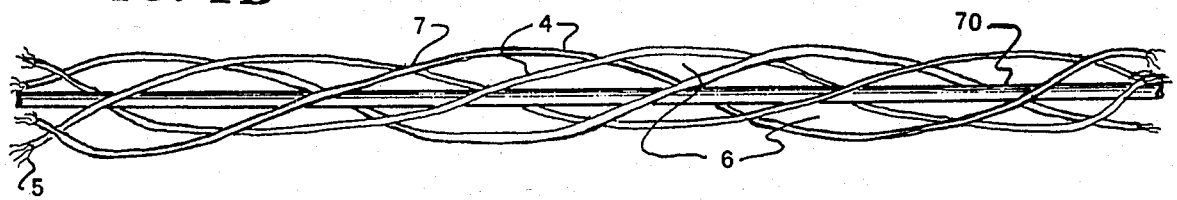
FIG. 1B is similar to FIG. 1A except the helically twined strands are shown configured about a central twine core.
Figure 2:
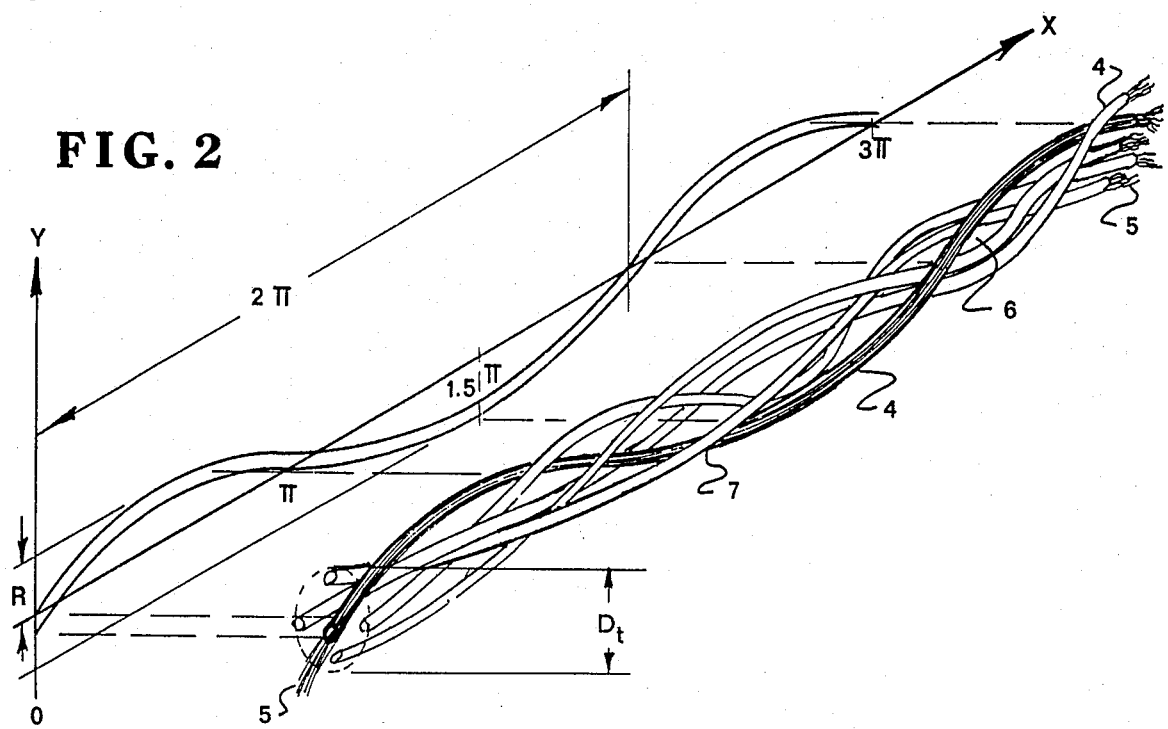
FIG. 2 is similar to the view of FIG. 1 but illustrates the parameters of a twine diameter and helical coil frequency of individual strands.

The preferred embodiment of the present invention involves making a composite structure from at least one twine comprising a multiple of unidirectional helically configured strands 4 which contain continuous filament reinforcements 5. FIG. 1A illustrates in enlarged perspective view a single twine 7 containing a multiple of helically configured strands 4 which contain continuous filament reinforcements 5 impregnated with a hardenable liquid matrix 6. FIG. 1B is a similar view but illustrating a twine construction configured about a twine core member 70 around which twined strands 4 are placed. FIG. 2 is intended to show that a side projection of any single helically configured strand 4 contained in a twine of strands employed in the present invention exhibits an approximate sinusoidal orientation when viewed on an imaginary plane parallel to the direction of the twine orientation. The generic term which most accurately describes composite ply structures made from twined strands is "Unidirected Sinusoidal Composite".

A single ply of parallel twines which comprise unidirected helically configured strands 4 containing numerous continuous filament reinforcements 5 provides greater flexural strength than a prior art composite ply of the same shape and section made from two or more thin laminates comprising unidirectional parallel untwisted strands of filament reinforcement. This is because the bending and flexural strength of prior art laminate plies is limited by the tensile and shear strength of the relatively weak matrix material used to bond together the individual layers. This invention teaches that twine-containing plies possess a stiffness and bending strength that is not governed by matrix properties but by the transverse shear strength and tensile strength provided by the material composition and helical configuration of the filament reinforcements comprising each twine.

Prior art unidirectional laminate plies are constructed from parallel collimated strands of filament reinforcement. Such plies when flexed or bent as spring members are limited in flexural strength by the tensile and shear strength of the matrix material which impregnates the filament reinforcements and bonds together the individual lamina or layers of collimated strands. Prior art composite spring structures are thus "matrix dependent" structures.

The helically configured arrangement of filament reinforcements comprising a composite ply of unidirectional twines of continuous filament strands overcomes prior art matrix-dependent limitations by increasing the stiffness and flexural strength of a composite ply having a given thickness. This improvement results from the contribution of the transverse shear strength of the filaments to overcome matrix strength limitations and better resist the shear stresses produced by bending forces applied to the composite ply. The transverse shear value, as determined by the ASTM D732-78 test method, is as much as seven times greater than the matrix interlaminar shear and tensile strength used to bond together a multiple-layer ply of laminates made from parallel unidirectional filament strands containing collimated filament reinforcements.

Figure 27:
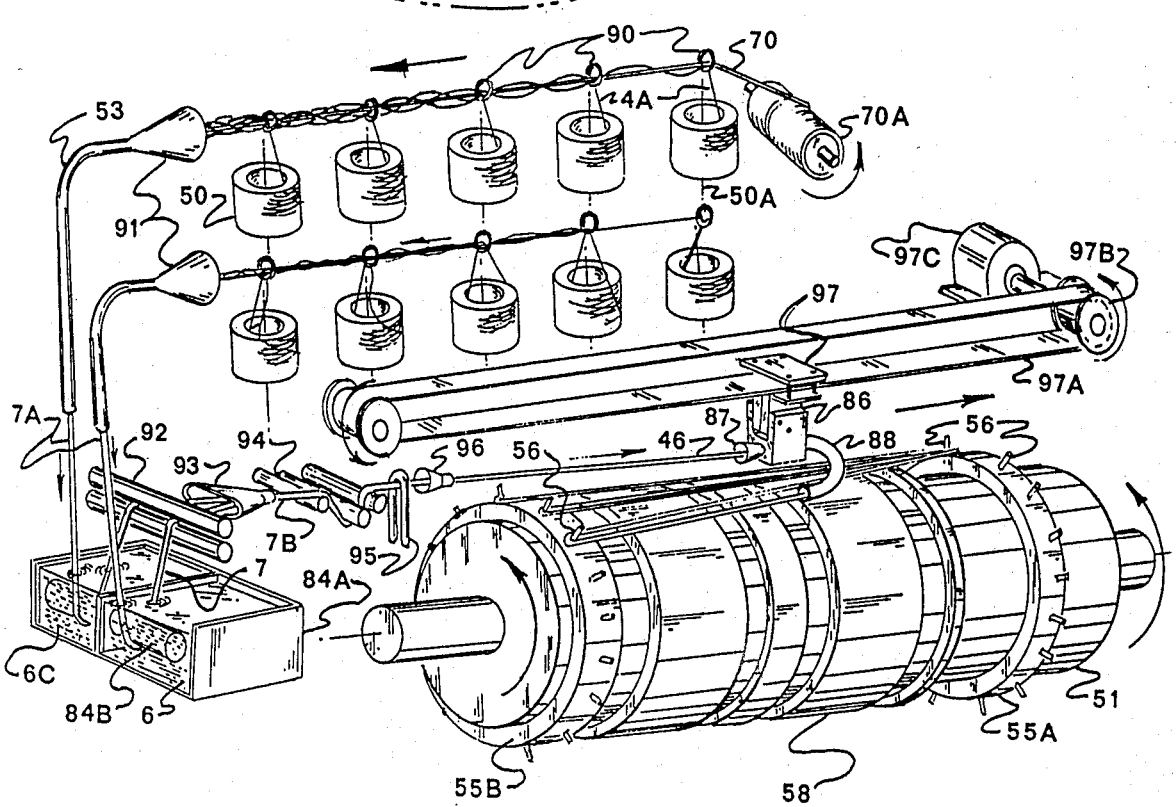
FIG. 27 is a schematic perspective view illustrating the method and apparatus for making, impregnating, placing and forming longitudinally oriented twines including coupler forming apparatus.
Figure 44:
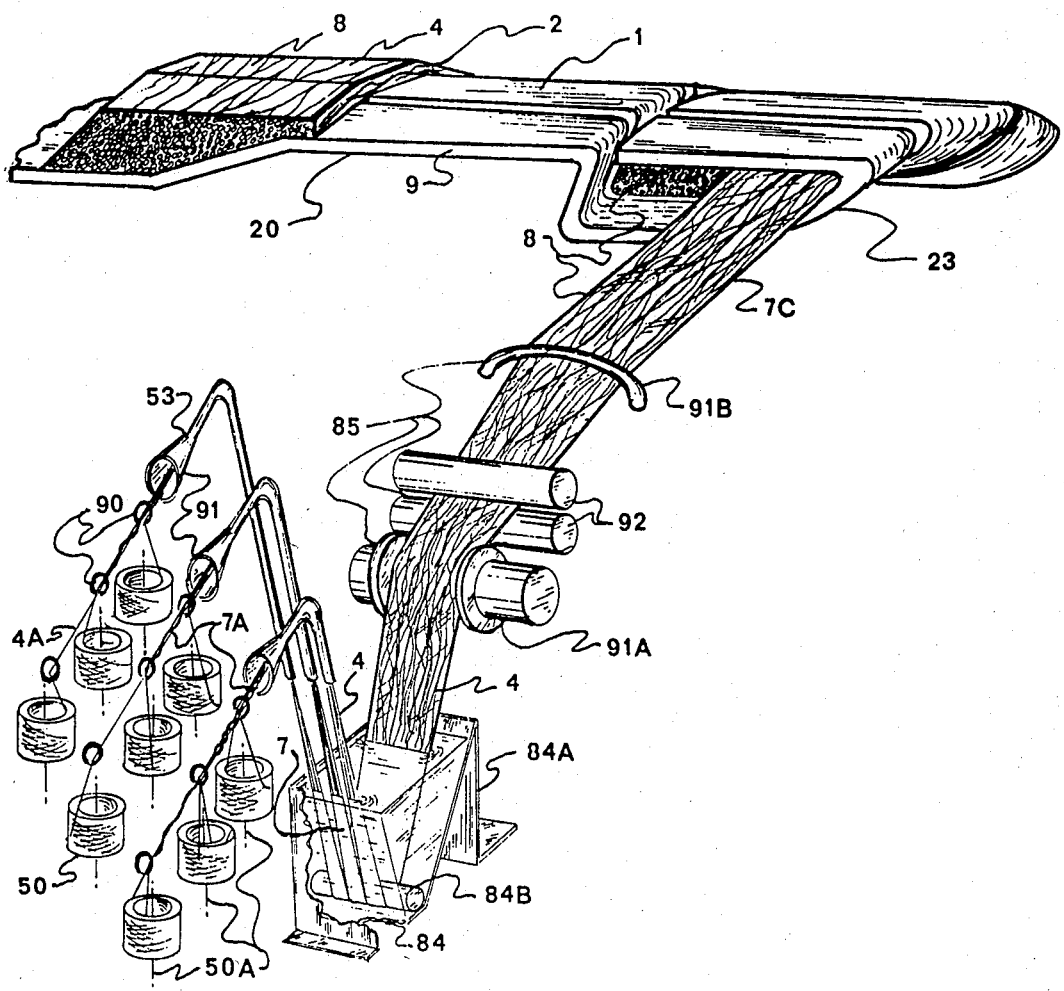
FIG. 44 is a fragmentary perspective view which schematically illustrates a method and apparatus for making, impregnating, flattening and placing circumferentially oriented twines.

The term "sinusoidal twined strand frequency" is introduced to define the orientation of filament reinforcements contained in the twines of continuous filament strands. The more turns or revolutions a strand makes per unit length of a twine of helically configured strands the higher the "sinusoidal twined strand frequency" and the greater the stiffness provided to a twine ply of given thickness. The transverse *tensile* strength of the composite ply material in a direction perpendicular to the general orientation of the twine of strands increases with the "sinusoidal twined strand frequency" to a value approaching the transverse shear strength of a unidirected composite laminate ply made from straight and parallel filament reinforcements similar to those used in the twined strand composite ply. The "sinusoidal twined strand frequency" shall hereafter in this patent specification be referred to as the "Twined Strand Frequency" and shall be designated by the symbol "$F_{tw}$" in mathematical formulas used in its determination. The "Twined Strand Frequency" is measured in "cycles per meter" which is meant to refer to the number of complete helical turns made by a single strand in a unit length of twine. FIGS. 27 and 44 schematically illustrate apparatus which may be used to make and impregnate dry twines 7A of helically configured strands 4. The "Twined Strand Frequency", "$F_{tw}$", is increased by increasing the number of untwined strands of continuous filament reinforcement 4A fed from strand packages 50 into the twine forming funnel tube apparatus 53. An untwined strand 4A of E glass filament roving having a yield of 500 meters per kilogram contains 3200 individual filaments 5, each filament having a diameter of 20 microns. This type of roving strand is 0.3 mm thick and 3 mm wide and produces a helical configuration to the strand when pulled axially from the center or outside of a cylindrical strand-wound package 50 in a direction parallel to the package axis 50A. A typical 18 kg center pull cylindrical roving package is 250 mm in diameter, 250 mm high and provides a "Center Pull Helical Frequency" (designated by the symbol "$F_{cp}$") of 4.4 cycles per meter which results from the strand making one helical twist per 227 mm of strand length as it is pulled axially from the strand package 50. The "TWINED STRAND FREQUENCY", "$F_{tw}$", can be calculated from the formula: $F_{tw}=N(F_{cp})$, where "N" is the number of strands contained in the twine. For example, a twine containing 9 strands having a CENTER PULL FREQUENCY, "$F_{cp}$" equal to 4.4 cycles per meter has a "Twined Strand Frequency" equal to 40 cycles per meter. The "Twined Strand Frequency" is useful in calculating the bending strength of a twine ply: the higher the Twined Strand Frequency the greater the twine ply bending strength for a given type of strand of filament reinforcements. The emprical formula from which the minimum thickness, "T", of a composite ply made from a single twine can be determined is: $T=t_s(N)^{\frac{1}{2}}$, where "$t_s$" is the thickness of an individual strand of filament reinforcements and "N" is the number of strands contained in the twine 7.

The highest stress region of a cantilever beam member subjected to bending is near the outer surface where the bending moment is greatest. These stresses are compression stresses on the concave surface portion of a flexed member and tensile stresses on the convex surface portion. Unfortunately prior art laminate plies used to make cantilever beam members are matrix dependent and for this reason delaminate when the inner ply tensile strength of the matrix material is reached. This occurs near the center of the cantilever beam where the transition from tensile to compressive stress occurs. Thus, the strength of the composite filament reinforcement material cannot be efficiently put to use. The helical arrangement of filament reinforcements comprising twines used to make such cantilever beams provides a way to increase the stiffness and bending strength of composite cantilever beams.

The standrard test method for determining flexural properties of composite materials is the ASTM D790 test method. The flexural strength from this test method is equal to the maximum stress is the outer ply material at the moment of break. This strength is governed by the ASTM flexural test formula: $S=3PL/2Bd^2$ where "S" is the stress in outer fibers at midspan, measured in Megapascals (MPa), "P" is the load at a given point on the load deflection curve, measured in Newtons (N), "L" is the length of the support span measured in millimeters (mm), and "d" is the depth of the beam tested (mm). To compare the increased flexural strength attainable from the helical arrangement of filament reinforcements contained in a composite twine ply, flexural tests were made of two composite beams. One beam was made from a conventional prior art type ten ply laminate having all unidirected glass filament reinforcements oriented in the direction of the span. A thermosetting polyester resin was used as the matrix material. A second beam was made from a single twine of 32 strands of glass roving having a yield of 500 m/kg and a center pull frequency "$F_{cp}$" of 4.4 cycles/meter. The twine composite beam was characterized as being made from a twine having a "Twined Strand Frequency", "$F_{tw}$" equal to $N \times F_{cp}=32 \times 4.4=141$ cycles/meter. Each beam had a thickness, "d", equal to 5 mm, a width, "b", equal to 10 mm, and a length of 100 mm. A support span, "L" of 80 mm was used with each beam specimen supported on 15 mm diameter polished steel supports and a loading nose radius of 20 mm. ASTM D790 Method I was employed using a cross head motion of 2.0 mm/min.

The conventional prior art type laminate beam failed at a load of 37.1 KN (8330 lb) and exhibited a stress of 17.8 MPa (2580 PSI) at failure which occurred as a delamination between two inner plies.

The beam made from a twine of 32 strands resisted a load nearly four times greater than that resisted by the prior art type beam. A slight fracture was produced at a load of 138 KN (31,000 lb) on the concave side of the twine beam. The flexural stress when this occurred was 66 MPa (9604 PSI). The twine beam remained intact however and was capable of resisting additional load.

Each ply comprising the composite coupling structures of the present invention is made from one or more of the "twines", previously described and illustrated in FIGS. 1A and 1B., which are generally oriented approximately parallel and adjacent to each other.

Table I illustrates the fact that the average strength of a continuous filament reinforcement 5 decreases as it is collected first into a single strand 4A and subsequently as a twine of helically configured strands 7. Table I further discloses the recommended design values of a composite ply of longitudinally oriented twines, termed "LONGOS", and a composite ply of circumferentially oriented twines, termed "CIRCS", such as those used in preferred embodiments of the present invention.

proximately 20% of the twine ply maximum tensile strength as the allowable design strength of the composite twine ply material. The composite twine material properties presented in Table II are those of twine ply composite material with a filament reinforcement volume of approximately 46% and a "TWINED STRAND FREQUENCY" in the range of 10 to 100 cycles/meter.

TABLE I

PROPERTIES OF GLASS FILAMENTS, STRANDS AND COMPOSITE TWINES

| | TENSILE STRENGTH ($\sigma$) | | TENSILE MODULUS (E) | | STRAIN ($\epsilon$) | AVG. DENSITY ($\rho$) | | SINGLE STRAND CROSS SECTION | |
|---|---|---|---|---|---|---|---|---|---|
| | GN/m$^2$ | PSI | GN/m$^2$ | PSI | % | gm/cc | #/cu in | mm$^2$ | in$^2$ |
| SINGLE FILAMENT PROPERTIES OF E GLASS (20 MICRON DIAMETER) | 1.71 | 247,500 | 72.4 | 10.5 × 10$^6$ | 2.4 | 2.52 | 0.091 | 2.7 × 10$^{-4}$ | 4.25 × 10$^{-7}$ |
| SINGLE STRAND OF 3200 DRY GLASS FILAMENTS | 1.28 | 185,000 | 53.46 | 7.74 × 10$^6$ | 2.4 | 2.52 | 0.091 | 0.877 | .00136 |
| SINGLE STRAND OF 3200 MATRIX IMPREGNATED GLASS FILAMENTS | 1.15 | 167,000 | 29.02 | 4.21 × 10$^6$ | 4.0 | 1.91 | 0.069 | 1.61 | .0025 |
| SINGLE TWINE OF 20 HELICALLY CONFIGURED STRANDS (3200 FILAMENTS PER STRAND) | 0.86 | 125,200 | 24.2 | 3.51 × 10$^6$ | 3.6 | 1.77 | 0.064 | 1.94 | .0030 |
| DESIGN VALUES OF A COMPOSITE CIRC PLY MADE FROM CIRCUMFERENTIAL TWINES | 0.12 | 18,000 | 24.2 | 3.51 × 10$^6$ | 0.51 | 1.77 | 0.064 | 1.94 | .0030 |
| DESIGN VALUES OF A COMPOSITE LONGO PLY MADE FROM PARALLEL LONGITUDINAL TWINES | 0.10 | 15,000 | 24.2 | 3.51 × 10$^6$ | 0.43 | 1.77 | 0.064 | 1.94 | .0030 |

EXAMPLE II

Another preferred embodiment of this invention is to make a composite structure form at least one ply of parallel twines.

Table II presents the properties of unidirected composite ply made from parallel twine of helically configured roving strands having a yield ranging from 200 to 500 m/kg and containing continuous filaments of E-glass impregnated with a thermosetting polyester resin matrix. As may be noted from Table II the transverse shear strength of a twine ply composite material is approximately a fourth the maximum tensile strength. The design practice employed in preferred embodiments of the present invention is to use approximately 50% of the twine ply maximum transverse shear strength and ap- Table III presents the strength characteristics and design parameters of twines employed in making a first ply of a composite structure representing a preferred embodiment of the present invention. The first ply of a multiple ply embodiment is made from a series of loops of twine cords 7B placed parallel and adjacent to each other and oriented longitudinally upon a forming mandrel having opposing rows of twine loop anchor pins. The spacing of the loop end anchor pins govern the selection of the number of strands per twine cord as well as control the finished ply thickness of the pair of looped twine cords secured by and placed between adjacent anchor pins.

TABLE II

PROPERTIES OF A SINGLE COMPOSITE PLY OF PARALLEL UNIDIRECTED TWINES

| | METRIC VALUES | ENGLISH VALUES |
|---|---|---|
| LONGITUDINAL TENSILE STRENGTH (ASTM D638) | 0.86 GN/m$^2$ | 125,200 PSI |
| LONGITUDINAL TENSILE MODULUS (ASTM D638) | 24.2 GN/m$^2$ | 3.51 × 10$^6$ PSI |
| LONGITUDINAL TENSILE STRAIN (ASTM D638) | 3.6% | 0.036 IN/IN |
| LONGITUDINAL COMPRESSIVE STRENGTH (ASTM D695) | 0.345 GN/m$^2$ | 50,000 PSI |
| LONGITUDINAL COMPRESSIVE MODULUS (ASTM D695) | 24.2 GN/m$^2$ | 3.51 × 10$^6$ PSI |
| LONGITUDINAL COMPRESSIVE STRAIN (ASTM D695) | 1.4% | 0.014 IN/IN |
| TRANSVERSE TENSILE STRENGTH (ASTM D638) | 0.103 GN/m$^2$ | 15,000 PSI |
| TRANSVERSE TENSILE MODULUS (ASTM D638) | 10.3 GN/m$^2$ | 1.5 × 10$^6$ PSI |
| TRANSVERSE TENSILE STRAIN (ASTM D638) | 1.0% | 0.01 IN/IN |
| TRANSVERSE COMPRESSIVE STRENGTH (ASTM D695) | 0.138 GN/m$^2$ | 20,000 PSI |
| TRANSVERSE COMPRESSIVE MODULUS (ASTM D695) | 8.27 GN/m$^2$ | 1.2 × 10$^6$ PSI |
| TRANSVERSE COMPRESSIVE STRAIN (ASTM D695) | 1.6% | 0.0166 IN/IN |
| TRANSVERSE SHEAR STRENGTH (ASTM D732) | 0.227 GN/m$^2$ | 33,000 PSI |
| TRANSVERSE SHEAR MODULUS (ASTM D747) | 24.2 GN/m$^2$ | 3.51 × 10$^6$ PSI |
| TRANSVERSE SHEAR STRAIN (ASTM D747) | 0.9% | 0.009 IN/IN |
| MATRIX TENSILE STRENGTH (ASTM D638) | 0.09 GN/m$^2$ | 13,000 PSI |
| MATRIX TENSILE MODULUS (ASTM D638) | 2.41 GN/m$^2$ | 0.35 × 10$^6$ PSI |
| LONGITUDINAL POISSON'S RATIO (ASTM D638) | 0.25 | 0.25 |
| LONGITUDINAL COEF. OF LINEAR | 11 × 10$^{-6}$ cm/cm/°C. | 11 × 10$^{-6}$ IN/IN/°C. |

TABLE II-continued

PROPERTIES OF A SINGLE COMPOSITE PLY OF PARALLEL UNIDIRECTED TWINES

|  | METRIC VALUES | ENGLISH VALUES |
|---|---|---|
| THERMAL EXPANSION (ASTM D696) TRANSVERSE COEF. OF LINEAR THERMAL EXPANSION (ASTM D696) | $55 \times 10^{-6}$ cm/cm/°C. | $55 \times 10^{-6}$ IN/IN/°C. |

NOTES:
1. EACH TWINED STRAND EXHIBITS A YIELD RANGING FROM 200 TO 500 M/KG AND A "CENTER PULL FREQUENCY" RANGING FROM 4 TO 5 CYCLES PER METER.
2. TWINES COMPRISE 3 TO 25 STRANDS OF HELICALLY CONFIGURED E-GLASS FILAMENT REINFORCEMENTS IMPREGNATED WITH THERMOSETTING POLYESTER RESIN MATRIX, A FILAMENT VOLUME FRACTION = 46%, AND A "TWINED STRAND FREQUENCY" FROM 10 TO 100 CYCLES PER METER.

TABLE III

TWINE PLY DESIGN PARAMETERS

| NUMBER STRANDS PER TWINE | TWINE PLY DESIGN STRENGTH kN (lb) | TWINE PLY C.S.A. (SQ IN) 1 mm² = .00155 SQ IN mm² (IN²) | TWINE PLY AVG. DIA. mm (IN) .0394 mm/IN | PIN SPACING (2 CORDS PER PIN) mm (IN) | FLATTENED TWINE PLY THICKNESS mm (IN) |
|---|---|---|---|---|---|
| 5 | 1 (225) | 8 (.0125) | 3.2 (.13) | 16 (.63) | 1.0 (.039) |
| 10 | 2 (450) | 16 (.025) | 4.5 (.18) | 16 (.63) | 2.0 (.08) |
| 15 | 3 (675) | 24 (.0375) | 5.6 (.22) | 16 (.63) | 3.0 (.12) |
| 20 | 4 (900) | 32 (.050) | 6.4 (.25) | 16 (.63) | 4.0 (.16) |
| 25 | 5 (1125) | 40 (.062) | 7.1 (.28) | 16 (.63) | 5.0 (.20) |
| 30 | 6 (1350) | 48 (.075) | 7.8 (.31) | 16 (.63) | 6.0 (.24) |
| 40 | 8 (1800) | 65 (.100) | 9.1 (.36) | 18 (.72) | 7.0 (.28) |
| 50 | 10 (2250) | 81 (.125) | 10.1 (.40) | 20 (.80) | 7.9 (.31) |
| 60 | 12 (2700) | 97 (.150) | 11.1 (.44) | 22 (.88) | 8.6 (.34) |
| 75 | 15 (3375) | 121 (.188) | 12.4 (.49) | 28 (1.1) | 8.6 (.34) |
| 100 | 20 (4500) | 161 (.250) | 14.3 (.56) | 35 (1.4) | 9.0 (.36) |
| 125 | 25 (5625) | 202 (.313) | 16.0 (.63) | 40 (1.6) | 10.0 (.39) |
| 150 | 30 (6750) | 242 (.375) | 17.6 (.69) | 48 (1.9) | 10.0 (.39) |
| 200 | 40 (9000) | 322 (.500) | 20.2 (.80) | 51 (2.0) | 12.7 (.50) |
| 250 | 50 (11250) | 403 (.625) | 23.3 (.92) | 51 (2.0) | 15.9 (.625) |
| 300 | 60 (13500) | 484 (.750) | 24.8 (.98) | 51 (2.0) | 19.0 (.750) |

EXAMPLE III

Figure 43:
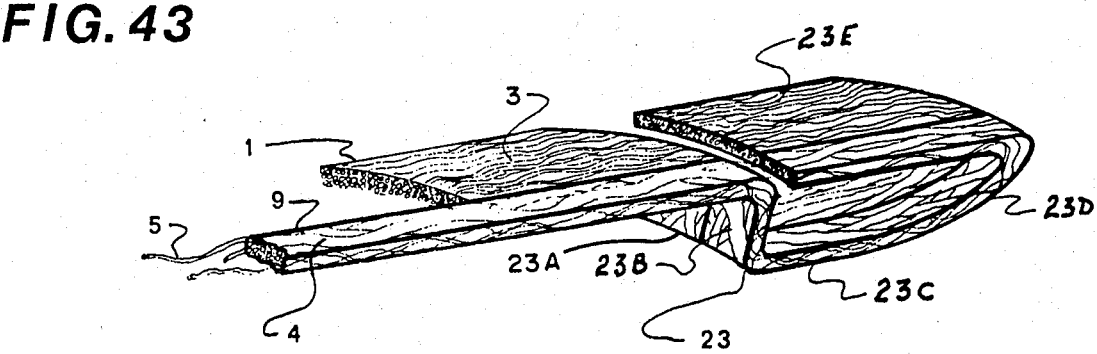
FIG. 43 is a perspctive view depicting twined strands of filament reinforcement bonded to form a first ply and configured as the flanged spring member of a spring lock coupling structure.
Figure 56:
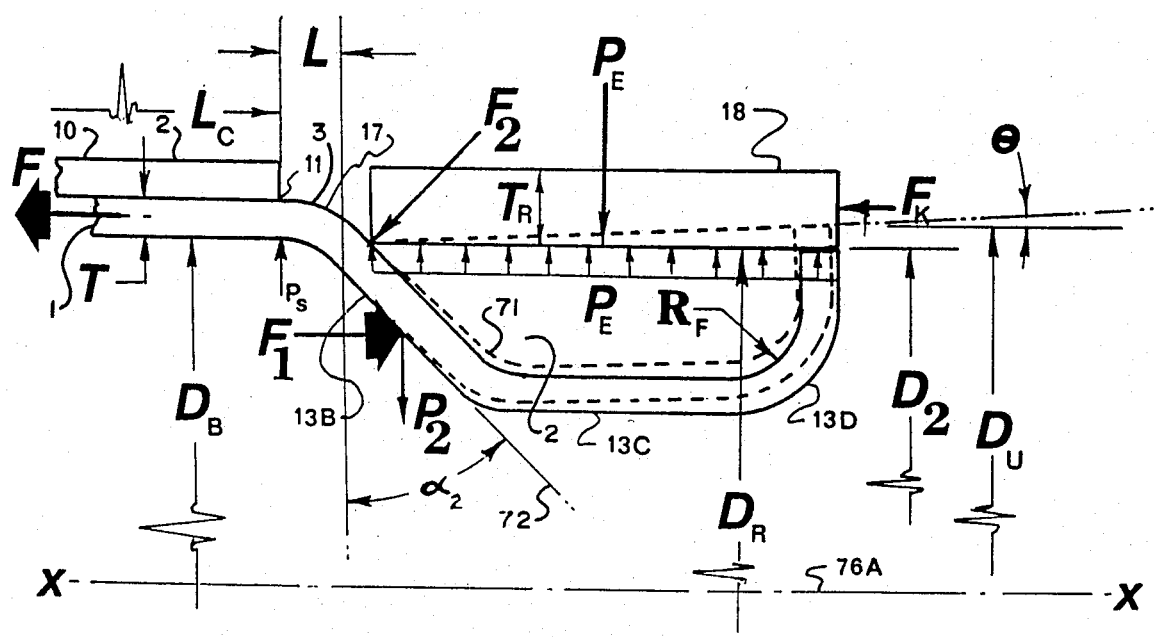
FIG. 56 is a cross-sectional dimensional view of an extremity of a segmented composite coupling structure body member showing the coupling first ply extremity configured as the flange member of a cantilever spring which deflects about a curved hinge line when compressed by an encircling retaining sleeve.
Figure 66:
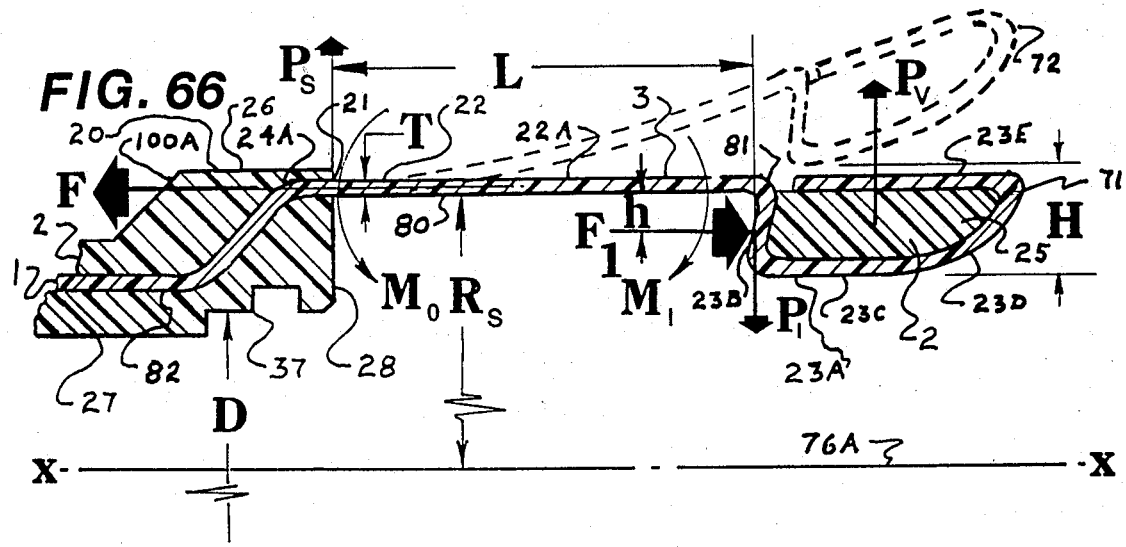
FIG. 66 is a cross sectional side elevation dimensional view of the coupling structure shown in FIGS. 45 and 46 bu showing the principal load vectors and dimensions associated with the behavior of a single flanged cantilever spring member.
Figure 67:
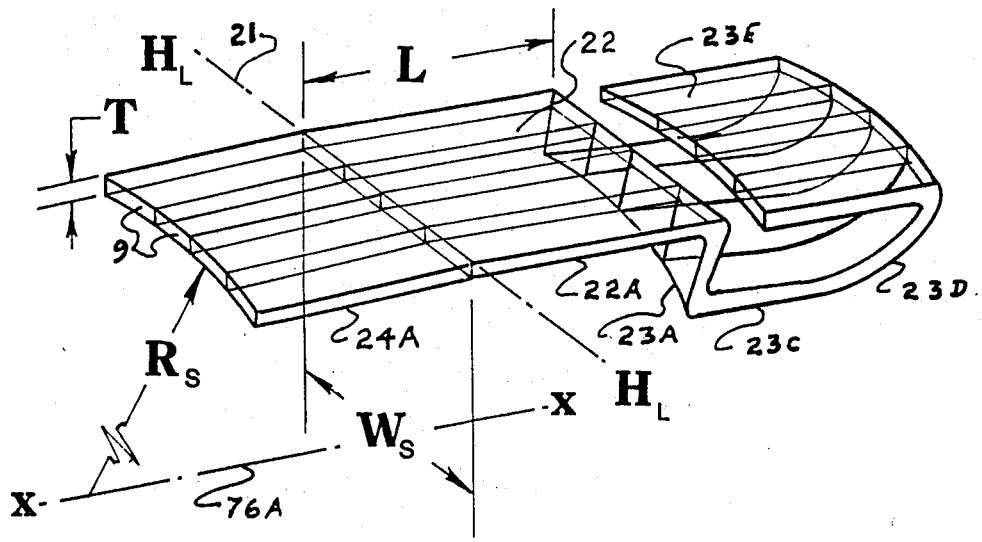
FIG. 67 is an idealized perspective view showing only the first ply extremity of the cylindrical body member of a spring lock coupling structure so as to display the parallel alignment of the twined strand cords which are configured to provide the flanged cantilever spring member which deflects about a straight hinge line.
Figure 68:
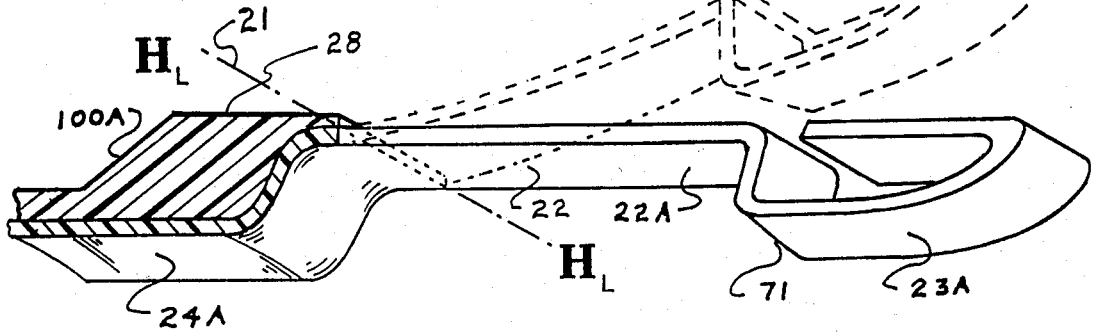
FIG. 68 is an idealized perspective view showing the position of body, spring and flange members of a spring lock coupling structure when deflected about the straight spring hinge line.

FIGS. 56 and 66 illustrate another preferred embodiment of this invention and exhibit how two or more plies of unidirected parallel twines can be configured to provide flanged composite cantilever springs which can be used in the construction of mechanical coupling structures which facilitate coupling operation and resist shear and tensile stresses when subjected to coupling loads. As illustrated in FIGS. 56 and 66 a first ply twine 1 having a thickness "T" at the hinge line "$H_L$" is configured to provide a flanged composite cantilever spring 3. A second ply twine 2 provides a constituent of the coupling structure flange and body member. It should be noticed that the coupling configuration shown in FIG. 56 is characterized by a short curved cantilever spring member 17 which is more fully described in FIG. 57. The curved spring hinge line 11 characterizes the flanged curved composite spring member of a segmented semi-circular coupling structure 10. As illustrated in FIG. 56 the coupling structure 10 resists a coupling tensile load "F" only when the semi-circular flange member 14 is in a deflected position 72. The coupling structure shown in FIG. 66 is characterized by a long flanged flat cantilever spring member 22 which resists a tensile coupling load "F" while in a non-deflected position 71 and which is characterized by a straight spring hinge line 21 such as illustrated in FIGS. 67 and 68. FIG. 43 is a perspective illustration showing the configuration of the first ply constituents of a typical flanged cantilever spring member 3 comprising the socket end of a tubular spring-lock coupling structure. The first ply 1 of the flanged spring member 3 comprises parallel longitudinal twines 9 consisting of helically configured strands 4 containing helically configured filament reinforcements 5.

FIG. 66 illustrates a spring-lock coupling structure 20 comprising a first ply flanged cantilever spring member 22 that deflects about a straight hinge line 21 at the extremity of a coupling structure body member 28 and serves as a deflectable socket end coupling structure comprising a first ply flat cantilever spring member 22A and a cylindrical-segment shaped flange member 23A having a flange load face 23B, a flange base member 23C, a flange heel member 23D, a flange heel cap extremity 23E and a second ply flange member constituent 25.

EXAMPLE IV

FIGS. 4, 8, 9, 10, 11, 12, 13, 19, 20, 21, 22, 45, 46, 47, 48, 49, 73, 74, 77, 78 and 82 illustrate various coupling structures that teach a preferred embodiment of this invention and which are hereafter referred to in this specification as the SPRING-LOCK" type of coupling structure 20.

Figure 45:
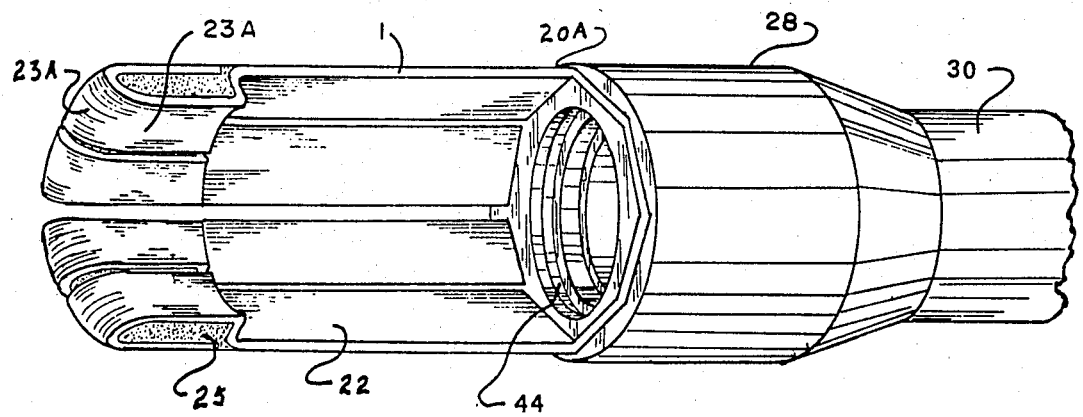
FIG. 45 is a partially sectioned perspective view of the polygon section socket end of a spring lock pressure coupling.
Figure 46:
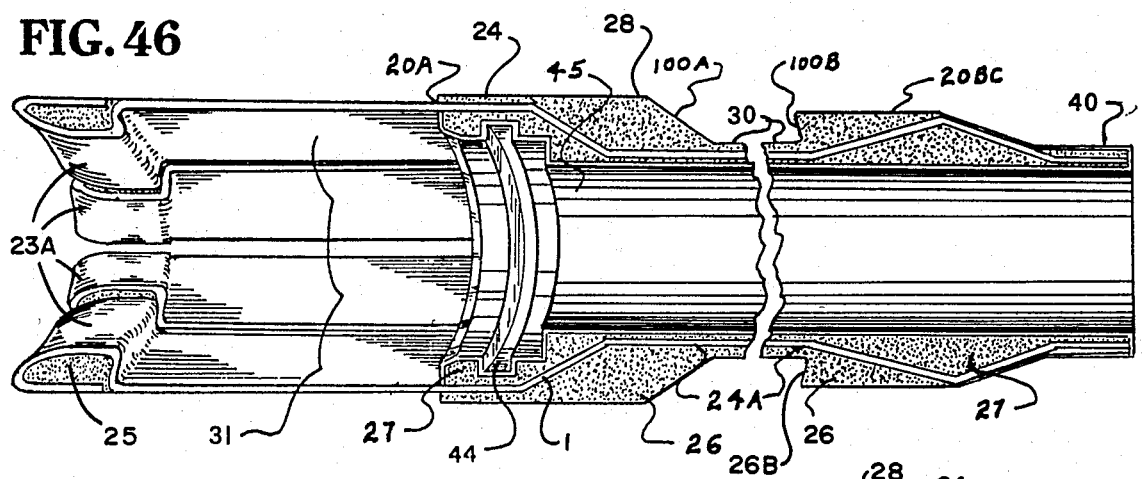
FIG. 46 is a cross sectioned side elevational perspective view of a spring lock coupler having a socket end similar to that of FIG. 45 but showing the coupling structure with a mating flanged spigot end.
Figure 47:
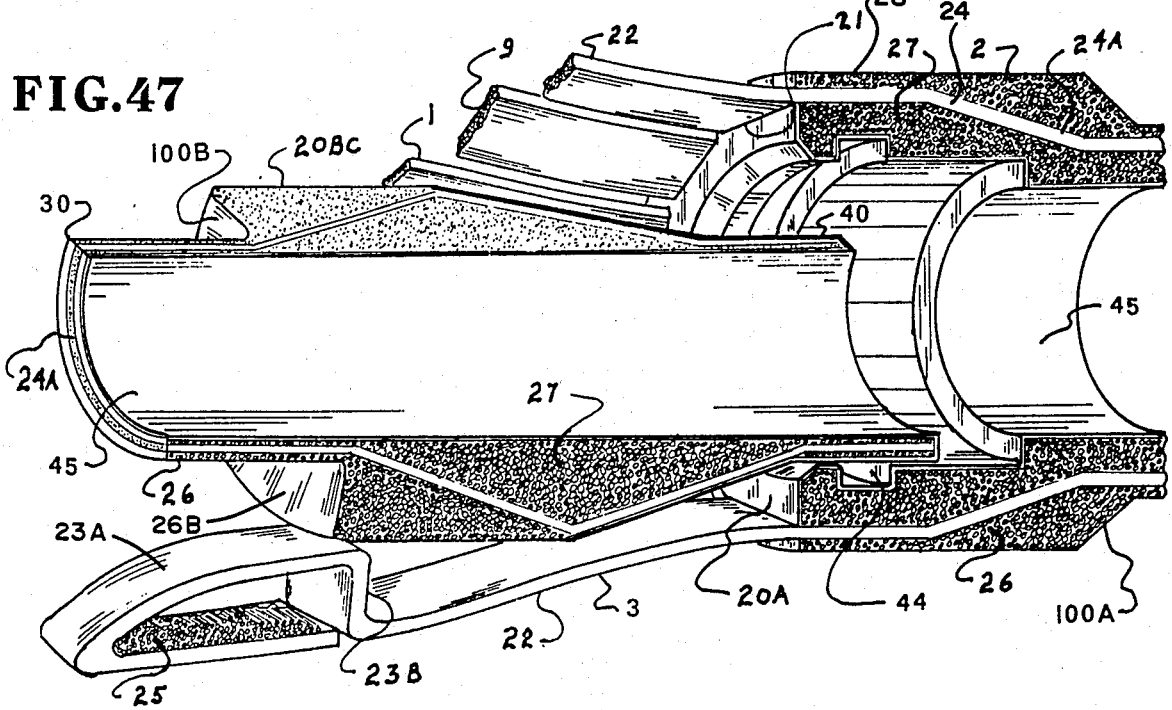
FIG. 47 is an enlarged fragmentary sectioned perspective view of a mating spigot end partially inserted into the sealing socket end of a spring lock pressure coupling.

FIG. 4 is a perspective view of the socket end 20A of a spring-lock coupling structure of the type illustrated in a perspective sectional view in FIGS. 45, 46 and 47. As shown in these views the socket end of the spring-lock coupling structure comprises a polygonal array of cantilever flat spring members 31 constructed as a first ply extremity of a cylindrical coupling structure body member 30. FIGS. 46 and 47 illustrate the seal-containing socket-end configuration 44 of the coupling structure third ply body member 27 as well as the spigot end of a cylindrical body member 20BC comprising a cylindrical sealing surface 40 and a cylindrical bevelled flange 100B constructed from the second ply coupling body member constitutent 26 to provide a spigot end body member load face 26B. As shown in FIGS. 46 and 47 a first ply structure 1 comprises longitudinally oriented twines 9 configured to provide a first ply flange member having a cylindrical interior surface 23A and illustrated in FIG. 43, a flange load face 23B, a flange base member 23C, a flange heel member 23D and a flange cap 23E. The first ply 1 also comprises a flat cantilever spring member 22A and a cylindrical first ply body member 24A. A second ply 2 is constructed upon the first ply to provide a second ply flange constituent 25 and a seond ply body member constituent 26. The coupling first ply body member 24 is constructed upon a third ply body member constituent 27 which in turn is constructed upon an impermeable inner liner member 45.

Figure 11:
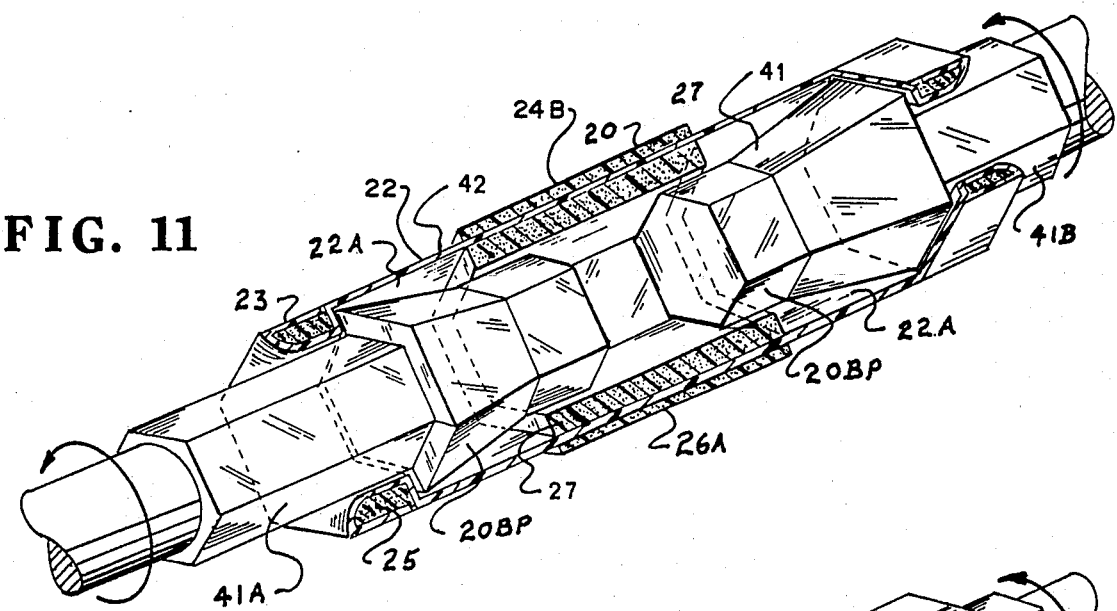
FIG. 11 is a partially sectioned side elevation view of a double-socket torque-resisting spring lock coupling structure.
Figure 12:
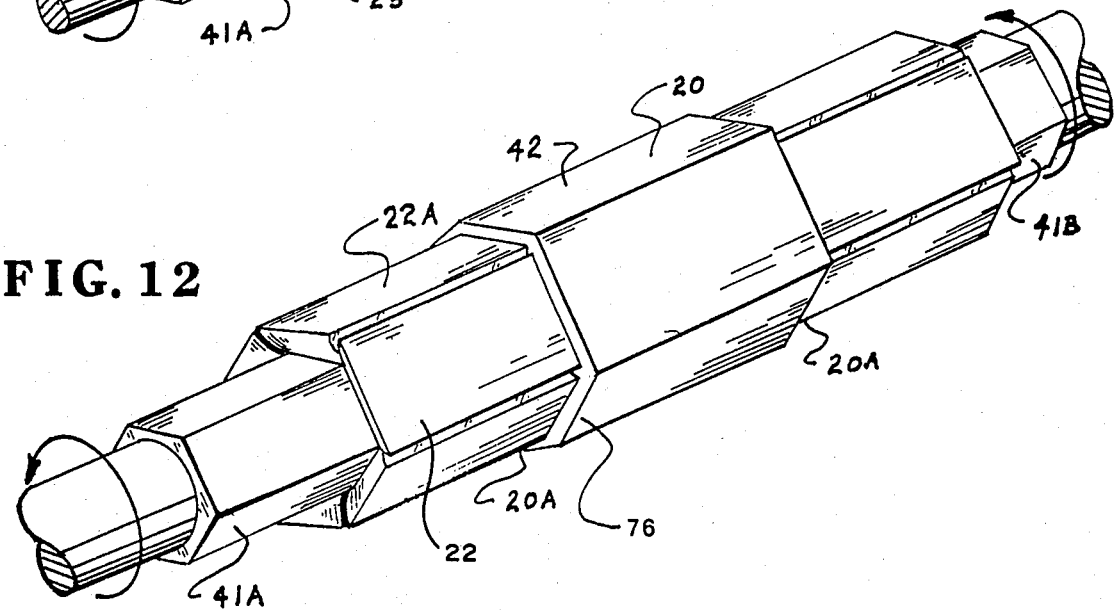
FIG. 12 is a perspective view of the torque-resisting coupling structure of FIG. 11 connecting a powered shaft to a driven shaft.
Figure 13:
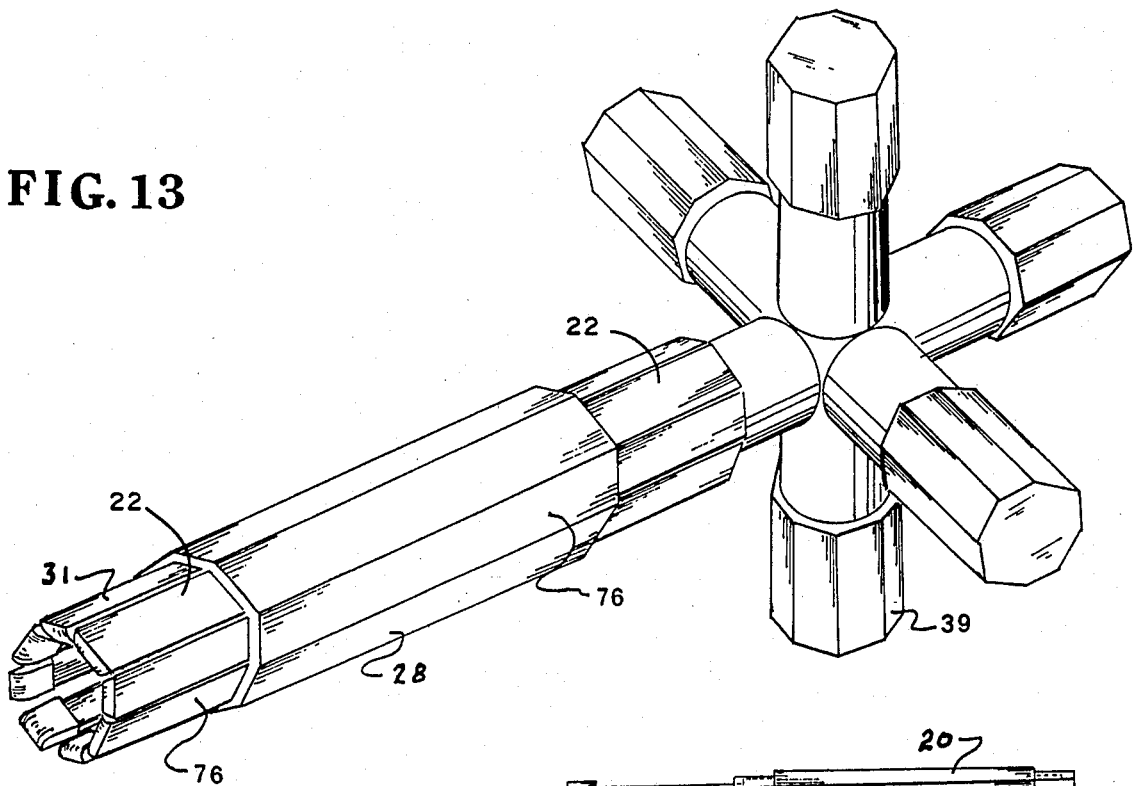
FIG. 13 is a perspective view of a double-socket spring lock coupling structure connected to a joint structure having a multiple of mating spigot ends.
Figure 14:
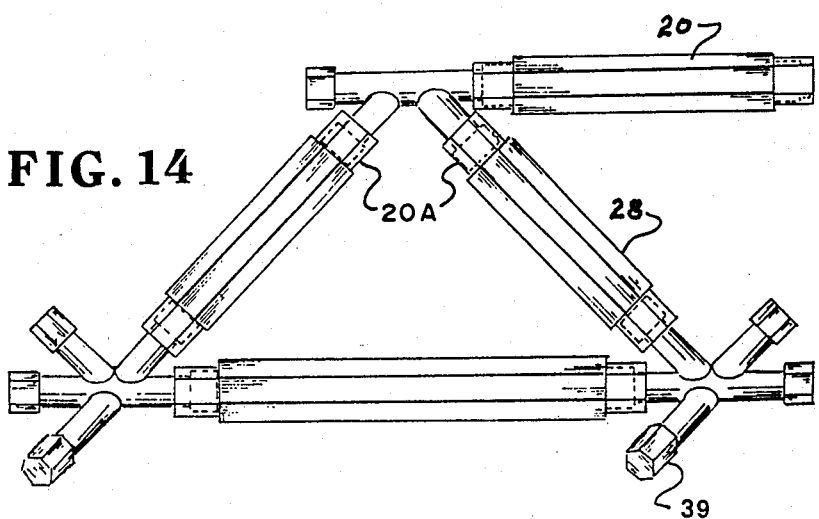
FIG. 14 is a perspective view of a structural truss made from an assembly of socket-ended spring lock coupling structures and spigot-ended joints.
Figure 15:
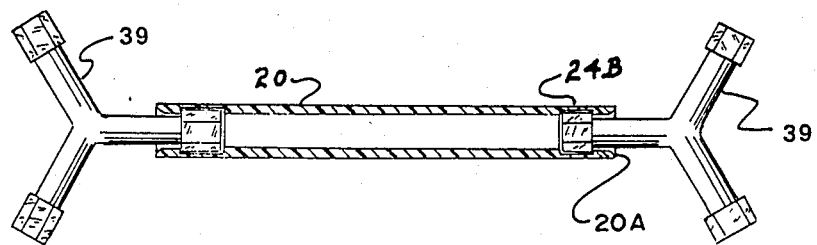
FIG. 15 is a partially sectioned side elevational view of a structural assembly made from a double-socket spring lock coupling structure connected to joint structures having a multiple of spigot ends.

FIGS. 8, 9, 11, 12, 13, 14 and 15 illustrate spring-lock coupling structures having a pair of opposing socket ends 20A consisting of a polygonal array of flat flanged cantilever spring members 22. The spring-lock coupler shown in cross section in FIG. 8 is used to join flanged-end pipe 29 each of which have an annular socket-end sealing recess 35 which accept a cylindrical spigot ring structure 37 with annular seal grooves containing a compressible seal 38. An elongated version of this coupling is shown in FIGS. 13, 14 and 15 as a truss member used to connect flanged truss joints comprising spigot-end fittings 39. An elongated version of the coupling structure shown in FIG. 8 is also shown in FIGS. 11 and 12 as a torque resisting socket end coupling structure 42 able to connect two rotating polygon-shaped spigot end members 41 having polygon-shaped spigot ends 20BP such as a powered spigot end shaft 41A and a driven spigot shaft 41B.

FIG. 10 is an enlarged cross section showing the construction of one end of a pressure seal coupling structure such as shown in FIG. 9 used to connect and seal spigot end pressure fittings 20BC. FIG. 10 further illustrates the socket end of a double wall tubular spring-lock coupling structure 20A and its engagement with a mating spigot end composite structure 20BC to provide a pressure seal and physical connection between the two structures. The inner liner 45 provides an impermeable membrane able to resist internal pressure. Longitudinally directed twines 9 comprise the first ply polygon section body member 24B, the first ply cantilever spring member 22A and the first ply flange member 23 as well as the fourth ply body member 48. Circumferentially directed twines 8 comprise the second ply polygon section body member 26A and the second ply flange member 25 as well as the third ply body member 27 and the fifth ply body member 49. Cellular material such as rigid foam comprises the structural material 43 used to separate the inner and outer walls of the double wall spring-lock coupling structure.

Figure 48:
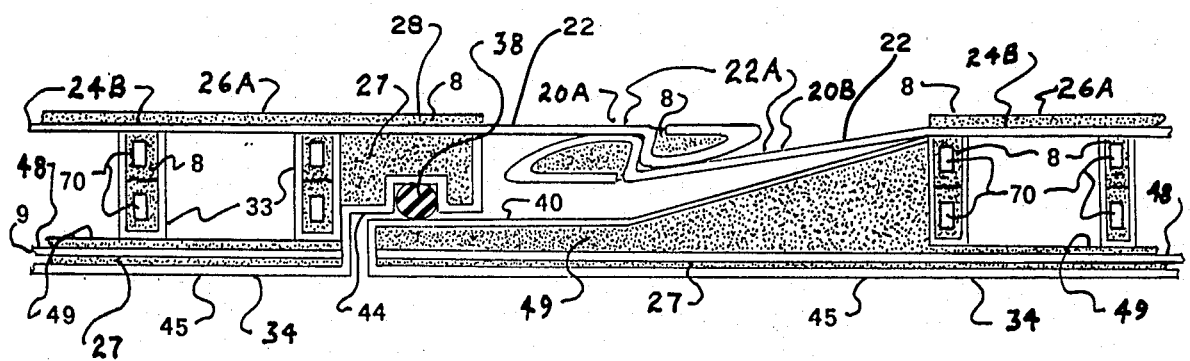
FIG. 48 is a half section side elevational view of a ribbed double wall spring lock pressure coupling having outwardly flanged segmented spring members which provide the flanged spigot which couples with the opposite socket end of an identical double wall spring lock pressure coupling.

FIG. 48 shows in cross section another double wall configuration of the spring-lock coupling which can be used to make flat panels as well as composite tubular structures able to be rapidly connected. The spring-lock coupling configuration shown in FIG. 48 employs deflectable flanged flat cantilever composite spring members 22 as both the spigot end of a spring-lock coupling structure 20B and the socket end of a spring-lock coupling structure 20A. FIG. 48 is a cross section of a double wall spring-lock coupling structure which has one side smooth and flush and sealed by means of a compressible elastomeric seal 38 contained within a grooved portion of the third ply body member 44. When constructed as a tubular body member having the cross section shown in FIG. 48 the inner cylindrical body structure comprises an impermeable liner 45, a fifth ply body member 49, a fourth ply body member 48 comprising longitudinally oriented twines 9 and a third ply body member 27 comprising circumferentially oriented twines 8. The outer body structure has a regular polygon configuration 76 and is a second ply polygonal body member 26A constructed upon a first ply polygonal body member 24B which is supported by polygon-shaped annular composite ribs 33 made from circumferentially oriented twines that contain a twine core 70.

Figure 49:
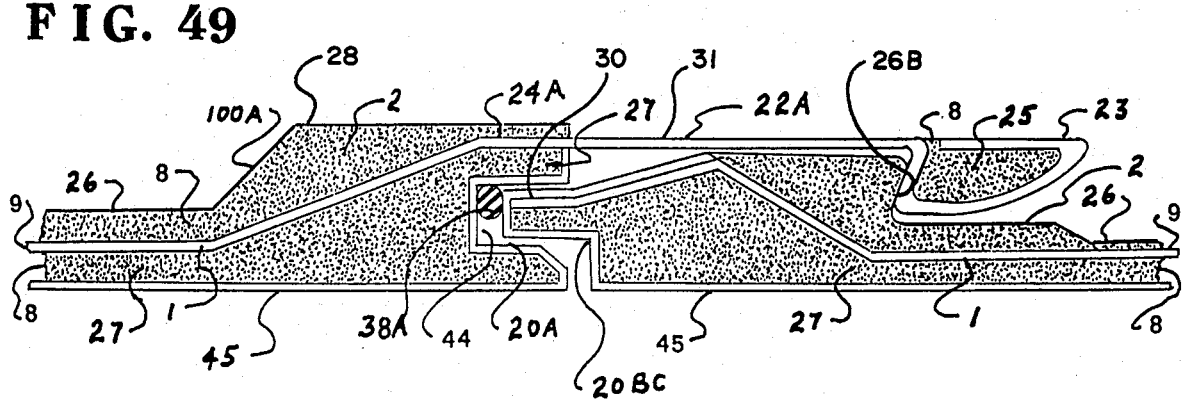
FIG. 49 is a view similar to FIG. 48 illustrating a seal-containing spring lock pressure coupling connected to the spigot end of a mating pipe or fitting.

FIG. 49 is a cross section of the mating ends of a spring-lock coupling structure having a polygonal shaped spigot flange engaging a polygonal array of flat cantilever socket-end spring members 31 and sealing a cylindrical coupling body member 30 having mating cylindrical spigot and socket end body member extremities which provide a pressure seal 38A between the two body members. FIG. 72 illustrates additional construction details of pressure-containing cylindrical coupling body members such as shown in FIG. 49.

FIGS. 16, 17, 18, 19, 20, 21 and 22 exhibit flat panel configurations of spring-lock coupling structures which comprise flat flanged composite spring members 22.

Figure 16:
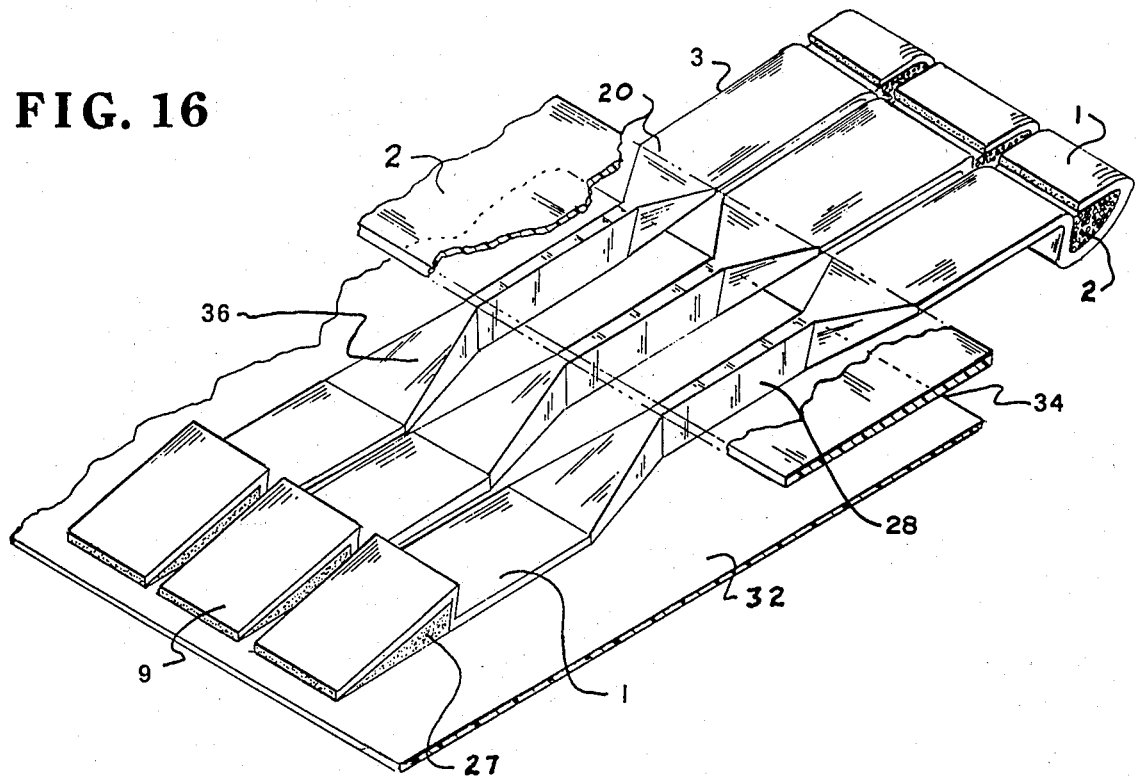
FIG. 16 is a partially-sectioned perspective view of a flat ribbed double wall spring lock coupling structure.
Figure 17:
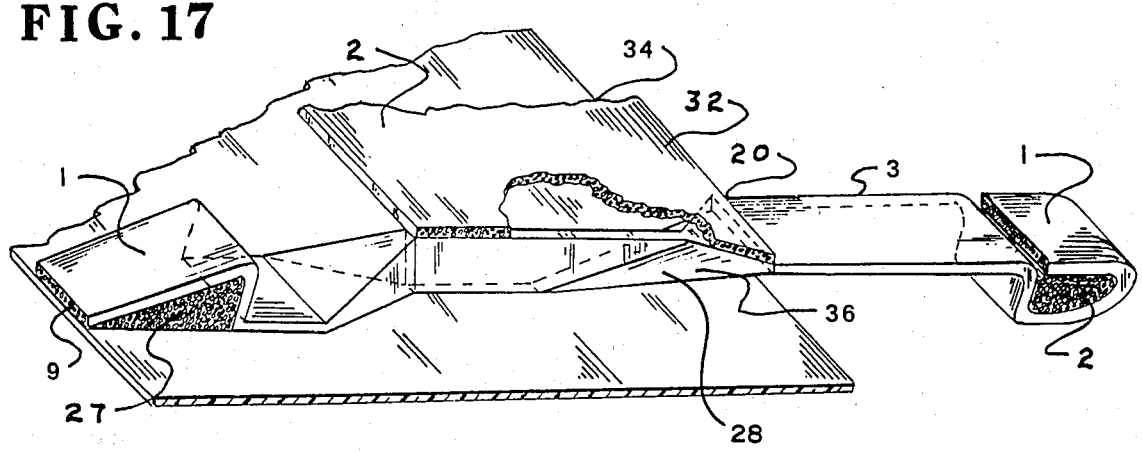
FIG. 17 is a similar view of a single spigot and socket element of the ribbed double wall panel coupling structure shown in FIG. 16.

FIGS. 16 and 17 illustrate a ribbed hollow double-wall spring-lock coupling structure 34 which exhibits spaced longo twine ribs 36 configured to have spigot and socket end members and providing greater rigidity and thermal insulation than a single wall structure comprising compacted longitudinal twines.

Figure 18:
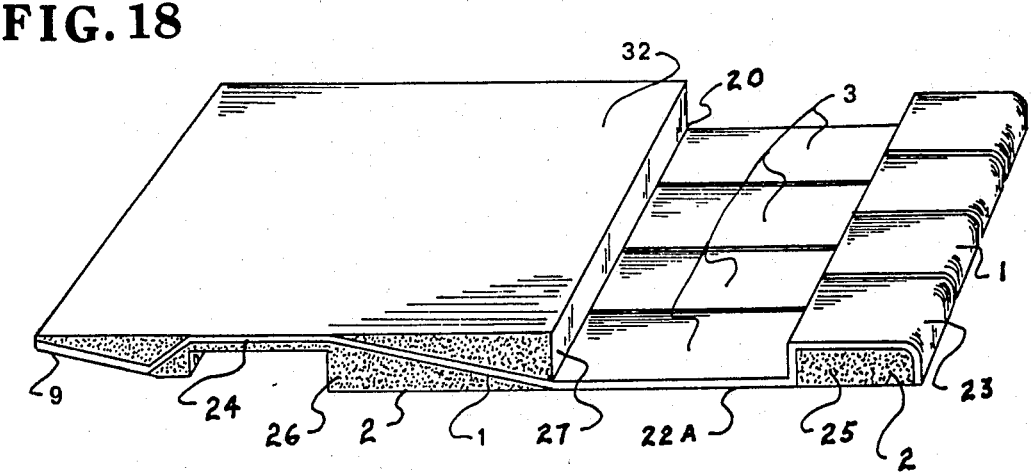
FIG. 18 is a sectional perspective view of one side of a flat spring lock coupling structure.
Figure 19:
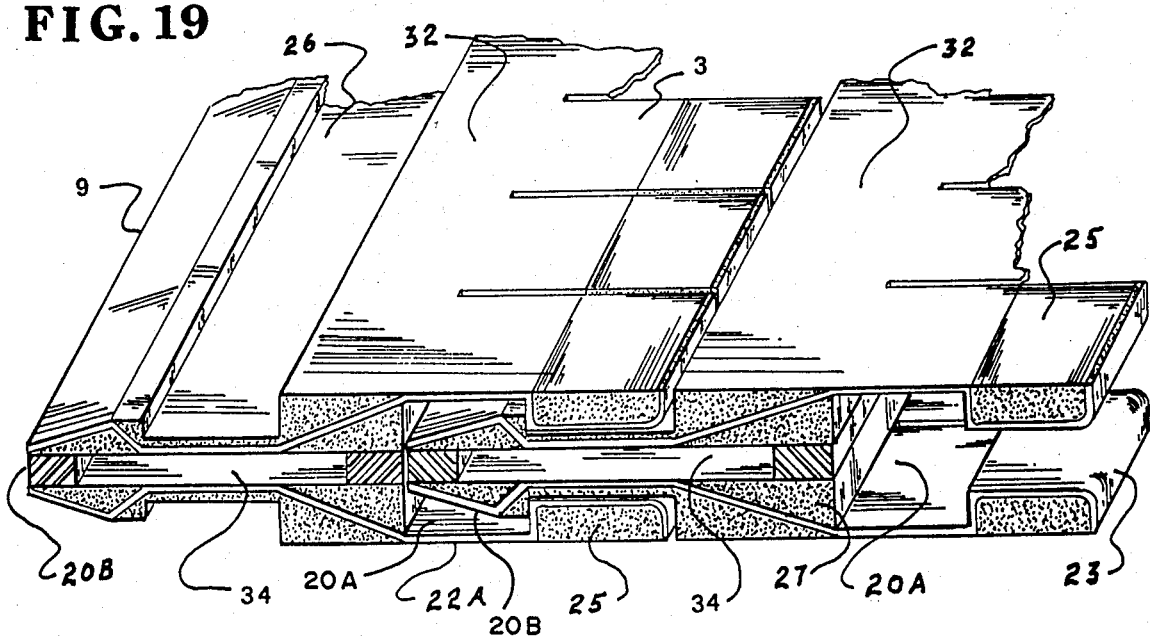
FIG. 19 is a similar view of an assembly of two double-sided flat spring lock coupling structures.

FIG. 18 shows the construction detail of a flat panel 32 having a linear array of flanged spring members 3. Such panels can be made to any length and can be connected back-to-back as shown in FIG. 19 to provide hollow wall panels of any thickness having a flush exterior on both sides and which are able to be connected to other panels having similar spigot and socket ends. Corner pieces (not shown) can also be made to enable such panels to provide a means to quickly make room enclosures, knock-down shipping containers and the like.

FIGS. 20, 21 and 22 are sectional perspective views of spring lock type coupling structures which serve as structural members. The tubular rectangular beam member 73 shown in FIG. 22 exhibits a first ply flat flanged composite spring 22 member sandwiched between an outer second ply body member 26 and an inner third ply body member structure 27. The first ply flange contituent 23 is configured to have a straight non-bevelled load face 23B and to provide the entire flange body structure by means of the folded first ply flange body configuration 74 shown in FIGS. 20, 21 and 22. Structural members which embody features of this invention employ at least two such flat flanged cantilever spring members which serve as a socket end which can be initially deflected by an assembly tool (not shown) to accept a rectangular tubular structure having a longitudinal axis at right angles to the longitudinal orientation of the first ply twines comprising the flat cantilever spring members 22. FIG. 22 illustrates an assembly of two parallel rectangular socket end tube structures connected by a third tube coupling structure having socket ends which mate with the body dimensions of the parallel tube structures to provide a structure which can serve as a roof or floor support structure in environments where corrosion, rotting or termites would destroy other structural materials. FIG. 20 shows a socket-end configuration of a composite flanged-spring coupling structure in the shape of a structural channel 78. FIG. 21 shows a socket end configuration of a composite flanged spring coupling structure in the shape of a structural I beam 79. It should be noted that the channel shaped coupling structure 78 can be made from a longitudinal half section of a rectangular shaped tubular coupling structure 73 similar to that shown in FIG. 22. It should be further noted that the I beam structure shown in FIG. 21 can be constructed from two channel members such as shown in FIG. 20.

FIG. 73 is a partially sectioned perspective view of a tubular spring lock coupling structure which may be used as a retaining clip structure. This example of a coupling structure comprises a flange 23 attached to a composite spring 22 which deflects as a cantilever beam. An opposing pair of such flanged spring members are configured to contact each other to provide a clip opening 75 which can be structurally closed to enable the structure to become attached to or connect another structure, such as a cable ring. The composite structure 20 depicted in FIG. 73 comprises an internal rectangular tube support structure 83 which supports parallel plies of longitudinally oriented twines 9 configured as a primary body member 24 having at least one extremity configured to provide mating flanged composite springs 22. The longitudinal first ply twines 9 are designed to provide the structure with longitudinal strength and the flanged composite spring 22 with the necessary spring stiffness to resist cantilever spring deflection that would exceed the desired coupling end load resistance. The longitudinal twine plies are contained within a composite tube comprising a single second ply of circumferentially wound twines 8 that provide a constituent of the coupling structure body member 26 as well as the straight hinge line 21 about which the flanged composite cantilever spring member 22 deflects.

FIGS. 74, 75 and 76 depict a side elevation cross section of a composite coupling structure used as a composite cable or composite rod structure. FIG. 74 additionally provide end views which illustrate that the composite rod coupling structure has a cross section in the shape of a regular polygon, such as the octagon shown, and consists of a two-ply construction whereby the longitudinal tensile load is resisted by a LONGO ply comprised of parallel twines oriented longitudinally 9. FIG. 74 further illustrates that the LONGO first ply 1 is enclosed by a polygonally shaped CIRC second ply 2 comprised of circumferentially oriented twines 8. FIG. 74 illustrates in side elevation cross section the regular polygon configuration 76 of first ply twines 1 and second ply twines 2 which are used to provide the socket end of the spring-lock coupler polygonal section body member 24B. The socket end 20A of the coupler body member extremity comprises a first ply cantilever spring member 22A, a first ply flange member 23 connected to the spring member 22A, a first ply body member 24B connected to the spring member 22A and a second ply body member 26 enclosing the polygonal section first ply body member 24B.

FIG. 75 illustrates in side elevation cross section the configuration of first ply twines 1 and second ply twines 2 which comprise the spigot end 20B of the spring-lock coupler body member 28 serving as a rod structure and having a mating socket end structure 20A, such as shown in FIG. 74, at an opposite extremity.

FIG. 76 illustrates in side elevation cross section the connected relationship of a socket spring end 20A and a spigot end 20B of spring-lock coupling structure having an elongated body member 28 which serves as a rod or cable.

FIG. 77 shows a partially sectioned side elevation view of a composite spring-lock coupling structure having a body member structure 28 formed in the shape of a ring. The ring is constructed from a compacted rod comprising the individual longitudinal first ply twines 9 used to make the polygonal shaped array of flanged cantilever springs 31 which comprise the socket end of the coupling structure 20A. A second ply of circumferentially oriented twines 8 comprises the body member portion configured as the ring structure 77 and the second ply body member 26 which provides the straight hinge lines 21 about which the flanged cantilever composite springs 22 deflect.

FIG. 77 also illustrates the location of a separable composite polygon-shaped retaining sleeve structure 18B which is constructed from circumferentially oriented twines. FIG. 77 further illustrates the connection of the socket end of the ring coupling structure 20A with the spigot end 20B of a composite rod or cable structure such as that depicted in FIG. 75.

FIGS. 5, 46, 47 and 48 illustrate a preferred spring-lock coupler embodiment comprising a spigot joint end composite seal surface structure 40 as the extremity of a cylindrical coupling body member 30. The joint end extremity of a preferred body member embodiment consists of a cylindrical flanged spigot 20BC which mates with a seal containing socket configuration 44 of the spring lock coupling structure to provide a mechanically connected pressure seal between the spigot end and the socket end coupling third ply body member constituent 27.

Figure 35:
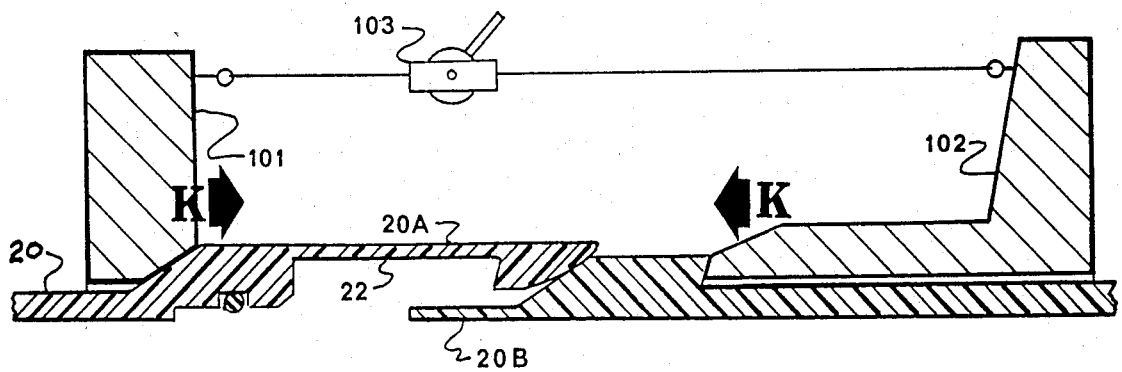
FIG. 35 is a half sectioned side elevation and schematic view of coupling assembly apparatus used to insert a spigot ended structure into the socket end of a spring lock coupling structure.
Figure 36:
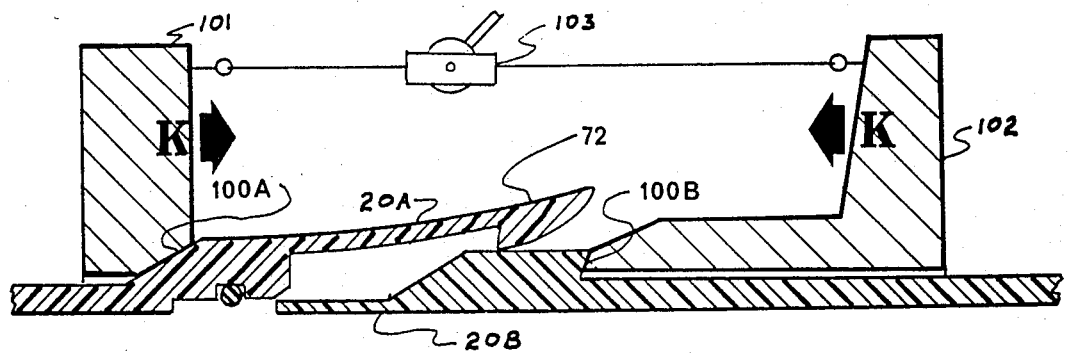
FIG. 36 is a view similar to FIG. 35 but exhibiting a following step in a spring lock coupling assembly operation.

FIGS. 6, 7 and 47 depict the insertion and connected relationship between the mating ends of two identical spring-lock coupling structures 20 constructed as a preferred embodiment of the present invention. FIGS. 47, 48 and 49 illustrate preferred configurations of annular seal containing grooves 44 formed by the third ply body member constituent 27. FIG. 47 depicts the manner by which each of the annular polygonal array of flanged flat composite cantilever spring members 22 deflect about their respective straight hinge lines 21 when the cylindrical flanged spigot end 20BC is inserted while axially loaded by assembly apparatus such as shown in FIGS. 35 and 36.

FIGS. 7, and 19 depict the connected relationship between flanged spigot end joints 20B and the socket ends 20A of preferred embodiments of spring-lock coupling structures 20 to provide a structural connection between the two.

Figure 62:
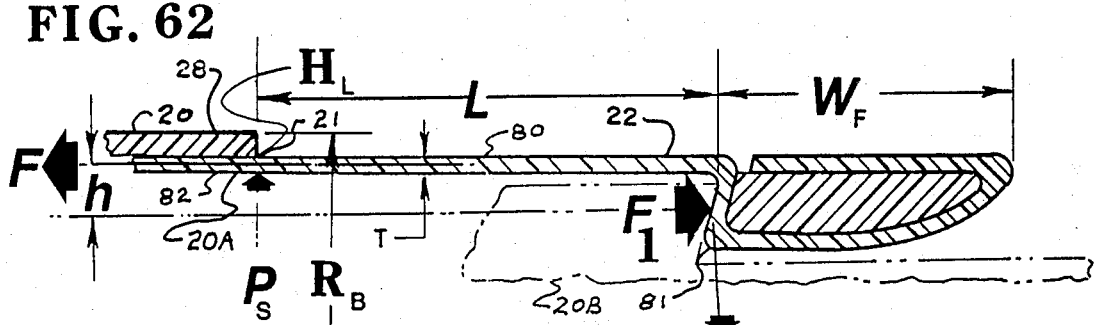
FIG. 62 is a cross sectional dimensional view depicting the principal constituents and dimensions of a two ply composite spring lock coupling structure made in accordance with the teaching of this invention.

FIG. 62 illustrates a cross section of a preferred socket end construction of a two-ply spring-lock coupling structure 20 where the first ply body member 82 is a non-tapered extension of the flanged spring member 80.

Figure 63:
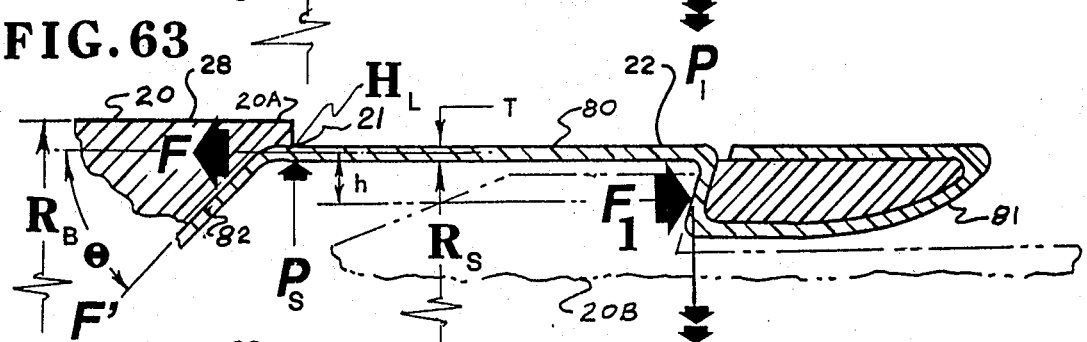
FIG. 63 is similar to FIG. 62 but showing a tapered first ply body member and the location of principal load resisting forces acting upon a coupling structure.

FIG. 63 illustrates a two ply socket end construction of a spring-lock coupler having a body member first ply member 82 formed as a tapered extension of the first ply spring member 80 which is configured at one extremity as a first ply flange member 81.

Figure 64:
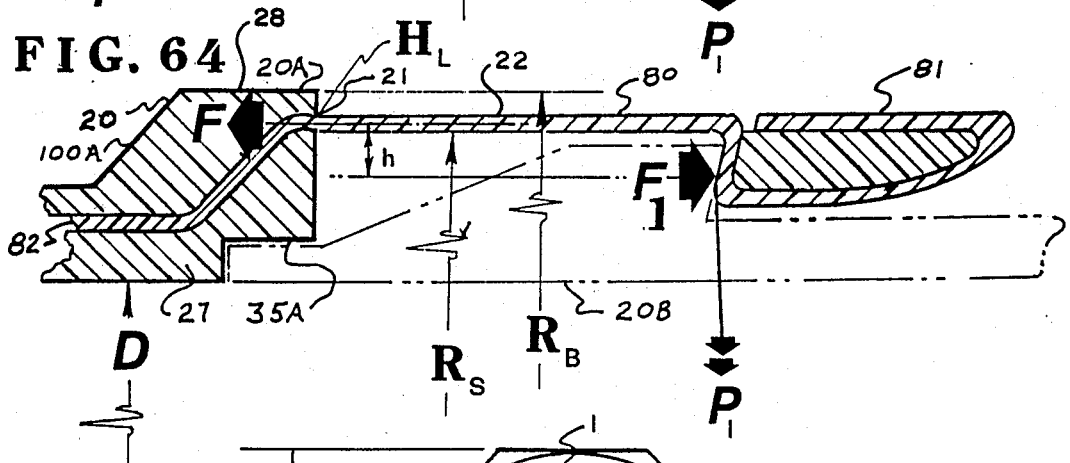
FIG. 64 is similar to FIG. 63 but showing the coupling body member comprising a third ply structure.

FIG. 64 illustrates a cross section of a preferred socket-end construction of a three ply spring-lock coupling structure 20 having an external flange 100A and an interior spigot receiving annulus groove 35A formed in the third ply body member extremity 27.

Figure 65:
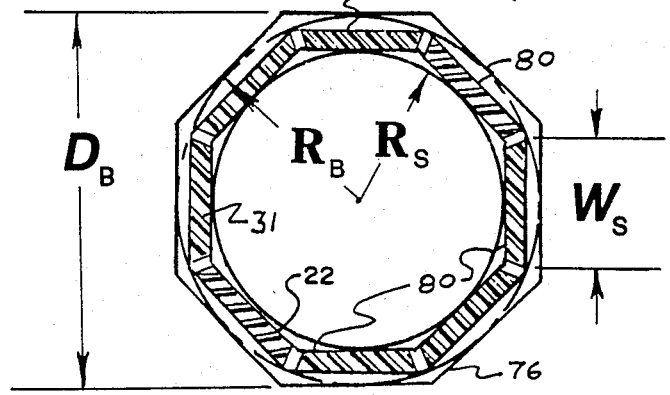
FIG. 65 is an end view of a cross section between the flange and body members of the spring lock coupling structure depicted in FIGS. 4, 45 and 46 showing the polygonal arrangement of the straight hinge lines about which the flat cantilever spring members deflect.

FIG. 65 illustrates a cross section of a tubular form of the composite spring-lock coupling structure 20 such as shown in FIG. 62 taken between the coupling first ply body member 82 and the flange member 81 to show the polygonal arrangement of the cantilever first ply spring members 80 which is typical of a preferred embodiment in which the inner surface of each coupling spring member 80 is the side of a regular polygon and each spring member 80 is separated at the polygon vertices and in which the spring section radius, $R_s$, is the radius of a circle inscribed within the regular polygon and $R_B$ is the radius of a circle enclosing the polygonal array of spring members 80.

FIGS. 67 and 68 illustrate the cylindrical first ply body member 24A, the first ply flat spring member 22A and the cylindrical surface of a first ply flange member 23A of a preferred spring-lock coupling structure socket-end construction 20A.

FIGS. 43 and 67 illustrate the parallel arrangement of the longitudinal first ply twines 9 configured to provide a flanged spring member 22 of a tubular spring-lock coupling socket-end construction 20A.

FIGS. 55, 58, 62, 63, 64, 65, 66, 67, 69, 70 and 71 identify the principal dimensions and load vectors which govern the design of spring-lock coupling structures 20 having flanged flat cantilever spring members 22 which resist a coupling tensile load while the spring member is in a non-deflected position.

Figure 55:
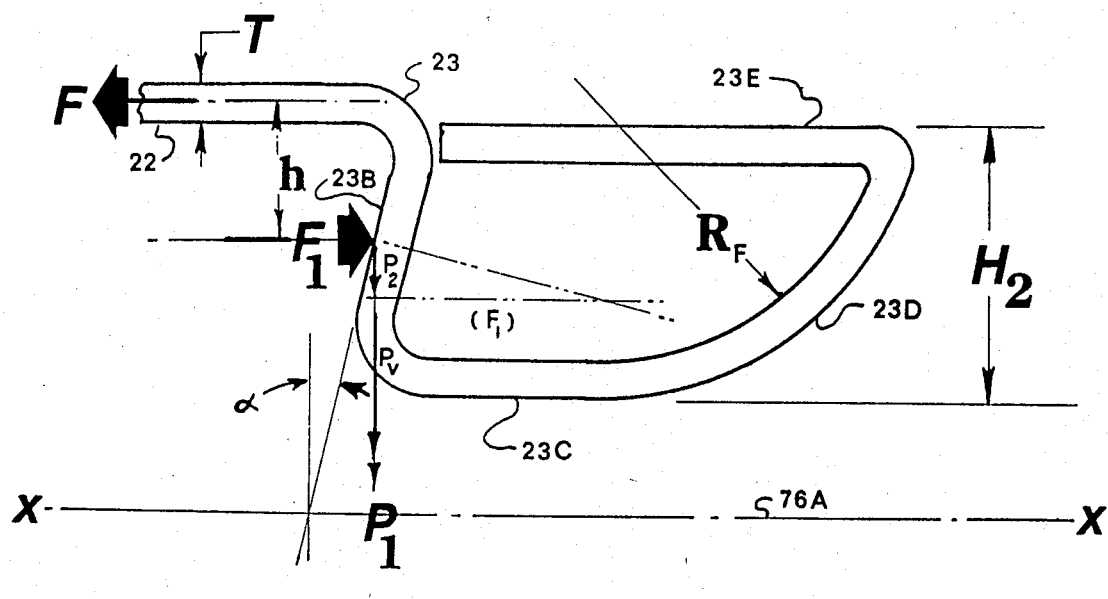
FIG. 55 is a cross sectional dimensional view of an extremity of a composite coupling structure body member showing the first ply extremity configured as the flange member of a composite cantilever spring which deflects about a straight hinge line.

FIG. 55 depicts the first ply configuration of the flange constituent 23 of a spring-lock type of coupling structure which embodies certain features of this invention. The flange constituent 23 is configured to have an interior flange load face 23B which resists a compressive load, a flange base member 23C and an outer flange heel member 23D which has an endmost part extending radially outward from a central axis 76A (designated as the line x—x in FIG. 55) to a height, "$H_2$", which is at least equal to the height of the flange load face 23B. The flange heel member 23D exhibits a partially circular section and the radius "$R_F$" of the curved extension of the flange base member 23C is at least equal to twice the first ply thickness, "T", measured at the straight hinge line "$H_L$" 21 of the first ply spring member 22. The flange heel member is shown in FIG. 55 to be further constructed to have an endmost first ply extremity to provide a flange cap member 23E.

FIG. 66 illustrates in cross section a preferred embodiment of a spring-lock coupling structure where the first ply spring member 22 is a flat cantilever spring having a cylindrical first ply body member constituent 2A which resists a coupling tensile load "F" while in a non-deflected position. The second ply flange constituent 25 provides the compression strength required to resist the longitudinal compression force, "$F_1$" exerted on the flange load face 23B formed from the first ply extremity which provides the first ply flange member constituent 23. The outer flange heel extremity of the first ply flange member constituent 23D is connected to the load face extremity by a first ply flange base member 23C and serves to contain the second ply flange member constituent 25 and prevent it from separating from the first ply flange member 23. One end of the second ply body member 26 provides the straight hinge line 21 about which the flat cantilever spring member 22 deflects to accept a suitably flanged mating spigot end structure.

FIGS. 66 and 68 illustrate the deflected position 72 of a flat cantilever spring member 22 connected to the first ply body member 24A of a spring-lock coupling structure 20. These exampled spring deflections typify the behaviour of the flanged composite springs described in the present invention and are most easily understood as deflected cantilever beam members having a beam section area approximately equal to the product of a unit spring member width, "$W_s$", and the spring member thickness "T" measured at the hinge line 21. The moment of inertia, "I" of composite spring members deflecting as a cantilever beam about a straight hinge line 21 is the second moment of area about a central axis of the cross section area of the spring member 22 located at the hinge line 21 of the spring member 22. In the preferred embodiment of a flat cantilever spring member 22 the moment of inertia, "I" of a unit width of spring member having a first ply thickness "T" is taken to equal $T^3/12$.

Figure 58:
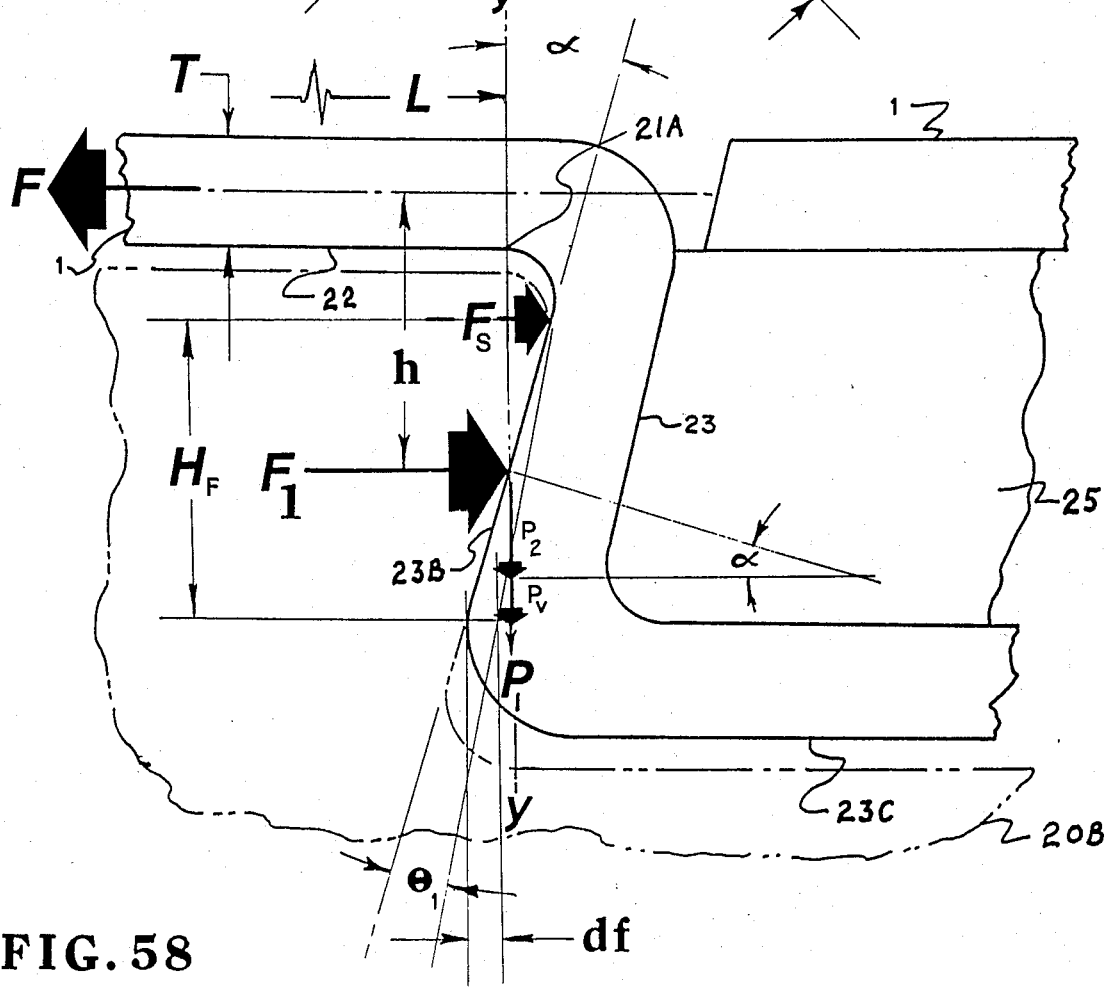
FIG. 58 is an enlarged cross-sectional dimensional view of the first ply spring member extremity of a spring lock coupling showing it configured to provide the load face of an integral flange member.

To understand and appreciate the important contribution made by the negative bevel angle "$\alpha$" illustrated in FIGS. 55 and 58 which serves to lock the deflectable flange member 23 to a protruding spigot flange member 20B the following analysis is provided to instruct how the bending moment equivalence must be maintained during the loading operation of a spring-lock coupling structure:

FIG. 66 shows the principal bending moment, "$M_o$", which must be resisted by a unit width of the socket end flanged spring member 22. The value of the bending moment "$M_o$" is calculated from the formula: $M_o = F_1 h$ where "$F_1$" equals the tensile load "F" applied to a unit width of the spring member at the hinge line 21 and "h" equals the distance from the centerline of the spring member 22 to the center of the load face 23B where the tensile load is resisted by a compressive force "$F_1$" equal and opposite to "F". As the free body vector diagram in FIG. 66 makes clear, the counterclockwise moment "$M_o$" must be equal and opposite to a clockwise moment "$M_1$". The clockwise moment, "$M_1$", is calculated from the formula $M_1 = P_1 L$, where "$P_1$" is the vertical force vector component acting at the end of the cantilever spring member 22, and "L" is the distance from the hinge line 21 ("$H_L$") to the vertical force vector component, "$P_1$". The magnitude of the vertical force vector "$P_1$" is calculated from the formula $P_1 = P_2 + P_v$, where "$P_v$" is the deflecting force required to deflect a unit width of a spring member 22 a vertical distance "H" and "$P_2$" is the vertical force vector resulting from the bevelled load face 23B of the flanged spring member 22 having a "lock angle", "$\alpha$" as shown in FIGS. 55 and 58. For a non-bevelled flange load face, such as characterize the coupling structure shown in FIGS. 20, 21 and 22, the vertical force vector "$P_2$" equals 0 and the vertical vector component "$P_1$" will then equal "$P_v$". The value of "$P_2$" is determined from the formula $P_2 = F_1 \tan \alpha$. The moment, "$M_1$" is the clockwise bending moment sufficient to prevent the spring member from deflecting enough to unlock the socket flange from the spigot flange. As can be noted from this analysis, a non-bevelled flange load face will require the entire bending moment $M_o = F_1 h$ to be resisted by the bending moment $M_1 = P_v L$. For large values of "F", this is impractical, since the value of "$P_v$" is usually small and the use of a non-bevelled flange load face would require the spring member length "L" to be excessive.

Figure 69:
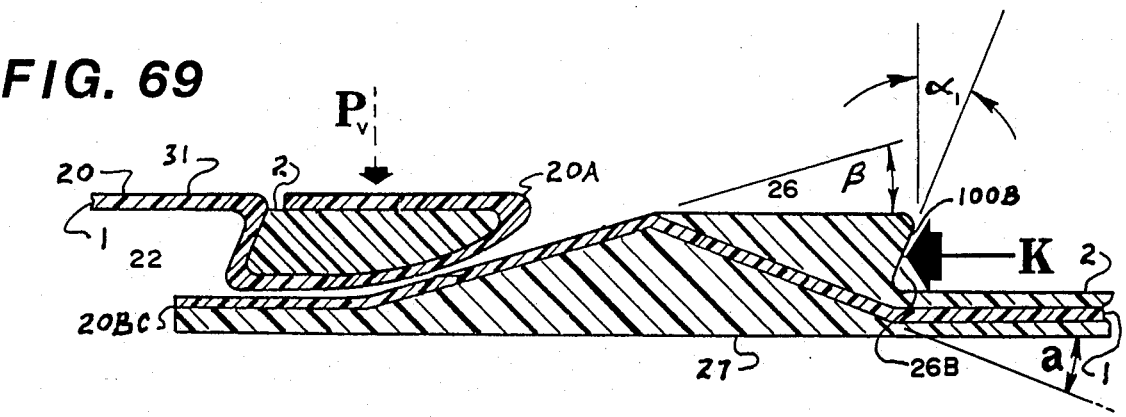
FIG. 69 is a half section side elevational fragmentary view showing the composite ply configurations characterizing the body extremities of two unconnected mating spring lock pressure coupling structures and load vectors associated with coupling assembly.
Figure 70:
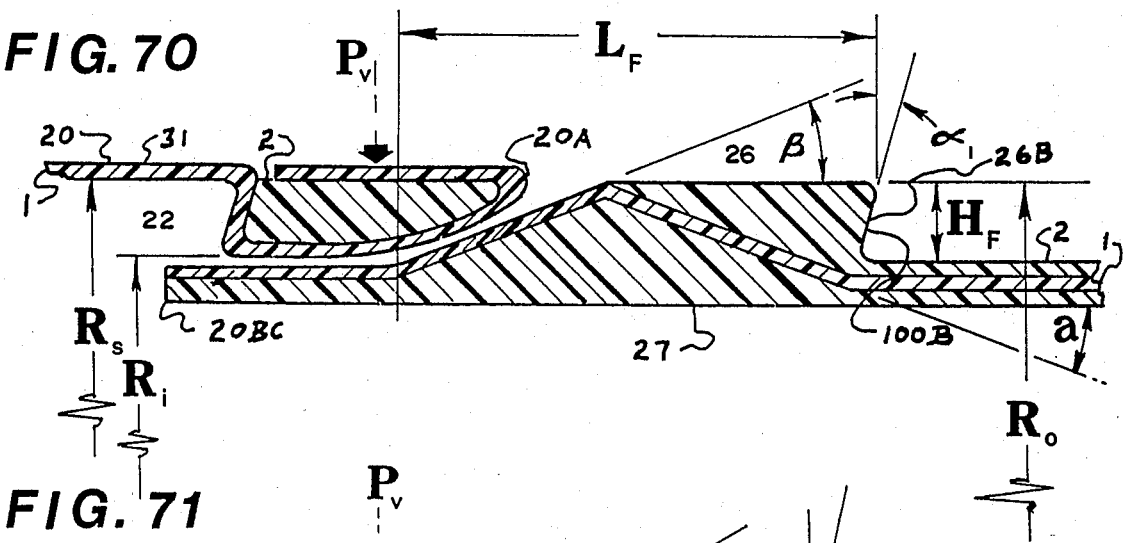
FIG. 70 is a view similar to FIG. 69 showing dimensional callouts of a coupling body spigot and socket end construction.
Figure 71:
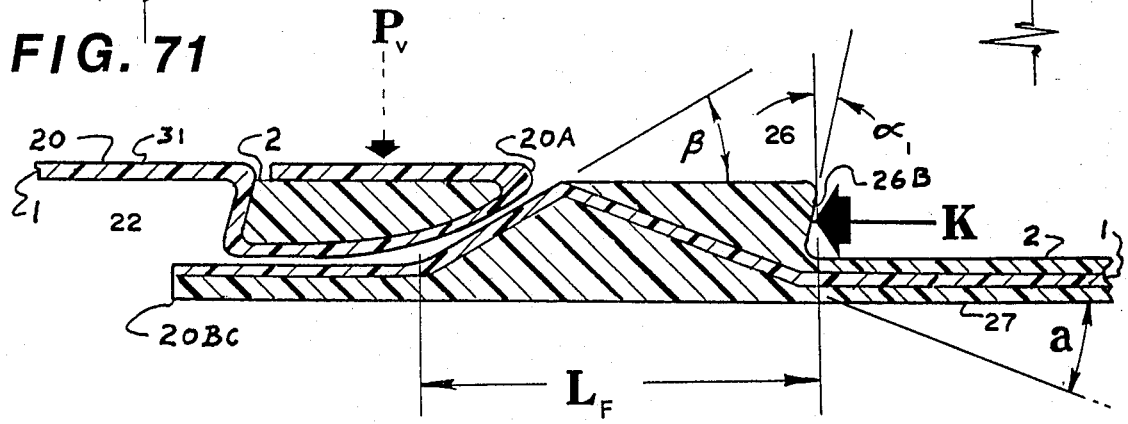
FIG. 71 is a view similar to FIG. 69 showing the coupling assembly force changes with the spigot flange insertion face angle.

FIGS. 69, 70 and 71 illustrate in cross section side elevation view a preferred embodiment of the spigot end 20B of a spring-lock coupling structure 20. The flange length, "$L_F$", and the flange face angles "$\alpha_1$" and "$\beta$" of the cylindrical flange spigot end 20BC are determined principally by the spigot flang height "$H_F$". The spigot end entry flange face angle "$\beta$" is preferably in the range of 5° to 30°. The lower the entry flange face angle "$\beta$" the greater the ease by which the flanged spigot end 20BC can be inserted into a coupling socket end 20A produced by the annular polygonal array of spring members 31. The spigot flange load face angle "$\alpha_1$" is preferably equal to the socket end "bevel lock" angle "$\alpha$" shown in FIG. 55 and is preferably in the range of 10° to 20°. As shown in FIGS. 70 and 71 the length "$L_F$" of the spigot load flange 20B containing the spigot flange load face 26B is governed by three parameters: (1) the taper angle, "a", of the joint end first ply extremity 1 upon which the second ply extremity 2 is disposed; (2) the tensile hoop strength required of the second ply flanged body extremity 26 to resist longitudinal movement on the tapered first ply flanged body extremity when subjected to the coupling tensile load "F",; (3) the transverse shear strength of the twine material used as the flanged body first ply extremity 1. It has been empirically determined that the preferred total length "$L_F$" of a spigot end flange is from 6 to 8 times the spigot end flange height "$H_F$".

Figure 57:
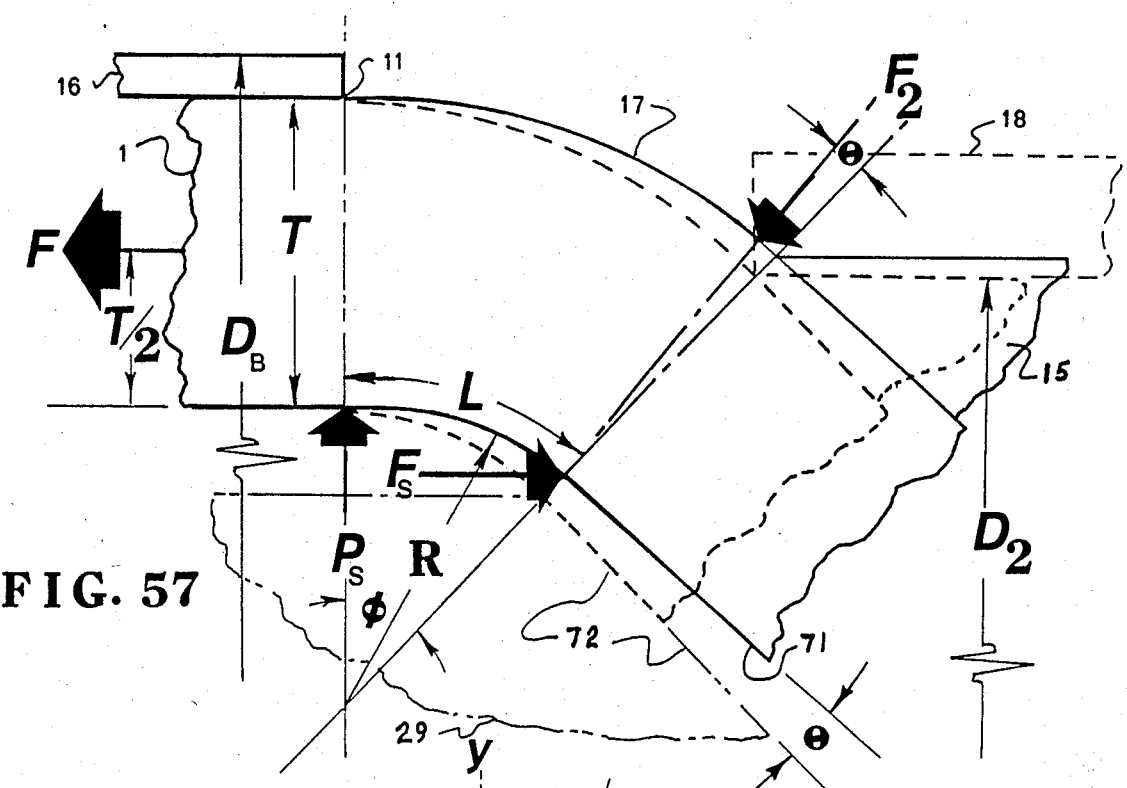
FIG. 57 is an enlarged cross-sectional dimensional view of the first ply spring member of a segmented coupling structure that shows the deflection range of the cantilever composite spring member about its hinge line.

FIG. 58 is an enlarged cross section of the flange load face 23B of a spring-lock coupling structure first ply flange constituent 23. This figure is helpful in noting that the flange load face ply 23B, as an extension of the first ply spring member 22, performs as a second cantilever spring member connected to the primary cantilever spring member at a secondary hinge line 21A. When the flange load face ply 23B is configured to provide a conical load face surface that conforms to the conical surface of a spigot-end flange load face the secondary hinge line 21A is curved and the load face ply 23B becomes a secondary cantilever spring member which performs similar to the curved cantilever spring member 17 of the segmented coupling structure such as shown in FIG. 57.

FIG. 58 shows that the flange load face 23B contains a tangent line which makes a negative (clockwise) flange bevel angle "$\alpha$" with a transverse vertical plane "Y—Y" containing the secondary hinge line 21A which joins the primary cantilever spring member 22 and the load face 23B of the first ply flange constituent 23. From FIG. 58 it can also be seen that a vertical force vector "$P_2$" is produced by the horizontal reaction force vector "$F_1$" acting upon the flange face 23B which has a bevel lock angle "$\alpha$".

The maximum deflection "df" of a unit width of the load face cantilever extremity 23B subjected to a cantilever load equal to the flange face force "$F_1$" can be calculated from the formula $df=F_1(H_f)^3/3EI$ where "$H_f$" is the effective beam length of the deflecting member, "I" is the moment of inertia (at 21A) of the secondary cantilever flange member 23B equal to $T^3/12$ and "E" is the tensile modulus of elasticity of the twine material comprising the flange member 23B. The deflection angle, "$\theta_1$" is the slope of the secondary cantilever reflection curve shown in FIG. 58 and under all conditions should remain less than the bevel lock angle "$\alpha$". The formula used to determine the angle "$\theta_1$". The angle between the undeflected load face surface and the deflected load face measured in radians is $\theta_1 = \arctan df/H_f = \arctan F_1(H_f)^2/3EI$.

For an exampled flanged coupling spring having the configuration shown in FIG. 58 assume $H_f=N_1T$ and $\theta=\alpha$. Thus the maximum unit load, "$F_1$", which can be registered before the angle "$\theta_1$" equals "$\alpha$" can be determined from the formula $F_1=3EI$ (Tan $\alpha)/(H_f)^2 = 3E(T^3/12)(N_1T)^{-2}$ Tan $\alpha=0.25ET$ Tan $\alpha/(N_1)^2$. Such a spring member is further stressed by the transverse shear stress, "$S_s$"($=F_1/T$). The recommended design practice in a preferred embodiment is to use "$N_1$" values in the range of 0.5 to 3.0 and first ply thickness "T" values determined from the formula $T=3F \times N_1/S_T$ where "$S_T$" is the allowable tensile stress of the first ply twine material, "$N_1$" is the flange height multiplier ($=H_f/T$) and "F" is the unit tensile load to be resisted by the coupler. The exampled tubular coupling structure had an inner diameter equal to 8 inches and a spigot and socket end configuration similar to that shown in perspective cross section in FIG. 47. The coupler structure was subjected to a maximum use pressure of 3.45 MPa (500 PSI) which produced a total coupling load of 11,423 kg (25,132 lb) and a unit tensile load "$F_1$" of 357 kg (785 lb) in each of 32 cantilever spring members 25.4 mm (1 in) wide arranged on a 10 inch diameter as a polygonal array. A flange height multiplier value, "$N_1$", equal to 1 and an allowable tensile stress, "$S_T$" equal to 103.5 MPa (15,000 PSI) governed the selection of the first ply thickness, "T" which was calculated from the formula $T=3F_1N_1/S_T=3\times 785\times 1/15000=0.16$ in. (4 mm). From Table VI it can be seen that for a flanged spring having a thickness of 4 mm, a length of 79 mm and a deflecting height of 13 mm it is necessary to impart a deflecting force "$P_v$" of 187 Newtons (42 lb) per spring. From the formula $K_T=N_sK=N_s(P_v \text{Tan} \beta)$ where "$N_s$" is the the total number of spring members 22 and "$\beta$" is the spigot end entry angle of 30°, it was determined that the total coupling assembly force "$K_T$" required to push the spigot end into the socket end was approximately equal to 32 (42 Tan 30°)=831 lb (3696N). It may be noted from Table VI that the vertical force "$P_v$" required to deflect a cantilever spring member diminishes as the cube of the spring length "L". To facilitate insertion of a flanged spigot end structure 20B which produces a given flange deflection height "H", it is only necessary to increase slightly the length "L" of the spring member 22.

Tables IV, V and VI present the load relationships, dimension and other parameters useful in the design of flanged flat composite cantilever spring members constructed as a preferred embodiment of the present invention. Such spring members are assumed to comprise a spring-lock coupling structure which has a socket end made from a polygonal array of spring members, and that the polygonal array comprises spring members having uniform spring width and arranged to form a regular polygon such as shown in FIG. 65.

Table IV enables a designer to select the required first ply thickness "T" to provide a spring-lock coupling structure able to resist a given unit tensile load "F" applied to a unit width of the spring member. Table IV assumes the composite material has an allowable design strength of 104 MPa (15,000 PSI) and presents the vertical force "$P_2$" which reacts against the bevelled flange load face 23B. Table IV also presents the minimum length "L", as shown in FIGS. 62 and 66, required of the spring member 22 to provide the minimum unit bending moment, "$M_1$"($=L P_1$) needed to equal the unit bending moment "$M_o$"($=F_1 h$) produced by the compressive load "$F_1$" applied to the flange load face 23B center at the compressive load offset distance "h".

Table V provides guidelines for the design of pressure-sealed composite spring-lock coupling structures having the flanged spigot end configuration represented by a preferred embodiment of this invention such as exhibited in FIG. 46. Table V presents the maximum internal pressure, "P", that can be resisted by a sealed coupling structure having an inner diameter "D" ranging from 2 to 30 inches. Table V also presents the first ply hinge line thickness "T" able to resist a tensile load "F" per 25.4 mm (1 inch) of spring member 22 width. The tensile load "F" is in turn resisted by a compressive force "$F_1$" of equal magnitude applied to the center of the load face 23B of the flange member 23 as shown in FIG. 66.

Table VI presents design guidelines for tubular spring-lock coupling structures. As schematically depicted in FIG. 66 two composite spring properties are of special significance in the flanged spring embodiments of the present invention. One property is the force "$P_v$" required to deflect the flange attachment end of the spring member a given distance "H". The second property is the stress imposed on the spring member material at the spring hinge line "$H_L$". Table VI also presents the magnitude of vertical force "$P_v$" that is required to deflect a flat flanged cantilever spring member 22 a distance "H". The "$P_v$" values shown in Table VI were calculated from the formula $P_v = 3HEI/L^3$, where the vertical spring deflecting force, "$P_v$" is measured in Newtons (N), the spring deflection height "H" is measured in mm, the spring length, "L" is measured in mm, from the hinge line "$H_L$" 21 to the flange face point of vertical force application, "E" is the tensile modulus of elasticity measured in Giga Pascal (GPa) and "I" is the moment of inertia of a spring member section having a unit width of 25.4 mm (1 inch) and a uniform thickness "T" measured in mm. The value of "E" used in Table VI is 24 GPa ($3.5 \times 10^6$ PSI). The value of "I" for a unit widt spring is $T^3/12$ mm$^4$. Table VI values are also based on the assumption that each spring member 22 has a length "L" equal to 7H and that the maximum allowable spring deflection height "H" is based on the formula H=N'T, where "N'" is an arbitrary numerical multiplier which governs the amount of socket end spring deflection required to enable insertion of a flanged spigot end 20B. The deflecting force "$P_v$" is used to determine the total force, "$K_T$" required to push a flanged spigot end into a socket end 20A having a polygonal array 31 of deflecting spring members 22.

Table VII provides the axial force "K" needed to deflect each spring member an amount "H" equal to 4T. The total deflecting force "$K_T$" can be determined from the formula $K_T = N_s K = N_s P_v \tan \beta$. For example, using values presented in Table VI for an eight-sided regular polygonal array 31 of spring members 22 such as depicted in FIGS. 45, 46 and 65, the total vertical deflecting force produced by eight spring members 79 mm long having an individual spring thickness "T" equal to 4 mm which deflect "H" equal to 13 mm equals $8P_v = 8 \times 187N = 1496N$ (336 lb). A flanged spigot end 20B with an entry flange face angle "$\beta$" equal to 30° will require an axial coupling assembly force, $K_T (= 8P_v \tan \beta)$ of approximately 864N (194 lb).

Tables VII and VIII provide the dimensions and performance characteristics of typical tubular spring-lock coupling members used as pressure pipe and having construction features and configurations similar to those shown in FIGS. 4 and 9. The column headings in Tables VII and VIII are symbols which designate the following design parameters:

"F"=COUPLING TENSILE LOAD PER INCH OF CIRCUMFERENCE (LB/IN)

"$N_s$"=NUMBER OF SIDES TO THE REGULAR POLYGON FORMED BY A SIMILAR NUMBER OF FLAT SOCKET_END COUPLING SPRING MEMBERS HAVING A UNIT WIDTH OF ONE INCH

"T"=THICKNESS OF EACH CANTILEVER COMPOSITE SPRING MEMBER MEASURED AT THE HINGE LINE (IN)

"L"=LENGTH OF CANTILEVER COMPOSITE SPRING MEMBER MEASURED FROM HINGE LINE TO CENTER OF FLANGE LOAD FACE MEMBER (IN)

"$D_s$"=COUPLING INTERIOR SPRING DIAMETER EQUAL TO THE DIAMETER OF A CIRCLE INSCRIBED WITHIN A REGULAR POLYGON WITH "$N_s$" SIDES ONE INCH WIDE (IN)

"D"=INSIDE DIAMETER OF SPRING-LOCK COUPLING BODY MEMBER USED AS A PRESSURE PIPE (IN)

"P"=MAXIMUM INTERNAL PRESSURE RESISTED BY A COUPLING STRUCTURE WITH A PIPE WALL THICKNESS EQUAL TO 2T (PSI)

"K"=MAXIMUM AXIAL FORCE REQUIRED TO DEFLECT EACH SOCKET END FLANGED SPRING MEMBER DURING COUPLER ASSEMBLY (LB)

"$P_2$"=FLANGE LOCKING FORCE (LB)

"$\alpha$"=FLANGE LOAD FACE LOCK ANGLE (DEGREES)

"H"=MAXIMUM SPRING MEMBER DEFLECTION (IN)

"$S_T$"=MAXIMUM TENSILE STRESS PRODUCED IN SPRING MEMBER AT HINGE LINE FROM MAXIMUM DEFLECTION OF SPRING MEMBER

Tables VII and VIII are based upon an allowable first ply tensile strength of 104 MPa (15,000 PSI) and assume the spigot flange height "$H_F$" equals "H" which in turn is assumed to equal 4 T. The maximum tensile stress to which the spring member material is subjected when deflected an amount "H" is calculated from the formula $S_T = M_y c/I$ where "$M_y$" is the bending moment due to the deflecting force "$P_v$" and is calculated from the formula $M_y = P_v L$. The section modulus term $c/I$ is calculated from the formulas $c = T/2$ and $I = T^3/12$. The maximum stress, "$S_T$" is calculated from the formula $S_T = 6P_v L/T^2$ for spring members having a unit width of one inch. As shown in Table VIII the maximum stress to which a spring member is subjected when having the dimensions shown is less than 30 percent of the maximum tensile strength of the spring member material shown in Table II. The following formula was used to calculate the coupling spring diameter "$D_s$": $D_s = W_s \tan(180/N_s)$ where "$W_s$"=1 inch. Tables VII and VIII shows the minimum bevel lock angle "$\alpha$" required to prevent the flange member from "unlocking" due to the unit tensile load "F". Since "F"="$F_1$", the minimum load face bevel lock angle "$\alpha$" is equal to the angle having a tangent value equal to the ratio $P_2/F$. The maximum use pressure "P" shown in Table VII was calculated from the formula $P = 4F/D$. The value of "K" was calculated from the formula $K = P_v \tan \beta$ where "$\beta$" is the taper angle of the leading insertion end of a bevelled spigot flange, which for purposes of illustration was selected as equal to 20° for values shown in Table VII.

TABLE IV
DESIGN PARAMETERS FOR SPRING LOCK COUPLER SOCKET-END MEMBERS

| $F\left(=\dfrac{LP_1}{h}\right)$ KN (lb) | $T\left(=\dfrac{F}{S}\right)$ $S = 104$ MPa (15000 PSI) mm (in) | $P_1 (=F \tan \alpha)$ KN (lb) $\alpha = 10°$ | $\alpha = 15°$ KN (lb) | $\alpha = 20°$ KN (lb) | $L\left(=\dfrac{Fh}{P_1}\right)$ ($\alpha = 15°$) mm (in) FOR h = T mm (in) | FOR h = 1.5T mm (in) | FOR h = 2T mm (in) |
|---|---|---|---|---|---|---|---|
| 4.4 (1000) | 1.5 (0.06) | 0.8 (176) | 1.2 (267) | 1.6 (364) | 6 (0.22) | 9 (0.34) | 11 (0.45) |
| 8.9 (2000) | 3.3 (0.13) | 1.6 (353) | 2.4 (536) | 3.2 (728) | 12 (0.49) | 18 (0.73) | 25 (1.00) |
| 17.8 (4000) | 6.6 (0.27) | 3.1 (705) | 4.8 (1072) | 6.5 (1456) | 25 (1.00) | 38 (1.51) | 51 (2.00) |
| 35.6 (8000) | 12.0 (0.53) | 6.3 (1411) | 9.5 (2143) | 13.0 (2912) | 51 (2.00) | 76 (3.00) | 101 (4.00) |
| 45.0 (10000) | 15.0 (0.67) | 7.8 (1763) | 12.0 (2680) | 16.0 (3640) | 63 (2.50) | 95 (3.75) | 127 (5.00) |
| 54.0 (12000) | 18.0 (0.80) | 9.4 (2116) | 14.0 (3215) | 19.0 (4368) | 76 (3.00) | 114 (4.50) | 152 (6.00) |

TABLE V
DESIGN PARAMETERS FOR SPRING LOCK COUPLER SOCKET END MEMBERS

| "F" (=PD/4) FLANGE FACE LOAD PER 24.4 mm SPRING WIDTH kN (lb) | "T" (=F/S) SPRING PLY THICKNESS $S = 124$ MPa (18,000 PSI) mm (lb) | "P" (=4F/D) COUPLED PIPE PRESSURE PRODUCING FLANGE END LOAD FOR GIVEN PIPE I.D. ("D") MPa (PSI) | | | |
|---|---|---|---|---|---|
| | | "D" (mm) (in) | 51 2 | 203 8 | 254 10 | 762 30 |
| 4.45 (1000) | 1.27 (.05) | | 13.8 (2000) | 3.5 (500) | 2.8 (400) | 0.9 (133) |
| 8.89 (2000) | 2.79 (.11) | | 27.6 (4000) | 6.9 (1000) | 5.5 (800) | 1.8 (266) |
| 17.79 (4000) | 5.59 (.22) | | 55.2 (8000) | 13.8 (2000) | 11.0 (1600) | 3.7 (533) |
| 26.69 (6000) | 8.38 (.33) | | 82.8 (12000) | 20.7 (3000) | 16.6 (2400) | 5.5 (800) |
| 35.58 (8000) | 11.18 (.44) | | 110.0 (16000) | 27.6 (4000) | 22.1 (3200) | 7.4 (1066) |
| 44.48 (10000) | 13.97 (.55) | | 138.0 (20000) | 34.5 (5000) | 27.6 (4000) | 9.2 (1333) |
| 53.38 (12000) | 16.76 (.66) | | 166.0 (24000) | 41.4 (6000) | 33.1 (4800) | 11.0 (1600) |

TABLE VI
DESIGN PARAMETERS FOR SPRING-LOCK COUPLER SOCKET END MEMBERS

| (H = N¹ × T) | | | $N^1$ 2 | 3 | 4 | 5 | 6 | 7 |
|---|---|---|---|---|---|---|---|---|
| T=2.5 mm (0.10 in) | H | mm (in) | 5 (0.2) | 8 (0.3) | 10 (0.4) | 13 (0.5) | 15 (0.6) | 18 (0.7) |
| | L | mm (in) | 35 (1.4) | 53 (2.1) | 71 (2.8) | 89 (3.5) | 107 (4.2) | 124 (4.9) |
| | $P_y$ | N (lb) | 285 (64) | 125 (28) | 71 (16) | 45 (10) | 31 (7) | 22 (5) |
| T=4 mm (0.15 in) | H | mm (in) | 8 (0.3) | 13 (0.5) | 15 (0.6) | 20 (0.8) | 23 (0.9) | 25 (1.0) |
| | L | mm (in) | 53 (2.1) | 79 (3.1) | 106 (4.2) | 135 (5.3) | 160 (6.3) | 187 (7.4) |
| | $P_y$ | N (lb) | 427 (96) | 187 (42) | 107 (24) | 67 (15) | 49 (11) | 36 (8) |
| T=5 mm (0.20 in) | H | mm (in) | 10 (0.4) | 15 (0.6) | 20 (0.8) | 25 (1.0) | 30 (1.2) | 35 (1.4) |
| | L | mm (in) | 71 (2.8) | 107 (4.2) | 142 (5.6) | 178 (7.0) | 213 (8.4) | 249 (9.8) |
| | $P_y$ | N (lb) | 565 (127) | 254 (57) | 142 (32) | 89 (20) | 62 (14) | 45 (10) |
| T=6 mm (0.25 in) | H | mm (in) | 13 (0.5) | 20 (0.8) | 25 (1.0) | 30 (1.2) | 38 (1.5) | 45 (1.8) |
| | L | mm (in) | 89 (3.5) | 134 (5.3) | 178 (7.0) | 223 (8.8) | 266 (10.5) | 312 (12.3) |
| | $P_y$ | N | 707 | 316 | 178 | 116 | 80 | 58 |

TABLE VI-continued
DESIGN PARAMETERS FOR SPRING-LOCK COUPLER SOCKET END MEMBERS

| (H = N¹ × T) | | $N^1$ 2 | 3 | 4 | 5 | 6 | 7 |
|---|---|---|---|---|---|---|---|
| | (lb) | (159) | (71) | (40) | (26) | (18) | (13) |

TABLE VII
DESIGN PARAMETERS FOR PRESSURE PIPE SPRING-LOCK COUPLER MEMBERS

| F (LB) | $N_S$ | T (IN) | L (IN) | $D_S$ (IN) | D (IN) | P (PSI) | K (LB) |
|---|---|---|---|---|---|---|---|
| 1000 | 6 | 0.07 | 1.75 | 1.73 | 1.00 | 3750 | 22 |
| 1000 | 8 | 0.07 | 1.75 | 2.40 | 1.75 | 2290 | 29 |
| 1000 | 16 | 0.07 | 1.75 | 5.00 | 4.36 | 920 | 58 |
| 2000 | 8 | 0.13 | 4.36 | 2.40 | 1.00 | 7400 | 29 |
| 2000 | 16 | 0.13 | 3.46 | 5.00 | 3.70 | 2150 | 115 |
| 2000 | 24 | 0.13 | 4.36 | 7.60 | 6.25 | 1275 | 86 |
| 3000 | 16 | 0.20 | 5.52 | 5.00 | 3.00 | 4000 | 144 |
| 3000 | 24 | 0.20 | 5.19 | 7.60 | 5.60 | 2150 | 260 |
| 3000 | 32 | 0.20 | 5.94 | 10.2 | 8.15 | 1475 | 230 |
| 4000 | 24 | 0.27 | 11.0 | 7.60 | 5.00 | 3250 | 86 |
| 4000 | 32 | 0.27 | 8.72 | 10.2 | 7.50 | 2125 | 230 |
| 4000 | 48 | 0.27 | 7.62 | 15.3 | 12.6 | 1270 | 518 |
| 5000 | 32 | 0.33 | 10.9 | 10.2 | 6.80 | 2900 | 288 |
| 5000 | 48 | 0.33 | 8.65 | 15.3 | 11.9 | 1675 | 864 |

TABLE VII-continued

DESIGN PARAMETERS FOR PRESSURE PIPE
SPRING-LOCK COUPLER MEMBERS

| F (LB) | $N_S$ | T (IN) | L (IN) | $D_S$ (IN) | D (IN) | P (PSI) | K (LB) |
|---|---|---|---|---|---|---|---|
| 5000 | 60 | 0.33 | 14.8 | 19.0 | 15.8 | 1270 | 216 |

TABLE VIII

DESIGN PARAMETERS FOR SPRING-LOCK
COUPLER SOCKET END MEMBERS

| F (LB/IN) | $N_S$ | T (IN) | L (IN) | H (IN) | $P_2$ (LB) | MINIMUM $\beta$ (°) | $S_T$ (PSI) |
|---|---|---|---|---|---|---|---|
| 1000 | 6  | .070 | 1.75 | 0.27 | 96  | 5.5 | 23365 |
| 1000 | 8  | .070 | 1.75 | 0.27 | 96  | 5.5 | 23365 |
| 1000 | 16 | .070 | 1.75 | 0.27 | 96  | 5.5 | 23365 |
| 2000 | 8  | 0.13 | 4.36 | 0.53 | 153 | 4.4 | 14718 |
| 2000 | 16 | 0.13 | 3.46 | 0.53 | 193 | 5.5 | 23363 |
| 2000 | 24 | 0.13 | 4.36 | 0.53 | 153 | 4.4 | 14718 |
| 3000 | 16 | 0.20 | 5.52 | 0.80 | 272 | 5.2 | 20688 |
| 3000 | 24 | 0.20 | 5.19 | 0.80 | 289 | 5.5 | 23363 |
| 3000 | 32 | 0.20 | 5.94 | 0.80 | 252 | 4.8 | 17829 |
| 4000 | 24 | 0.27 | 11.0 | 1.07 | 243 | 3.5 | 9271  |
| 4000 | 32 | 0.27 | 8.72 | 1.07 | 306 | 4.4 | 14717 |
| 4000 | 48 | 0.27 | 7.62 | 1.07 | 350 | 5.0 | 19285 |
| 5000 | 32 | 0.33 | 10.9 | 1.33 | 382 | 4.4 | 14716 |
| 5000 | 48 | 0.33 | 8.65 | 1.33 | 482 | 5.5 | 23361 |
| 5000 | 60 | 0.33 | 14.8 | 1.33 | 282 | 3.2 | 7989  |

EXAMPLE V

Figure 3A:
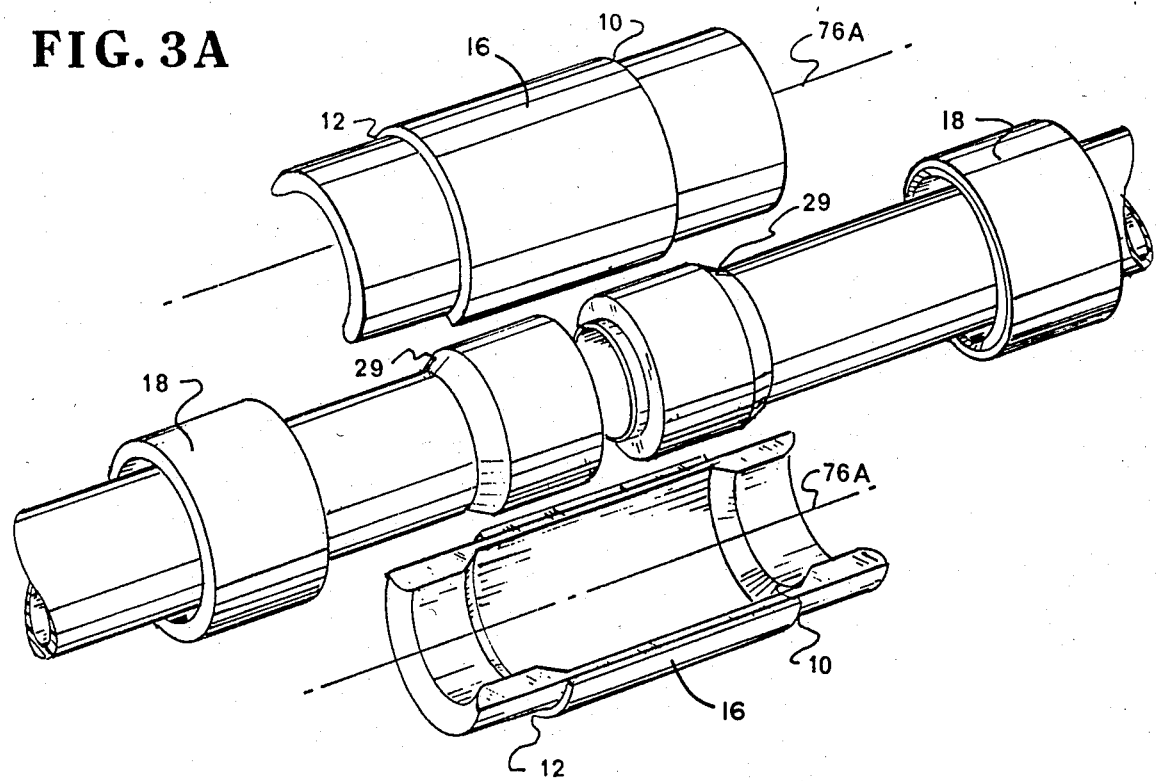
FIG. 3A is an exploded perspective view of a segmented coupling structure assembly used to join externally flanged pipe joints.
Figure 3B:
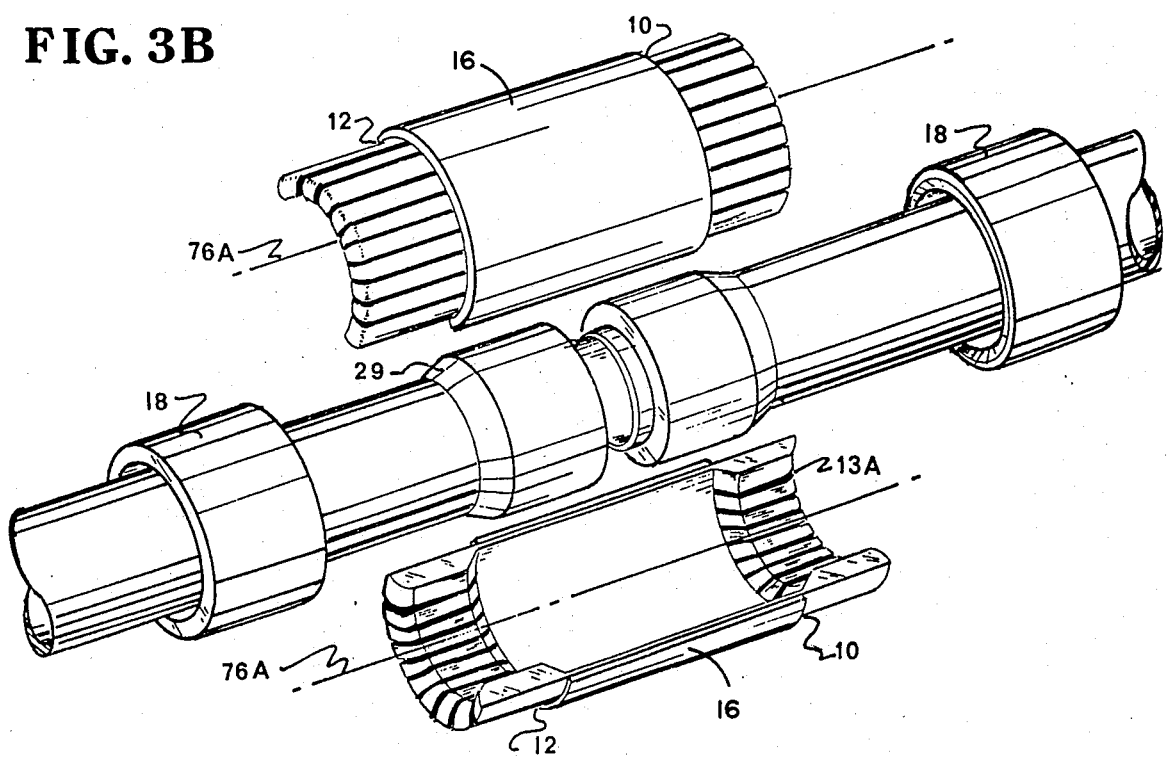
FIG. 3B is a perspective view of the socket end of a tubular spring-lock coupling structure.

FIGS. 3A, 3B, 50, 51, 52, 53 and 54 illustrate various coupling structures that teach a preferred embodiment of this invention and which are hereafter referred to in this specification as the "SEGMENTED" type of coupling structure 10. FIGS. 3A and 3B are perspective exploded views of two semi-circular segmented coupling structure members having flanged spring members at each end which are assembled and held together by a pair of retaining sleeves. FIG. 3A illustrates a segmented coupling structure 10 comprising a double flanged semi-circular coupling structure 12 which comprises a first ply spring member 17 connected to a first ply flange member 13 and a first ply body member 19. Two of the coupling structures 12 are held together by a circular retaining sleeve member 18. FIG. 3B illustrates a second configuration of the segmented coupling structure 12 which comprises a cylindrical array of parallel adjacent uniformly spaced flanged spring members 13A which are deflected during assembly by a retaining sleeve member 18. An alternate construction of the coupling structure shown in FIG. 3B (not shown) involves making the second ply semi-circular body member 16 as a series of individual second ply hoop rings to provide a flexible coupling structure able to bend at least 5° in any direction about the coupling structure central axis 76A.

Figure 50:
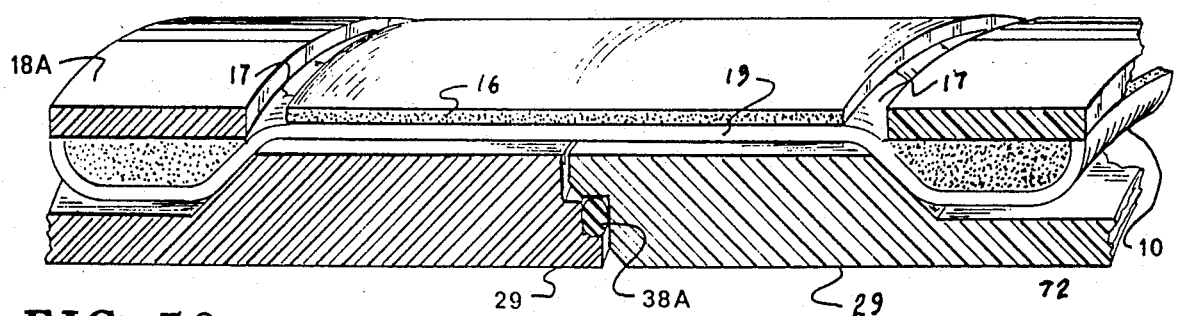
FIG. 50 is a fragmentary half section side elevational view of flanged pipe ends connected by two semi-circular coupling structures secured by two cylindrical composite retaining sleeve members.

FIG. 50 is a cross section perspective side elevation view of a preferred embodiment of this invention and illustrates details of construction of the coupling structure shown in FIGS. 3A and 3B. The segmented coupling structure 10 connects two mating flanged joint pipe ends 29 such as may be made according to the teachings of U.S. Pat. No. 4,385,644. The joint ends of the pipe are configured to contain a compressible annular face seal 38A as illustrated in FIG. 56. The retaining sleeve structure 18 compresses the semicircular spring member 17 to deflect it as a cantilever spring about a curved hinge line 11.

FIG. 32 shows a cross section view of a double-flanged coupling structure 10 in process of manufacture upon a coupling forming apparatus.

FIG. 33 shows a single flange semi-circular type of coupling structure in process of manufacture. This type of coupling structure has one end which serves as a structural flange to contain a pressure plug such as used to seal a pressure vessel end.

Figure 53:
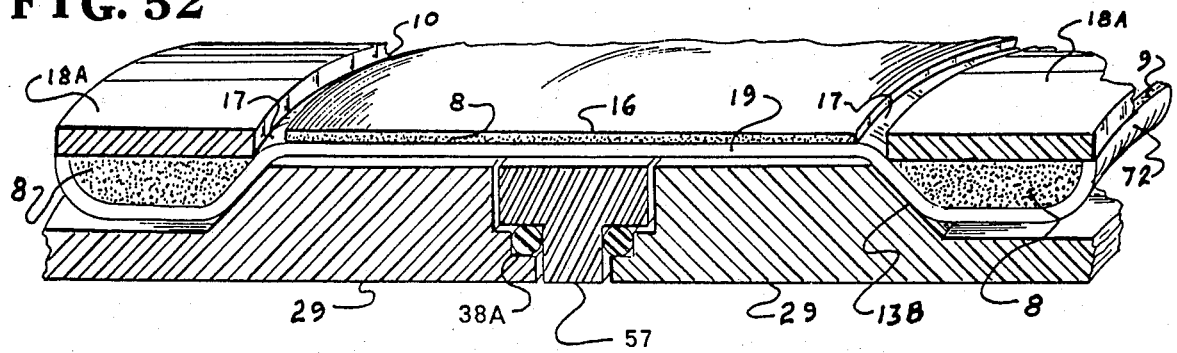
FIG. 53 is a view similar to FIG. 50 but showing a segmented coupling which accomodates an intermediate socket ring adapter to enable sealing between identical spigot end pipe joints.
Figure 54:
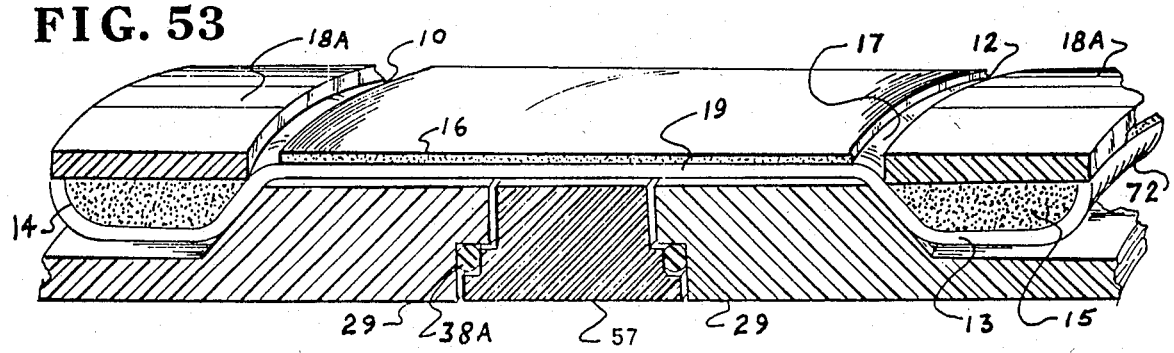
FIG. 54 is a view similar to FIG. 50 but showing a segmented coupling which accomodates an intermediate spigot ring adapter to enable sealing between identical socket end pipe joints.

FIGS. 53 and 54 are identical to FIG. 50 as regards the coupling structure 10 used to connect flanged pipe joints 29. However, these figures depict special pipe end adapter rings 57 which are made of a composite comprising circumferential twines 8 placed upon longitudinal twines 9. The adapter rings 57 are configured to enable sealing pipe joint ends which are identical and which employ sealing means similar to that shown in FIG. 50.

Figure 51:
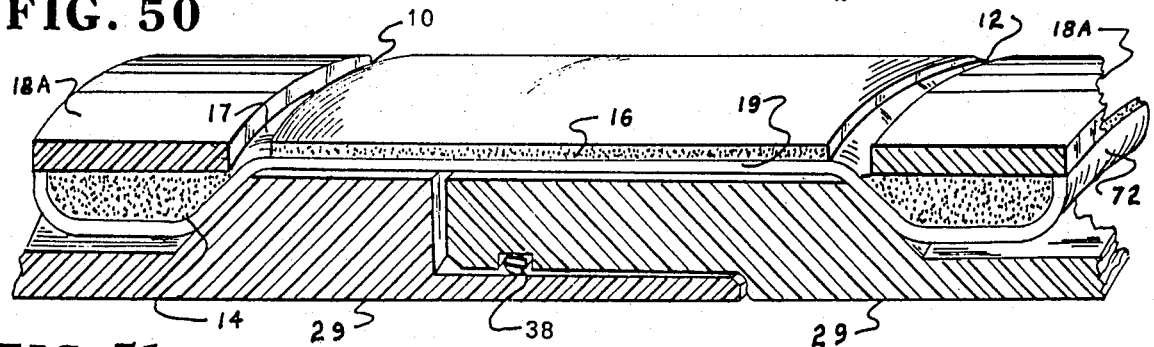
FIG. 51 is a view similar to FIG. 50 but showing the segmented coupling assembly of FIG. 50 connecting socket and spigot pipe joint ends which are able to maintain a pressure seal while accomodating an elongation of the coupling structure.
Figure 52:
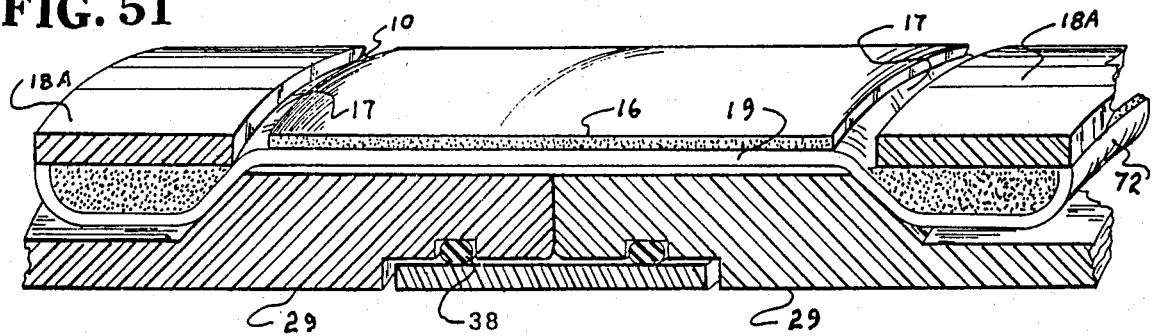
FIG. 52 is a view similar to FIG. 50 but showing the segmented coupling connecting socket end pipe joints sealed by two compressible seals and a separable spigot ring.

FIGS. 51 and 52 illustrate other joint ends of composite pipe 29 which may be connected and sealed by means of the semicircular segmented coupling structure 10 shown in FIGS. 3A and 3B.

Figure 59:
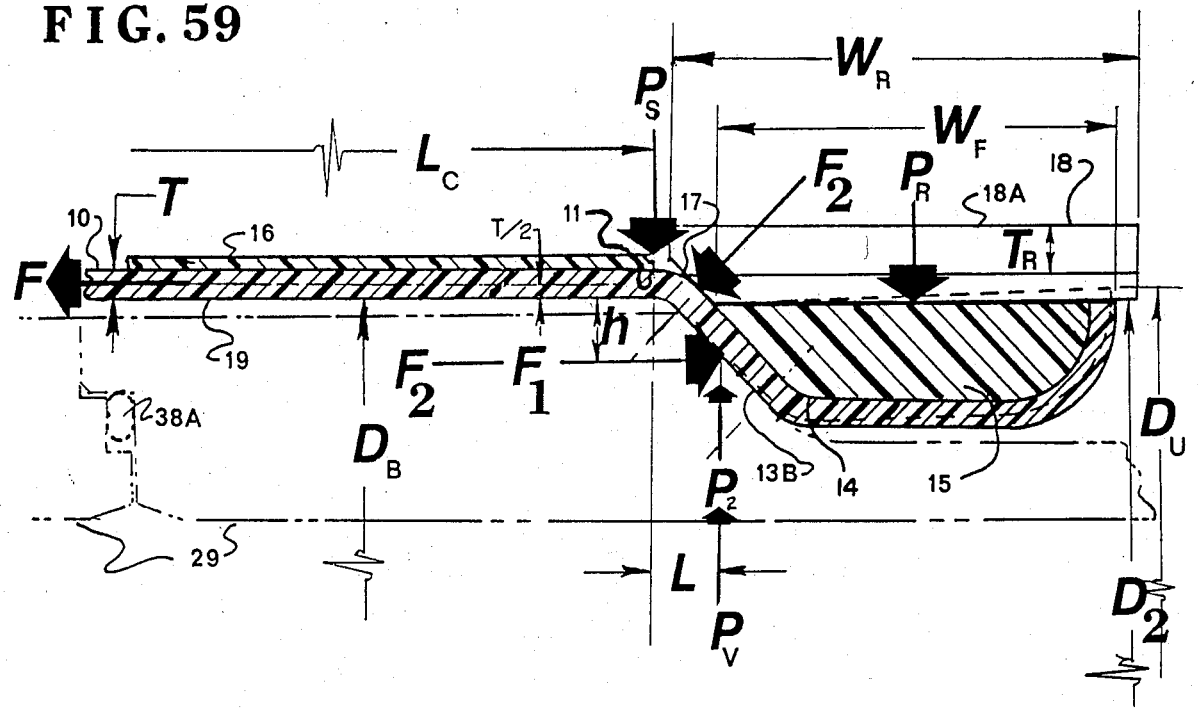
FIG. 59 is a fragmentary half-section side elevational dimensional view of a segmented pipe joint coupling structure showing the flanged spring deflection about a curved hinge line when deflected by an encircling retaining sleeve containment structure.

FIGS. 56, 57 and 59 identify the principal dimensions and load vectors which govern the design of segmented semi-circular couplers having flanged semi-circular cantilever spring members 17 which resist a coupling tensile load "F" while the spring member is in a deflected position 72.

Figure 60:
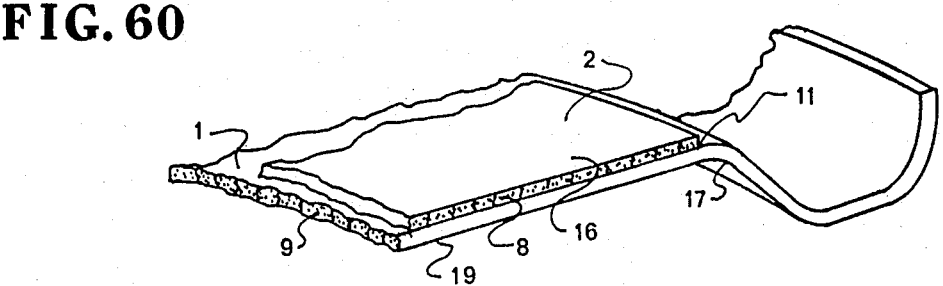
FIG. 60 is a fragmentary perspective view of a segmented coupling first ply structure configured to serve as a cantilever spring member as well as the load face and outer structure of the coupling flange member.

FIG. 60 illustrates the perspective view of the principal plies which comprise the flanged spring and body members of a segmented type coupling structure.

Figure 61:
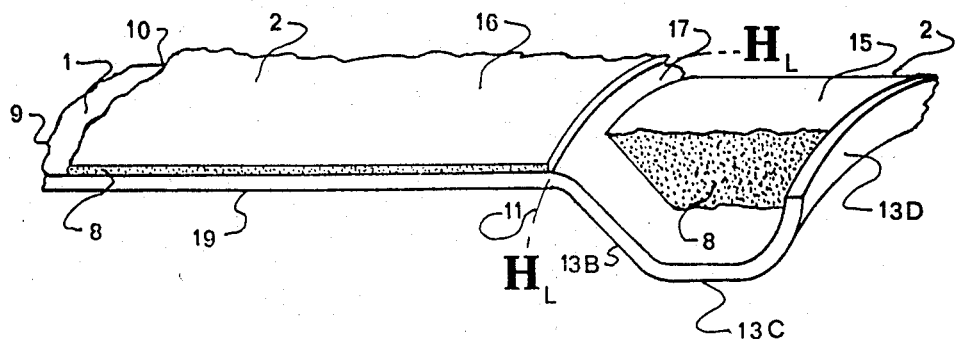
FIG. 61 is a similar view showing the coupler second ply structure with respect to the first ply coupling structure shown in FIG. 60.

FIG. 61 illustrates the curved hinge line 11 which characterizes the curved cantilever spring members 17 of segmented coupling structures which embody teachings of this invention.

FIG. 56 depicts the first ply configuration of the flange constituent of a segmented type of coupling structure 10. This flange constituent 13 is configured to have an interior flange load face extremity 13B which resists a compressive load "$F_1$", and to comprise a flange base member 13C as well as a flange heel member 13D which is constructed so that the endmost extremity of the flange heel 13D extends radially outward from a central axis 76A to a height at least equal to the height of the flange load face member 13B.

The flange heel member 13D is configured to have a partially circular section and the radius of the curved extension of the flange base member 13C is designated as "$R_F$" which is at least equal to twice the first ply thickness "T" measured at the curved hinge line 11.

FIG. 59 illustrates in cross section a preferred embodiment in which the first ply spring member 17 is semi-circular and resists a coupling tensile load "F" while deflected by a spring deflecting load "$P_R$" imposed by an encircling retaining sleeve structure 18. A terminus of the semi-circular second ply body constituent 16 provides a semi-circular curved hinge line 11 about which the semi-circular curved spring member 17 deflects during and following installation of a composite retaining sleeve structure 18A. The width "$W_R$" of the composite retaining sleeve 18A is at least equal to the width "$W_F$" of the second ply flange member 15 and has an inner diameter "$D_2$" less than the undeflected outside diameter "$D_U$" of the exterior flange surface of two connected semi-circular coupling structures 10. The coupling structure connects two mating flanged joint pipe ends 29 containing a compressible annular face seal 38A. The retaining sleeve structure 18 resists a diametral growth of the exterior flange surface when segmented coupling structures having conically bevelled flange load faces 13B are subjected to tensile coupling loads. The less the diametral growth of the coupling structure flange face surfaces, the less the separation between the flange joint pipe ends and the less the concomitant loss of face seal compression.

The following analysis refers to a typical coupling structure of the type shown in FIG. 3A and schematically illustrated in FIGS. 56 and 59. Such coupling structures comprise two semi-circular segmented coupling structures 10 connected by an encircling retaining sleeve 18 which deflects each flange member to press it against the flange of a pipe joint 29. The semi-circular coupling structures have a pair of opposing flange members 14 which are configured to have load face surfaces 13B that are bevelled at a 45° angle. Such a bevelled flange coupling structure is used to connect and provide sealing integrity between the composite pipe joints 29 having appropriate annular face seal provisions. The pressure sealing of such pipe joints depends upon the compression of an annular face seal 38A having an uncompressed seal width "$D_o$". The retaining sleeves 18 used to connect the semi-circular coupler halves 10 serve not only to deflect and prestress the semi-circular spring members 17 but also to preload in compression the pipe joint composite flange members 29. The connected coupling structures together with the pair of retaining sleeves 18, are designed so that the maximum allowable elongation "$\Delta L$" of the coupling structure 10 does not exceed 20 percent of the compressible seal width, "$D_o$". The maximum allowable elongation, produced by the combination of temperature and other service loads, is expressed by the formula: $\Delta L = 0.2 D_o = \Delta K + \Delta D_R$, where $\Delta K$ equals the change in length of the coupler first ply body constituent 19 due to a raise in temperature of the first ply body material as well as due to the tensile load resisted by the coupler first ply body constituent 19 and where $\Delta D_R$ is the average increase in the diameter "$D_R$" of each retaining sleeve structure 18 which connects and encircles the two coupling halves. Referring to FIG. 56 it is easiest to calculate the values of $\Delta K$ and $\Delta D_R$ by calculating the coupling tensile load "F" per unit length of circumference and then calculating the total resulting strain in the first ply spring member 17 and body member 19 material. The following procedure illustrates how this was done for a segmented double flanged coupling structure 12 having a first ply body member 19 sujected to a tensile coupling load equal to 559,200 Newtons (125,663 lb). The inner diameter of the body member "$D_B$" was 254 mm (10 in). The unit circumferential coupling tensile load "F" communicated to the flanged spring member 17 by the body member 19 was calculated as follows: (1) Body member circumference = $3.1416 \times D_B = 3.1416 \times 254 = 798$ mm; (2) Coupling tensile load per unit length of circumference = "F" = 559,200/798 = 700 N/mm (4000 lb/in). It was assumed that the allowable tensile strength "$\sigma_A$" of the first ply material is equal to one half the material transverse shear strength of 227 GPa (33,000 PSI). Thus the allowable tensile strength of the first ply = 113.5 GPa. The tensile modulus of elasticity, "E", of the first ply material was assumed to be 24.3 GN/m² ($3.51 \times 10^6$ PSI). thus the strain value "$\epsilon_1$" of the first ply material at a stress equal to the maximum allowable strength "$\sigma_A$" was determined from the formula $\epsilon_1 = \sigma_A/E = 0.0047$ mm/mm (0.0047 in/in). It was further assumed that the length "$L_c$" of the coupling body member 19 was 152 mm (6 in). Under the maximum tensile load, it was calculated that the coupling body member 19 would elongate an amount $\Delta K_1$ where $\Delta K_1 = \epsilon_1 L_c = 0.0047(152) = 0.716$ mm (0.028 in). It was further assumed that the temperature increase, "$\Delta T$", in the coupling body material was 93° C. (200° F.) and that the coefficient of linear thermal expansion, "$e_T$" equals $11 \times 10^{-6}$ cm/cm/°C. Under such a temperature increase it was calculated the coupling body material 19 would experience a thermal strain $\epsilon_T = \Delta T e_T = 93 \times 11 \times 10^{-6} = 0.001$ cm/cm and that the coupler body member length of 152 mm would increase an amount "$\Delta K_T$" where $\Delta K_T = 0.001(152) = 0.155$ mm. (0.006 in). Since the total coupling elongation "$\Delta K$" equals the sum $\Delta K_1 + \Delta K_T$, the value of $\Delta K$ was calculated to equal 0.871 mm (0.034 in).

For a bevelled flange angle "$\alpha_2$" equal to 45°, the unit load "F" = 700 N/mm imposes a reaction pressure "$P_E$" upon a unit circumferential width of the retaining sleeve 18 equal to $F/W_F$ where "$W_F$" equals the flange width contacting the retaining sleeve. If the flange width "$W_F$" is assumed to equal 76 mm (3 in) then the reaction pressure "$P_E$" is determined to equal 700/76 = 9.2 MPa (1333 PSI). The reaction pressure "$P_E$" exerts a hoop stress on the retaining sleeve which is equal to "$\sigma_R$" and which is determined from the formula $\sigma_R = P_E D_R / 2 T_R$, where "$T_R$" equals the thickness of the retaining sleeve material resisting the hoop stress imposed by the reaction pressure. The value "$T_R$" determines the amount the retaining sleeve 18 will strain and thus increase the sleeve diameter. The sleeve change in diameter "$\Delta D_R$" can thus be controlled by increasing the sleeve thickness "$T_R$".

The hoop tensile stress in the retaining sleeve material, "$\sigma_R$", and the tensile modulus of the retaining sleeve material "$E_R$" determine the allowable retaining sleeve strain "$\epsilon_R$" from the formula $\epsilon_R = \sigma_R / E_R$. It was assumed in the exampled calculation that the retaining sleeve material was identical to the first ply material.

The allowable strain "$\epsilon_A$" is determined from the allowable change in the retaining sleeve inner diameter "$\Delta D_R$" from the formula $\epsilon_A = \Delta D_R / D_R$. If $\Delta D_R$ is required to be equal or less than $\Delta K$, and the sleeve inner diameter "$D_R$" is assumed to equal "$D_B$" = 254 mm then the allowable strain "$\epsilon_A$" is equal to 0.871/254 = 0.0034 mm/mm. The allowable stress in the retaining sleeve "$\sigma_A$" is then determined to equal $E \times 0.0034 = 24,300$ (0.0034) = 83 MPa (12,000 PSI). Since $\sigma_R$ must equal $\sigma_A$ if the retaining sleeve diametral change, "$\Delta D_R$" is to equal "$\Delta K$", then the thickness "$T_R$" of the retaining sleeve circumferentially oriented twine material 8 is determined from the formula $T_R = P_E D_R / 2 \sigma_A$. From the above calculation $T_R = (9.2 \times 254/2(83) = 14$ mm (0.55 in). The total coupling elongation, "$\Delta L$" in this example equals $\Delta K + \Delta D_R = 0.871 + 0.871 = 1.74$ mm (0.068 in).

If the maximum coupling structure elongation is not to exceed 20 percent of the diameter of a compressible "O" ring face seal 38A then the "O" ring diameter calculated from this exxample must at least equal 5 $\Delta L$ or 9 mm (0.343 in).

Since the thickness of the first ply body member 19 controls the allowable strength value, "$\sigma_A$" it can be seen that the present invention permits an easy method to reliably control the elongation of an assembly of two tensile-loaded segmented semi-circular coupling structures 10. The thickness "T" of the first ply 1 which provides the allowable strength "$\sigma_A$", is determined from the formula $T=F/\sigma_A$. For the above example the first ply thickness "T" equals 700/113=6.19 mm (0.24 in). The coupler elongation "ΔL" can be reduced by simply increasing the thickness of the first ply 1.

FIGS. 56, 57 and 59 illustrate a deflection 72 of the curved flange member 14 attached to the curved cantilever spring member 17 belonging to a semi-circular segmented coupling structure 10 when it is assembled and preloaded by a retaining sleeve member 18. Calculations used to design the curved circular segment spring members 17 shown in FIG. 57 and used in semi-circular segmented coupling structures similar to those shown in FIGS. 3A and 3B are based upon experimentally derived formulas using the twine composite properties shown in Table II. The formula to determine the maximum allowable curved spring deflection angle "θ" illustrated in FIGS. 56 and 57 is $\theta=8.8\times10^{-7}\times\sigma_A$ where "θ" is measured in radians and "$\sigma_A$" is the allowable tensile stress of the first ply spring material measured in PSI. The formula to determine the maximum allowable spring deflection force "$F_2$" (shown in FIG. 57) per unit width of the curved spring member 17 is $F_2=0.2T\times\sigma_A$. The unit installation force, "$F_K$" applied to a retaining ing member 18 is approximately equal to 0.07 $F_2$. FIG. 57 is an enlarged view of the short circular segment curved spring member 17 employed in segmented couplings which embody the present invention. The circular segment curved spring member has a length "L" equal to the product of the spring angle "φ" and the inner radius "R" of the spring, where the spring angle "φ" is measured in radians. The spring angle recommended for the curved spring member of segmented coupling structures which exhibit a preferred embodiment is π/4 radians (45°). The deflection of the end of such a curved cantilever spring is radially inward with respect to a central axis of a two piece segmented circular coupling structure. Referring to FIG. 57 the angular magnitude of the radial deflection is "θ", "$F_2$" is the magnitude of the force vector required to deflect the curved cantilever spring 17 an amount "θ", and "T" is the thickness of the first ply spring member measured at the hinge line 11. It has been determined that an angular deflection of less than one degree of the curved cantilever spring (θ=1° or less) provides an adequate preload force to firmly lock in place the retaining sleeve 18 to prevent it from being shifted or easily removed when the coupling structure is not subjected to a tensile load "F". An exampled coupling assembly used a unit installation force "$F_K$" approximately equal to 10 lb per 0.2 in. of first ply thickness. A first ply thickness equal to 0.2 inches produced a spring deflection force "$F_2$" equal to 286 lb. and a spring member stress equal to 7150 PSI ($\sigma=5F_2/T$). The resulting spring deflection, "θ", was 0.0063 radians or 0.4°. In this example the spring radius "R" equalled the first ply spring member thickness "T", and the first ply material tensile modulus, "E" was equal to $3.5\times10^6$ PSI. From this example it was seen that a deflection of the circular segment curved spring member 17 in the manner depicted in FIGS. 56 and 57 pre-stresses the spring and assures an intimate contact between the coupling flange load face member 13B and the mating load face of a flanged joint member 29 connected by the coupling structure. The two piece segmented coupling shown in FIGS. 3A and 3B depend upon the circular retaining sleeve members for coupler integrity and optimum coupling structure performance. As is illustrated in FIG. 57 the semi-circular flanged cantilever spring member 17 resists the axially directed shear force "$F_s$" produced by and equal to the coupler tensile load, "F". This shear force produces a unit transverse shear stress "$S_s$" in the curved cantilever spring member which can be calculated from the formula $S_s=F_s\sin\phi/T$ where "φ" is the angular length of the circular spring segment. For a first ply circular spring thickness "T" equal to 0.2 inches and a curved spring angle "φ" equal to 45°, a tensile load "F" equal to 2,000 pounds per inch of circumference of the coupling body member will produce a unit transverse shear stress in the first ply segmented coupling spring member equal to approximately 7071 PSI (48.8 MPa). From Table II it can be seen that this is less than 25% of the maximum transverse shear strength of a typical first ply composite material. A recommended practice is to make the retaining sleeve member 18 sufficiently thick and rugged to withstand installation forces and reduce diametral enlargement of the sleeve when deflecting the curved spring member 17.

EXAMPLE VI

FIG. 72 is a partially fragmented sectional perspective view of an impermeable tubular composite structure similar to that employed as the pressure resistant body member 30 of a flanged spring-lock coupling structure or a flanged composite pipe 29 connected by the segmented composite coupling structure 10 disclosed in this invention. The flanged tubular body member 30 comprises an impermeable inner liner 45 made of a polymeric resin, such as a urethane elastomer, having a capability to remain impermeable when stretched and simultaneously subjected to a tensile strain value at least equal to 0.020 mm/mm in the circumferential as well as the longitudinal direction. The liner provides the tubular composite structure with a pressure sealing membrane able to resist pressures as great as 100 MegaPascal (15,000 PSI). The tubular composite structure which resists the circumferential and longitudinal stresses produced when the structure is subjected to an end load and/or internal pressure comprises an inner third ply 27 of continuous helically wound CIRC twines 8 surmounted by a first ply 1 of parallel longitudinally oriented LONGO twines which are flared or otherwise configured at each end of the tubular member to provide a spigot or socket end coupling flange structure. The ply of parallel LONGO twines is covered by an exterior second ply 2 composite body structure such as may be formed by a single ply of circumferential filament wound twines 8. As seen in FIG. 72, and more clearly from the elliptically shaped enlargement view, the LONGO ply twines 9 and the CIRC ply twines 8 of the composite tube structure 30 comprise individual twines 7 bonded by a hardened liquid matrix 6A used to impregnate helically configured strands of continuous filament reinforcements 5 which are individually covered and enclosed by a twine coat 47. The material comprising the twine coat 47 which covers each twine is most commonly the same hardenable liquid bonding matrix material 6 used to impregnate the helically configured twined strands. The twine coat material 6B may also comprise, in addition to the matrix material, 6 an additional layer of a compatible matrix material 6C. The additional layer may have a variable thickness and may also serve to provide a means of controlling the distance separating adjacent twines 7. A principal function of the twine coat 47 is to facilitate the physical separation of at least some of the individual twines comprising the CIRC and LONGO plies when the tubular composite structure becomes stressed in a manner that results in a change in the diameter or length of the tubular structure. This is possible due to the fact that the twine coat 47 is weaker in shear and tension than the filament-reinforced composite material comprising the twine 7. The impermeable and elastomeric nature of the inner liner 45 prevents the tubular structure from leaking or losing pressure when the individual twines comprising the circumferentially wound CIRC ply or the longitudinally oriented LONGO ply physically separate to accomodate the changes in tube dimension that result when the compsoite tubular structure is stressed. The composite tube outer second ply body member 26 is constructed to be impermeable whenever the tubular structure is designed to operate while submerged, buried or exposed to weather.

The separation distance 47A between the individual twines comprising the CIRC ply 2 or the LONGO ply 1 can range from as little as 0.1 micron to as much as twenty times the thickness of an individual ply twine 7. The twine separation distance or space between adjacent twines 47A may be controlled by the twine coat 47 and the physical properties and dimensions of the material 6B comprising the twine coat. The separation distance 47A between individual adjacent twines in the same composite ply structure is thus used not only to accomodate dimensional changes produced in the tubular composite structure 30 by stresses resulting from pressure, torque and end loads, but also to increase the stiffness of the composite wall structure by increasing the moment of inertia, "I", of either or both tubular twine plies.

EXAMPLE VII

Figures 23, 24, 25:
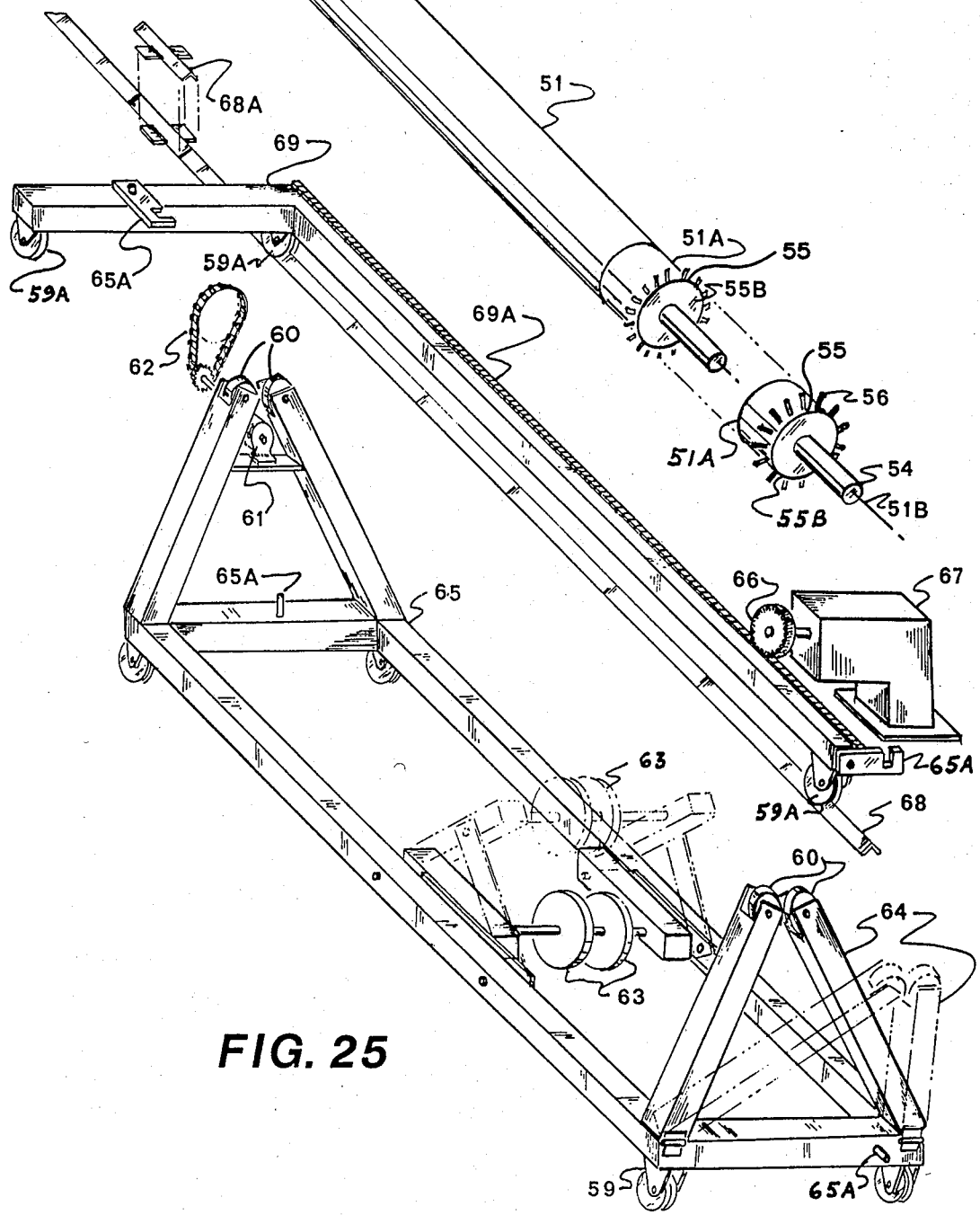
FIG. 23 is a perspective view of a rotatable form support mandrel apparatus used to make the illustrated segmented composite coupling structures thereon.
FIG. 24 is a perspective view of a pwered mandrel carriage transverse apparatus.
FIG. 25. is a perspective view of a powered mandrel carriage apparatus.

FIGS. 23, 24 and 25 illustrate apparatus which can be employed in the construction of composite coupling structures that typify the preferred embodiments of this invention. FIGS. 27, 32, and 33 illustrate coupling forming apparatus 58 used to make segmented type coupling structures. FIG. 23 is a perspective view of a rotatable cylindrical mandrel structure 51 upon which segmented semi-circular couplings 10 and tubular spring-lock coupling structures 20 can be made. The mandrel 51 is supported by axel members 52 and 54. The axel member 52 is a turning end axel permanently attached to the mandrel and having a sprocket gear 52A. The axel member 54 is attached to a removable section of mandrel 51A. When a tubular spring-lock type coupling structure is made on the mandrel 51 and the sprocket end coupling forming structure (not shown) the removable mandrel portion 51A is removed to enable removal of a tubular spring-lock coupling structure made on the mandrel. The mandrel 51 supports a pair of pin rings 55, one of which is a movable pin ring 55A which can slide along the mandrel surface so the distance between the pin rings can be reduced. Each pin ring 55 supports an annular array of twine loop anchor pins 56 which are equally spaced and which extend radially outward from the mandrel central axis 51B. A fixed pin ring 55B is attached to the mandrel portion 51A which is removable and comprises a structural portion of the removable axel member 54. A coupling forming apparatus 58 such as may be used to make a segmented type coupling structure having the configuration shown in FIG. 32 or FIG. 33 is supported on the mandrel 51 between the pin rings 55.

FIG. 24 is a perspective view of a powered linear traverse apparatus 66 comprising a floor-mounted powered sprocket drive 67 that moves an "L" shaped traverse structure 69 along a straight floor-mounted track 68 that is at least twice the length of the traverse structure 69. The track is preferably made from a steel 1"×1"×¼" angle and comprises at least one movable section 68A to permit passage of mandrel carriage caster wheels 59A across the track line. The traverse structure is constructed to be able to be attached to a movable mandrel carriage structure 65 such as shown in FIG. 25. The traverse structure 69 and the carriage structure 65 are both equipped with carriage attach apparatus 65A that secures the carriage 65 to the traverse structure 69 to enable the performance of a traverse operation of the carriage upon the track 68. The traverse structure is equipped with a straight sprocket chain 69A which is permanently attached to the driven side of the traverse structure and with at least three supporting "V" grooved caster wheels 59A at least two of which ride on the track 68. The traverse apparatus 66 is used to move a mandrel carriage 65 and the mandrel 51 supported thereon past a fixed twine impregnation apparatus (not shown) such as schematically depicted in FIG. 44 to thereby enable placement of circumferentially disposed twines upon coupling forming apparatus 58.

FIG. 25 is a perspective view of a movable mandrel carriage structure 65 on casters 59 that comprises a mandrel axel support 60, such as is formed from a pair of heavy duty roller bearings, a sprocket drive chain 62 which rotates the mandrel 51 when driven by a motor 61, a hinged axel support structure 64 that allows removal of a finished tubular composite coupling structure from the mandrel and a pair of adjustable mandrel support wheels 63 that supports the mandrel 51 during removal of a tubular spring-lock type of coupling structure.

EXAMPLE VIII

FIG. 27 schematically illustrates the apparatus and method to make a matrix-impregnated twine 7 of helically configured strands 4 of filament reinforcements 5 used to fabricate flanged spring coupler structures which embody the present invention. FIG. 27 also schematically illustrates apparatus used to form, tension and position loops of twine 46 upon forming apparatus 58.

FIG. 27 further illustrates forming apparatus used to construct segmentd couplers having flanged curved composite spring members at each end of a coupler body to provide a preferred embodiment of the present invention. The method and apparatus to make a twine of matrix impregnated helically configured strands containing unidirectional filament reinforcement comprises the following sequence of steps:

1. Position in adjacent proximity, preferably in a row, at least three packages of continuous filament strands which have been helically wound to form a cylindrical strand package 50 having a central axis 50A.

2. Position above each strand package, preferably in a row, a circular strand guide ring 90.

3. Pull a strand end from the inside and/or outside of each strand package in a direction parallel to the package cylindrical axis 50A.

4. Place each strand end through the strand guide ring located above the strand package 50.

5. Pull the strand end toward a strand collecting funnel tube 53 located at one end of the row of strand guide rings, threading the untwined strand 4A through any and each adjacent strand guide ring comprising the row of guide rings aligned with the strand collecting funnel 91 to form a dry twine 7A comprising helically configured dry filament strands 4.

6. Pull the dry twine 7A through the strand collecting funnel end 91 of the funnel tube 53 bent and shaped to guide the dry twine cord toward the top of a receptacle containing a liquid hardenable bonding matrix 6.

7. Pass the dry twine cord through the funnel tube into the matrix receptacle 84A and under a smooth cylindrical impregnating bar 84B positioned near the bottom of the matrix receptacle to impregnate the dry twine strands 4 with the liquid matrix 6.

8. Pull the impregnated twine 7 up and out of the receptacle through a pair of smooth parallel squeegee bars 92 rigidly positioned above the receptacle and spaced sufficiently close to remove any excess of liquid matrix from the twine.

9. Pass the twine 7 into a funnel-shaped twine cord compressing unit 9 having an exit end orifice which is able to accept and compress a multiple of twines that have been similarly impregnated with the same or other compatible liquid matrix 6C.

10. Pull the twine cord 7B through the funnel tube exit orifice into a twine friction unit 94 comprising a set of three smooth adjacent parallel horizontal cylindrical bars arranged so the axis of each bar is perpendicular to the axis of the funnel tube exit orifice and so that the upper surface of the first twine friction bar is slightly beneath the bottom of the exit end orifice.

11. Pull the wet twine cord 7B over the first friction bar 94A which remains fixed and rigid and under the central friction bar 94B which is vertically adjustable to control twine sliding friction.

12. Continue pulling the twine cord 7B so it passes over the fixed third friction bar 94C and under a smooth "U" shaped cylindrical tension bar 95 having a weight at least equal to the weight of a desired length of twine loop cord 46 and providing a means to maintain tension in the twine cord 7B when the twine loop forming apparatus 86 is stationary or in motion on the return leg of a reciprocating traverse operation.

13. Pulling the twine cord 7B through the funnel end of a rigid twine-directing exit orifice 96 positioned so the exit orifice axis is co-linear with the axis of the exit-end orifice of the twine cord compression unit 93.

14. Pulling the twine cord 7B through a reciprocating twine loop forming and pulling apparatus 86 having the configuration and construction shown in FIGS. 26A and 26B and suspended from powered twine placement apparatus 97 comprising a continuous sprocket chain 97A supported at each end by sprockets 97B, one of which is driven by a reversible motor 97C. The twine loop forming and pulling apparatus 86 comprises a twine funnel entry unit 87 and a twine exit orifice located at the end of a flexible tube 88 having a smooth interior and able to bend 180° in the plane containing the funnel entry 87 while providing a tube bend radius at least equal to four times the average cross section diameter of the twine cord 7B.

15. Securing the twine endto an anchor pin 56 attached to a fixed pin ring 55B located at one end of a suitable coupler forming apparatus 58, said anchor pin located below the twine-directing exit orifice 96 and at a distance of approximately one meter from said orifice.

16. Activating the sprocket motor 97C and moving the loop forming apparatus 86 toward a second anchor pin 56 attached to a movable anchor pin ring 55A and located approximately parallel to the axis of the exit orifice 96 while simultaneously making and pulling freshly impregnated twine 7B from the twine exit orifice 96.

17. Making a tensioned loop of twine 46 while simultaneously increasing the length of the twine loop 46 and moving the loop end formed by the bent flexible tube 88 toward the second anchor pin 56.

18. Manually stopping the loop forming apparatus 86 at a point as shown in FIGS. 29 and 34 where the exit end of the bent tube 88 has passed the second anchor pin 56 so the twine loop can be placed around the pin prior to the loop forming apparatus 86 moving in the opposite traverse direction. Alternatively, using a position sensor 98 to activate a remote relay 99 which halts motor operation for a fixed time interval before starting motor rotation in a reverse direction.

19. During the time interval when the loop forming apparatus 86 is stationary securing the twine loop end to the second anchor pin 56 which is attached to a movable pin ring 55A mounted upon a rotatable mandrel 51 supporting coupling forming apparatus 58 such as shown in FIGS. 27, 28, 29, 30, 31, 32, 33 and 34.

20. Rotating the coupling structure forming apparatus 58 which is mounted upon a mandrel 51 so as to move a third anchor pin 56 to the position previously occupied by the first anchor pin 56 while simultaneously temporarily halting the making and pulling of a matrix-impregnated twine cord 7B and using the three-bar friction unit 94 to lock the travers-return leg of twine 46A between the second anchor pin 56 and the three bar twine friction unit 94 as shown in FIGS. 30 and 31.

21. Activating a traverse reverse-direction motor switch to energize the sprocket chain 97A to which the loop forming apparatus 86 is attached and begin moving the loop forming apparatus toward the third anchor pin 56 while simultaneously lowering the vertically reciprocating twine loop forming unit 89 to maintain tension in the traverse-return leg of the twine loop cord 46A.

22. Continuing to move the loop forming apparatus 86 in its lowered position along the return leg of the twine loop 46 while simultaneously straightening the flexible tube 88 as it trails behind as shown in FIG. 34.

23. Stopping, such as by the automatic sensing and switching means described in Step 18 above, the loop forming apparatus at its original starting point when the twine exit orifice of the trailing flexible tube passes beyond the third twine loop anchor pin as shown in FIG. 31.

24. During the time interval when the loop forming apparatus is stationary, looping the twine cord 7B around the third anchor pin 56 to anchor the return leg of the twine loop 46A.

25. Energizing the sprocket motor 97C to drive the sprocket chain 97A in a reverse direction while simultaneously raising the reciprocating loop forming unit 89 to allow the flexible tube 88 to bend 180° and clear the surface of the forming apparatus 58 while the twine loop forming apparatus 86 proceeds to make a second loop of twine cord 46 and pull it from the exit orifice 96 as it moves toward a fourth anchor pin 56 as shown in FIGS. 28 and 29.

26. Repeating the steps of 17 through 25 above until all anchor pins attached to the anchor pin support rings 55A and 55B have been used to secure the twine cord 7B.

27. Stopping the loop forming apparatus at its original starting position, looping and tying the return leg end around the first anchor pin 56 so it remains permanently secure, pulling a short length of additional twine from the exit end of the flexible tube and cutting the twine at the anchor pin to provide a tail of twine emerging from the end of the straightened flexible tube.

Figure 26:
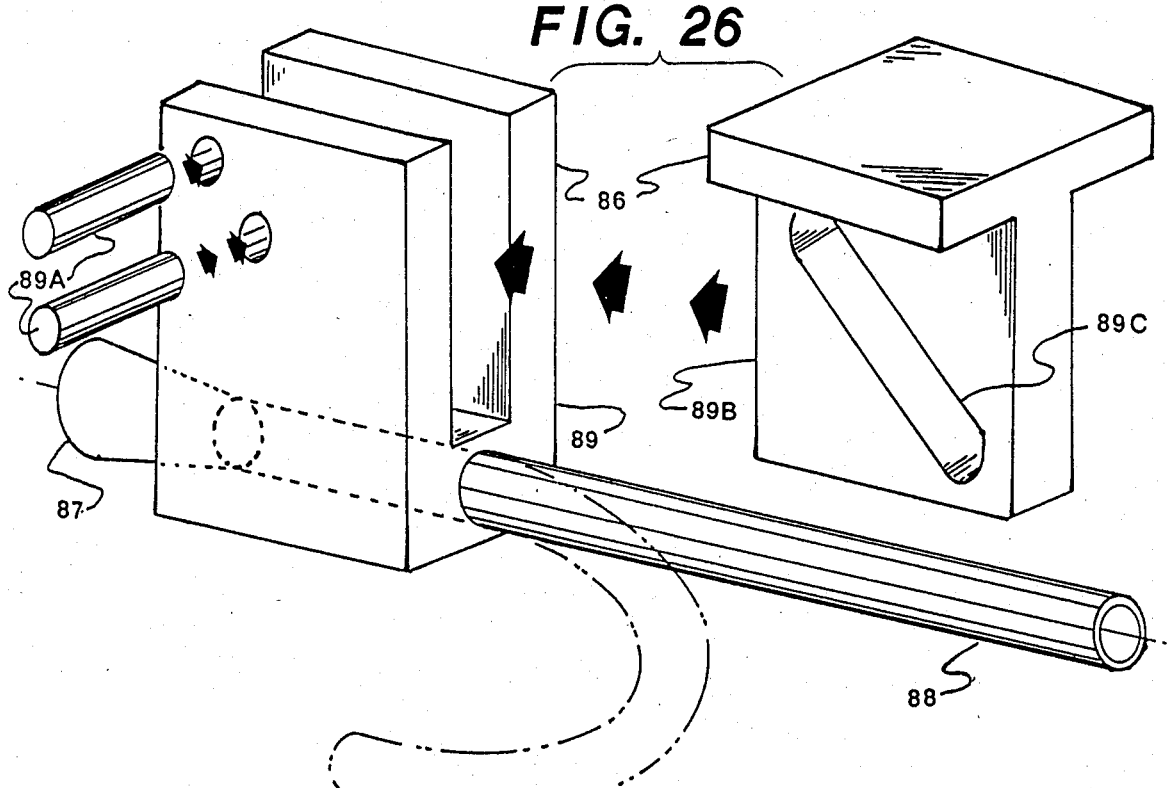
FIG. 26 is an exploded isometric view illustrating a reciprocating twine-loop forming apparatus and a support structure thereof.

FIGS. 26A and 26B are perspective views of the twine loop forming and pulling apparatus 86 used in the method describe above. This apparatus comprises a funnel-shaped twine entry unit 87 attached to a flexible twine guide tube 88 which is able to bend 180° to produce and pull a twine loop comprising longitudinal twines of filament strand reinforcements. The twine guide tubr 88 is secured to a vertically reciprocating member 89 that is connected by guide pins 89A to slotted support structure 89B having a pin guide slot 89C oriented at a 45° angle with respect to a horizontal plane and directed downward and away from the funnel-shaped twine entry unit 87.

EXAMPLE IX

FIG. 44 schematically illustrates the method and apparatus by which individual strands of filament reinforcement 4A are helically configured and impregnated to form twines 7 which are combined and flattened prior to being disposed as circumferentially oriented twines 8 upon an underlying ply of longitudinally oriented twines 9 to provide the multiple ply construction of flanged cantilever composite spring members that may comprise a preferred embodiment of this invention. As shown in FIG. 44 untwined strands 4A are fed through strand guide rings 90 after being pulled from roving packages 50 in a direction parallel to the roving package cylindrical axis 50A. The twine of dry strands 7A is fed into a strand tube collecting funnel which comprises part of the twine forming apparatus 53. The dry twine of strands 7A is directed into a twine impregnating apparatus 84 comprising a receptacle for liquid impregnating matrix 84A and a cylindrical impregnation bar 84B. The wet twines 7 are pulled beneath the impregnation bar 84B through twine ribbon forming apparatus 85 comprising a twine width control member 91A, a pair of polished steel squeegee bars 92, and a twine ribbon feed bar 91B, to provide a twine ribbon 7C having a minimum thickness generally ranging from 0.75 to 1.0 mm for twines made from roving having a yield of 500 meters per kilogram.

EXAMPLE X

Figure 37:
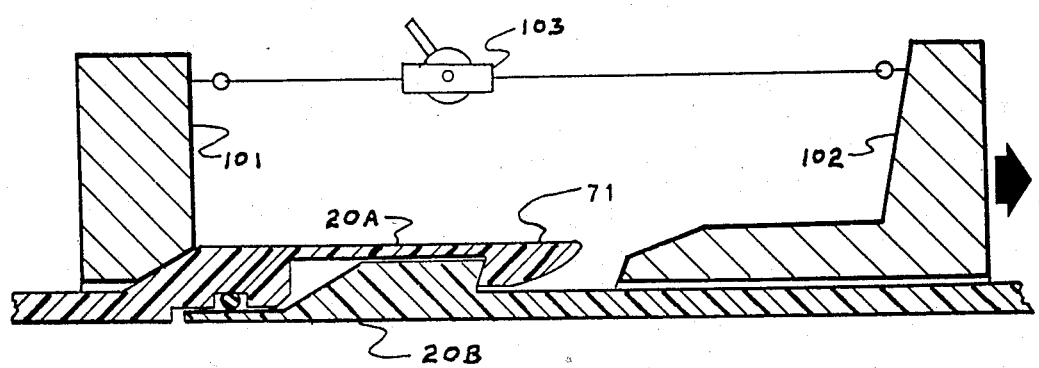
FIG. 37 is a view similar to FIG. 35 but exhibiting removal of the apparatus upon completion of the coupling assembly.
Figure 38:
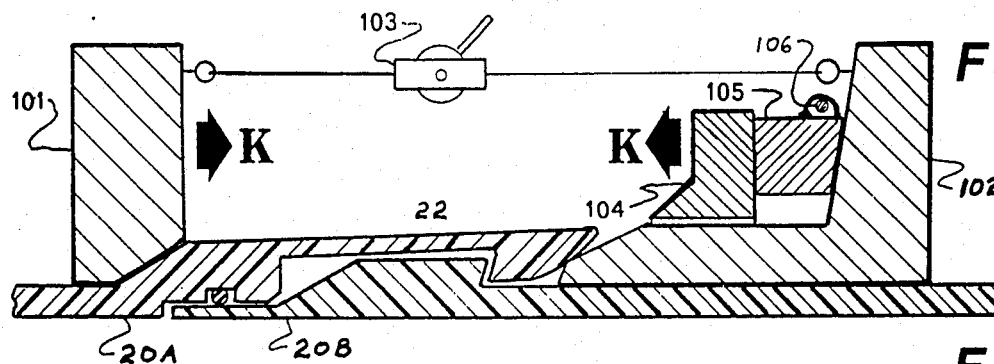
FIG. 38 is a view similar to FIG. 35 but showing coupler disconnecting apparatus in position to separate coupled pipe ends.
Figure 39:
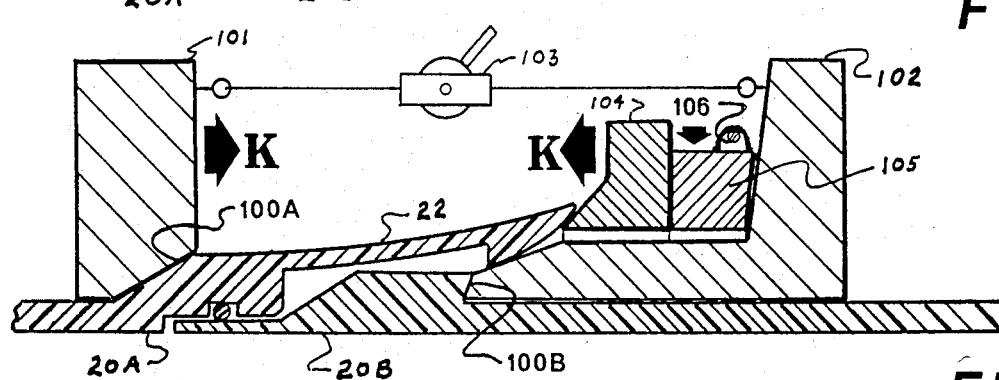
FIG. 39 is a view similar to FIG. 38 but showing the apparatus as it is used to perform the first step in separating coupled pipe.
Figure 40:
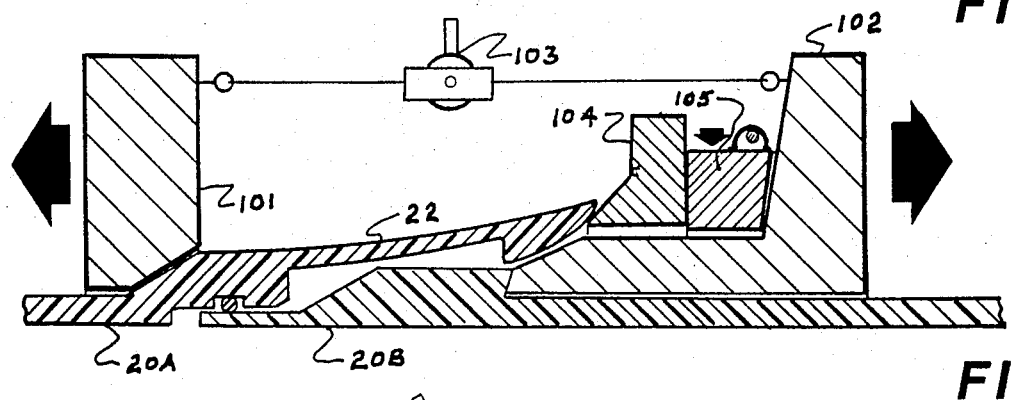
FIG. 40 is a view similar to FIG. 38 but showing the apparatus as it is used to perform a following step in separating coupled pipe.
Figure 41:
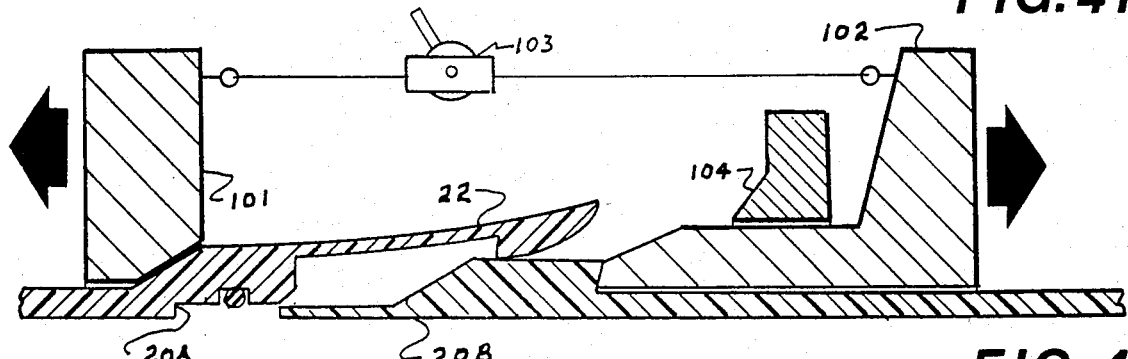
FIG. 41 is a view similar to FIG. 38 but showing the apparatus as it completes a method of separating coupled pipe.
Figure 42:
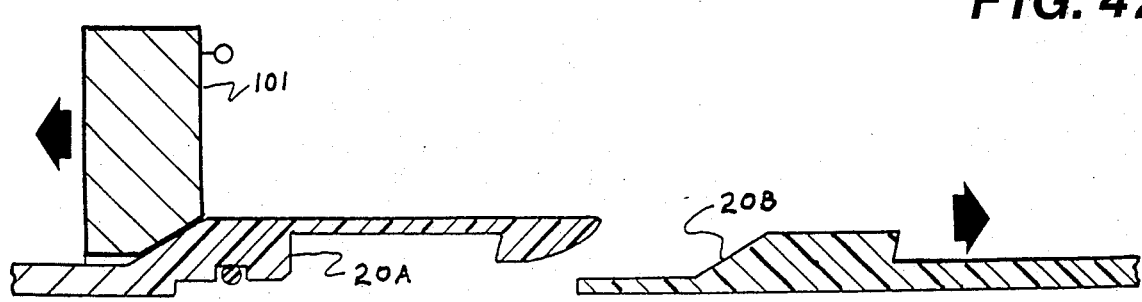
FIG. 42 is a view similar to FIG. 38 showing the removable anchor ring apparatus which may be used to assemble or disconnect the illustrated coupling structures of this invention.

FIGS. 35, 36 and 37 illustrate in simplified schematic form the method and apparatus for inserting the spigot-end body member 20B of a spring-lock type of coupling structure into the socket end 20A of a spring lock coupling structure 20. The coupling assembly apparatus schematically depicted in FIGS. 35, 36 and 37 comprises a removable socket end anchor ring 101 which is secured firmly to the socket end of the coupling structure body member by such means as clamping or by engaging with an external bevelled flange 100A formed as an integral part of the socket-end coupling structure body member. The coupling assembly apparatus also comprises a removable spigot-end anchor ring 102 which is secured firmly to the spigot end of the coupling structure by such means as clamping or, as is shown in FIGS. 35, 36 and 37, by engaging with an external flange 100B formed as an integral part of the spigot-end coupling structure body member. The coupling assembly apparatus also comprises pulling apparatus 1C by which the socket-end anchor ring 101 and the spigot-end anchor ring 102 can be brought together with a force which is sufficient to overcome the unit spring deflection force that is produced when the flanged composite spring 3 is deflected to a height sufficient to permit entry of the spigot flange member.

FIGS. 38, 39, 40, 41 and 42 illustrate in simplified schematic form the method and apparatus for separating the spigot end 20B of a coupling structure body member from the socket end 20A of a mating spring lock coupling structure. A removable socket end anchor ring 101 is secured firmly to the socket end of the coupling structure body member. A removable spigot end anchor ring 102 is secured firmly to the spigot end of the coupling structure body member. The another rings are brought together by such means as pulling apparatus 103. A removable polygon-shaped ring structure 104 having an array of flat bevelled edges which can engage and support the flange edge of each spring member is moved and retained in position by a ring of individual wedge blocks 105 having a width less than each spring member and equal in number to the number of flanged cantilever spring member comprising the coupling spigot end. The wedge blocks are loosely connected by an encircling wedge block cord 106.

EXAMPLE XI

FIGS. 78, 79, 80, 81 and 82 exhibit a movable spring-lock coupling structure 20 that can be fabricated to enclose one end of a composite pipe structure 29 having flanged joint ends adapted to accommodate a compressible annular face seal 38A.

Figure 78:
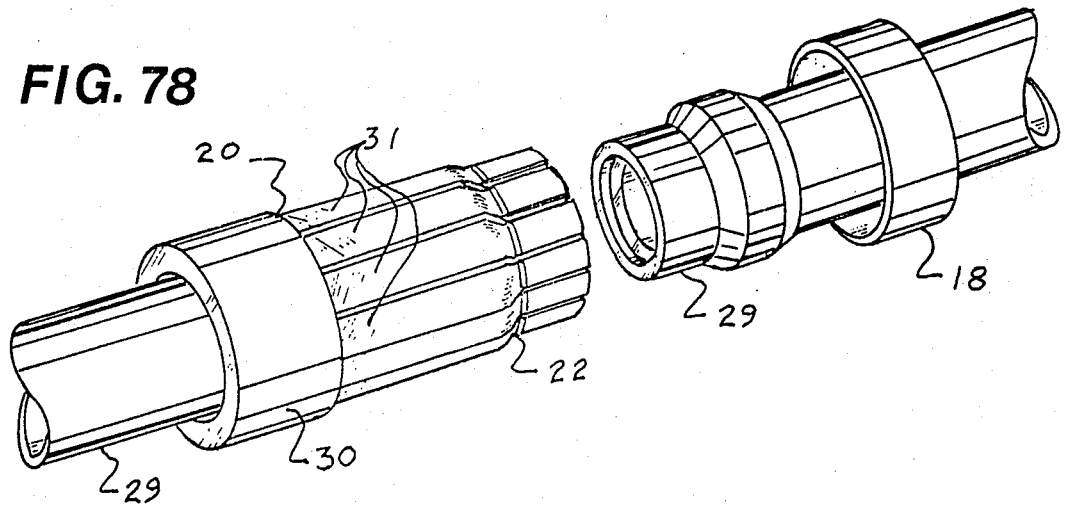
FIG. 78 is an exploded perspective view of a movable spring-lock coupling structure with a cylindrical retaining sleeve member used to join externally flanged pipe butt joints.
Figure 79:
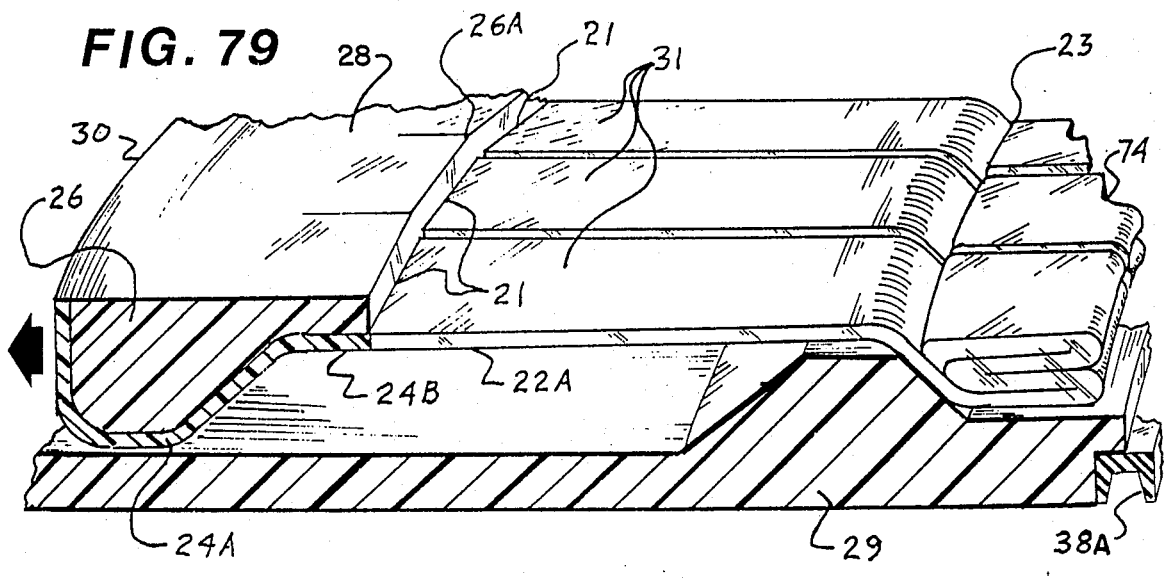
FIG. 79 is a fragmentary sectioned perspective view of a movable spring-lock coupling structure in the retracted position.

FIG. 78 is a perspective view showing the position of a movable spring-lock coupling structure 20 when in the fully retracted position illustrated in the perspective side elevation section view of FIG. 79. The movable spring-lock coupling structure, as with the segmented type coupling structure described in Example V of the present invention, enables the connection of flanged-end pipe joints 29 having identical ends which are able to accommodate an annular face seal 38A. The movable spring-lock coupling structure is characterized especially by a cylindrical body member 30 comprised of a second ply body member constituent 26 placed upon the cylindrical first ply body member 24A having one extremity configured to comprise a polygonal array of cantilever flat spring members 31 having a polygonal array of straight hinge lines 21 produced by a second ply polygonal shaped body member extremity 26A. The first ply flange constituent 23 of each cantilever spring member is configured to provide a cylindrical-segment shaped first ply flange member 23A which engages the flange of a pipe joint 29.

Figure 80:
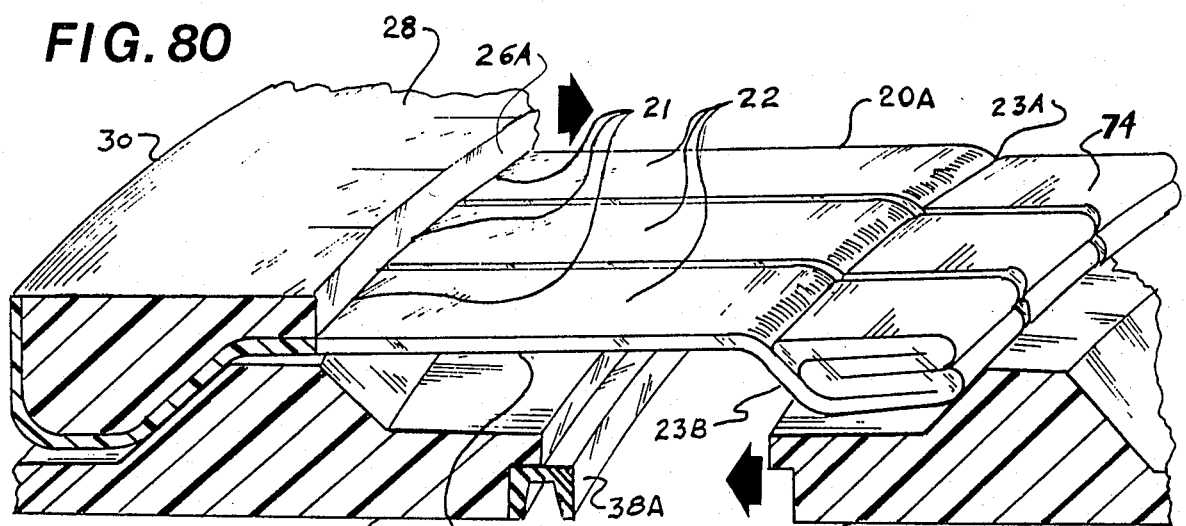
FIG. 80 is a view similar to FIG. 79 illustrating the extended position of the movable spring-lock coupling structure as it initiates a connection between flanged-joint pipe ends.

FIG. 80 illustrates the position of the movable spring-lock coupling structure with respect to pipe joint ends 29 in the process of being connected. In this position the movable coupling is fully extended to provide a socket-end 20A of a spring-lock coupling structure.

Figure 81:
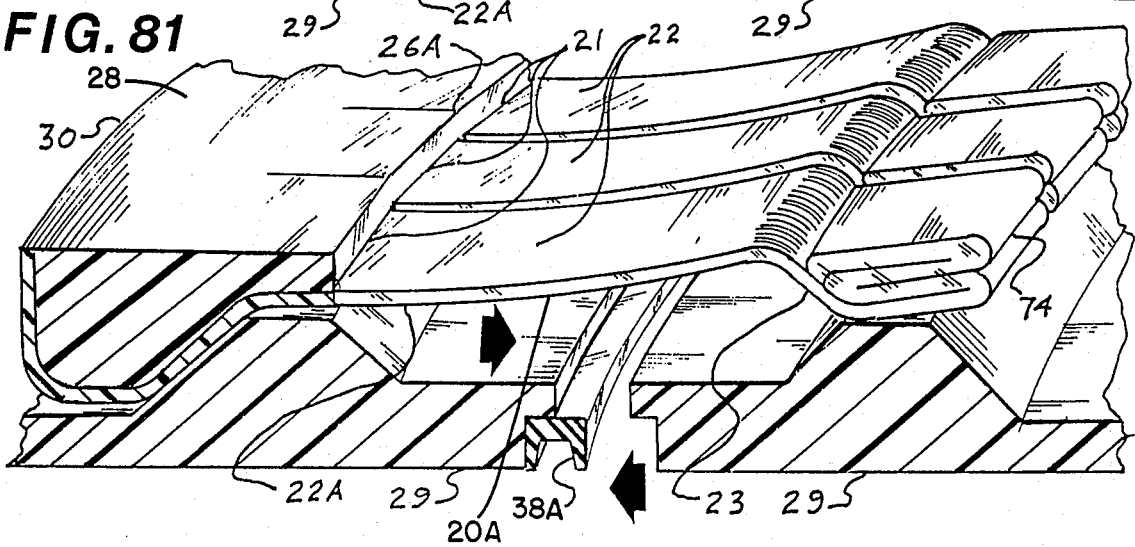
FIG. 81 is a view similar to FIG. 80 illustrating the polygonal array of flanged cantilever composite springs being deflected as the movable spring-lock coupling structure is in process of connecting flanged butt joint pipe ends.

FIG. 81 illustrates the position of the flanged pipe ends 29 when the array of flanged composite cantilever springs 22 are fully deflected to enable the spigot-like entry of a flanged pipe end 29.

Figure 82:
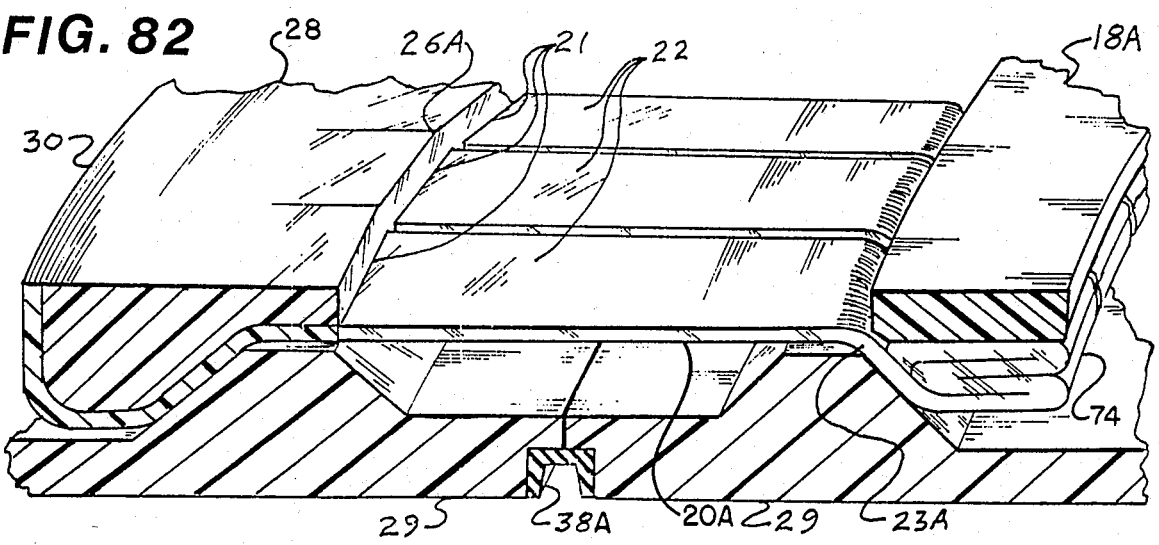
FIG. 82 is a view similar to FIG. 81 illustrating a movable spring-lock coupling and retaining sleeve structure connecting identical flanged joint pipe ends having a face seal capability.

FIG. 82 illustrates the connection and sealing position of abutting flanged pipe ends joined by a movable spring-lock coupling. The encircling cylindrical composite retaining sleeve member 18A is used in a manner similar to that described in Example V above and deflects the bevelled flange load face which provides the prestress compression load that compresses the face seal 38A and provides deflection and pre-stress forces to the first ply flange member 23A which preferably exhibits a folded first ply flange body configuration 74.

I claim:

1. A composite deflectable spring comprising
   a multiple of compacted continuous filament strands each composed of a multiple of individual continuous filament reinforcements, each of said filament strands extending at least generally in the direction of a longitudinal axis thereof to exhibit a center-pull helical frequency and configuration defined by a multiple of revolutions about said axis and about at least one other of said filament strands, each of said filament strands having helixes that are spaced relative to the helixes of the other filament strands in the direction of said axis, and
   hardenable adhesive means impregnating said filament strands and forming a hardened bonding matrix for ridgedly maintaining said filament strands as a composite structure and wherein
   a multiple of said structures are disposed in at least general parallel relationship relative to each other to form a uniformly thick single ply structure, said structures bonded together by said hardened bonding matrix to form said deflectable spring structure.

2. The deflectable spring of claim 1 wherein said single ply structure further comprises a body member having said spring connected in cantilevered relationship thereon a hinge line defined therebetween.

3. The deflectable spring of claim 2 wherein said spring is at least generally uniformly curved in a direction transverse to said axis and forms a segment of said single ply structure.

4. The deflectable spring of claim 2 wherein said spring is flat and forms a cantilever leaf spring.

5. The deflectable spring of claim 1 wherein the filament strands of each of said structures are helically wound about a twine core structure comprising a flexible thermoplastic rod.

6. The deflectable spring of claim 2 wherein said single ply structure further comprises a flange member formed thereon and deflectable in a first direction and wherein the shear strength of said flange member is at least substantially equal to the transverse shear strength of the remaining portions of said single ply structure.

7. The deflectable spring of claim 6 wherein said spring has a rectangular cross section at said hinge line and said hinge line is straight when viewed in cross-section.

8. The deflectable spring of claim 6 wherein a load face is defined on said flange member and forms a segment of a conical surface and wherein said hinge line constitutes a segment of a circle when viewed in cross-section.

9. The deflectable spring of claim 6 wherein said flange member defines a protuberant load face ply structure extending transversely of said axis.

10. The deflectable spring of claim 9 wherein said an extremity of load face ply is directed at least approximately 180° opposite to the initial extension direction of said load face ply structure.

11. The deflectable spring of claim 9 wherein said load face is flat.

12. The deflectable spring of claim 6 wherein said single ply structure further comprises a non-deflectable flange member, having a load face, formed thereon.

* * * * *